United States Patent
Zhang et al.

(10) Patent No.: US 12,069,262 B2
(45) Date of Patent: *Aug. 20, 2024

(54) GEOMETRIC PARTITIONING MODE IN VIDEO CODING

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/171,818

(22) Filed: Feb. 21, 2023

(65) Prior Publication Data

US 2023/0209054 A1    Jun. 29, 2023

Related U.S. Application Data

(63) Continuation of application No. 17/705,509, filed on Mar. 28, 2022, now Pat. No. 11,722,667, and a
(Continued)

(30) Foreign Application Priority Data

Sep. 28, 2019    (WO) ................ PCT/CN2019/108797

(51) Int. Cl.
*H04N 19/105* (2014.01)
*H04N 19/119* (2014.01)
(Continued)

(52) U.S. Cl.
CPC ......... *H04N 19/119* (2014.11); *H04N 19/105* (2014.11); *H04N 19/137* (2014.11);
(Continued)

(58) Field of Classification Search
CPC .......................... H04N 19/119; H04N 19/105
See application file for complete search history.

(56) References Cited

U.S. PATENT DOCUMENTS 8,879,632 B2 * 11/2014 Joshi ...................... H04N 19/52
375/240.03
9,008,182 B2    4/2015 Tsai
(Continued)

FOREIGN PATENT DOCUMENTS

| CN | 101415121 A | 4/2009 |
| CN | 101822064 A | 9/2010 |

(Continued)

OTHER PUBLICATIONS

Zhang et al. "Non-CE8: Fixes of IBC BV Candidate List," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0574, 2019.
(Continued)

*Primary Examiner* — Irfan Habib
(74) *Attorney, Agent, or Firm* — Conley Rose, P.C.

(57) ABSTRACT

A method of visual media processing, including: determining, for a conversion between a current video block of a visual media data and a bitstream representation of the visual media data, that a partitioning mode coding tool is disabled for the conversion based on a rule that depends on a dimension of the current video block; and performing the conversion based on the determining.

18 Claims, 41 Drawing Sheets

(a) second PU of Nx2N (b) second PU of 2NxN

Related U.S. Application Data continuation of application No. PCT/CN2021/113979, filed on Aug. 23, 2021, said application No. 17/705,509 is a continuation of application No. PCT/CN2020/118293, filed on Sep. 28, 2020.

(51) Int. Cl.
*H04N 19/137* (2014.01)
*H04N 19/159* (2014.01)
*H04N 19/176* (2014.01)
*H04N 19/70* (2014.01)

(52) U.S. Cl.
CPC ......... *H04N 19/159* (2014.11); *H04N 19/176* (2014.11); *H04N 19/70* (2014.11)

(56) References Cited

U.S. PATENT DOCUMENTS

| | | | |
|---|---|---|---|
| 9,088,770 B2 | 7/2015 | Zhang |
| 9,357,214 B2 | 5/2016 | Zhang |
| 9,432,685 B2 | 8/2016 | Chon |
| 9,491,461 B2 | 11/2016 | Chen |
| 9,538,180 B2 | 1/2017 | Zhang |
| 9,549,180 B2 | 1/2017 | Chen |
| 9,609,347 B2 | 3/2017 | Thirumalai |
| 9,699,450 B2 | 7/2017 | Zhang |
| 9,716,899 B2 | 7/2017 | Thirumalai |
| 9,749,645 B2 | 8/2017 | Li |
| 9,800,895 B2 | 10/2017 | Thirumalai |
| 9,924,168 B2 | 3/2018 | Zhang |
| 9,948,953 B2 | 4/2018 | Zhang |
| 10,045,014 B2 | 8/2018 | Zhang |
| 10,057,574 B2 | 8/2018 | Li |
| 10,057,594 B2 | 8/2018 | Xiu |
| 10,165,252 B2 | 12/2018 | An |
| 10,171,818 B2 | 1/2019 | Peng |
| 10,200,719 B2 | 2/2019 | Zhang |
| 10,218,975 B2 | 2/2019 | Chien |
| 10,264,271 B2 | 4/2019 | Li |
| 10,326,986 B2 | 6/2019 | Zhang |
| 10,362,330 B1 | 7/2019 | Li |
| 10,397,603 B1 | 8/2019 | Li |
| 10,448,010 B2 | 10/2019 | Chen |
| 10,462,439 B2 | 10/2019 | He |
| 10,469,847 B2 | 11/2019 | Xiu |
| 10,484,686 B2 | 11/2019 | Xiu |
| 10,506,230 B2 | 12/2019 | Zhang |
| 10,523,963 B1 | 12/2019 | Ye |
| 10,560,704 B2 | 2/2020 | Peng |
| 10,560,718 B2 | 2/2020 | Lee |
| 10,567,789 B2 | 2/2020 | Chen |
| 10,567,799 B2 | 2/2020 | Liu |
| 10,687,079 B2 | 6/2020 | Liu |
| 10,721,469 B2 | 7/2020 | Zhang |
| 10,721,489 B2 | 7/2020 | Chen |
| 10,735,749 B2 | 8/2020 | Li |
| 10,778,974 B2 | 9/2020 | Karczewicz |
| 10,785,494 B2 | 9/2020 | Chien |
| 10,855,985 B2 | 12/2020 | Zhang |
| 11,128,884 B2 | 9/2021 | Liu |
| 11,159,793 B2 | 10/2021 | Ahn |
| 11,463,687 B2 | 10/2022 | Zhang |
| 11,509,893 B2 | 11/2022 | Zhang |
| 11,575,911 B2 | 2/2023 | Zhang |
| 2005/0111545 A1 | 5/2005 | Prabhakar |
| 2008/0163383 A1 | 7/2008 | Kumar |
| 2009/0196342 A1 | 8/2009 | Divorra Escoda |
| 2010/0124286 A1 | 5/2010 | Wang |
| 2011/0176613 A1 | 7/2011 | Tsai |
| 2011/0200110 A1* | 8/2011 | Chen ............... H04N 19/615 375/E7.125 |
| 2011/0228854 A1 | 9/2011 | Shin |
| 2012/0177114 A1* | 7/2012 | Guo ............... H04N 19/176 375/E7.243 |
| 2012/0207227 A1 | 8/2012 | Tsai |
| 2013/0107973 A1 | 5/2013 | Wang |
| 2013/0188733 A1 | 7/2013 | Van der Auwera |
| 2013/0294513 A1 | 11/2013 | Seregin |
| 2013/0329007 A1 | 12/2013 | Zhang |
| 2013/0336406 A1 | 12/2013 | Zhang |
| 2014/0050266 A1 | 2/2014 | Zhang |
| 2014/0071235 A1 | 3/2014 | Zhang |
| 2014/0092978 A1 | 4/2014 | Bugdayci |
| 2014/0294067 A1 | 10/2014 | Li |
| 2015/0078457 A1 | 3/2015 | Hendry |
| 2015/0085929 A1 | 3/2015 | Chen |
| 2015/0271515 A1 | 9/2015 | Pang |
| 2015/0373359 A1 | 12/2015 | He |
| 2016/0100186 A1 | 4/2016 | Gisquet |
| 2016/0100190 A1 | 4/2016 | Pang |
| 2016/0105670 A1 | 4/2016 | Pang |
| 2016/0212438 A1 | 7/2016 | Andersson |
| 2016/0219278 A1 | 7/2016 | Chen |
| 2016/0234492 A1 | 8/2016 | Li |
| 2016/0337661 A1 | 11/2016 | Pang |
| 2017/0013269 A1 | 1/2017 | Kim |
| 2017/0054976 A1 | 2/2017 | Li |
| 2017/0094311 A1 | 3/2017 | Chou |
| 2017/0150186 A1 | 5/2017 | Zhang |
| 2017/0238020 A1 | 8/2017 | Karczewicz |
| 2017/0289566 A1 | 10/2017 | He |
| 2017/0332075 A1 | 11/2017 | Karczewicz |
| 2018/0041778 A1 | 2/2018 | Zhang |
| 2018/0041779 A1 | 2/2018 | Zhang |
| 2018/0048909 A1 | 2/2018 | Liu |
| 2018/0063543 A1 | 3/2018 | Reddy |
| 2018/0184127 A1 | 6/2018 | Zhang |
| 2018/0205946 A1 | 7/2018 | Zhang |
| 2018/0234701 A1 | 8/2018 | Zhang |
| 2018/0255295 A1 | 9/2018 | Lee |
| 2018/0343463 A1 | 11/2018 | Xiu |
| 2018/0352223 A1 | 12/2018 | Chen |
| 2019/0052886 A1 | 2/2019 | Chiang |
| 2019/0075328 A1 | 3/2019 | Huang |
| 2019/0104303 A1 | 4/2019 | Xiu |
| 2019/0116374 A1 | 4/2019 | Zhang |
| 2019/0208225 A1 | 7/2019 | Chen |
| 2019/0238845 A1 | 8/2019 | Zhang |
| 2019/0306502 A1 | 10/2019 | Gadde |
| 2019/0349599 A1 | 11/2019 | Li |
| 2020/0007864 A1 | 1/2020 | Li |
| 2020/0029073 A1* | 1/2020 | Chiang ............... H04N 19/52 |
| 2020/0145674 A1 | 5/2020 | Peng |
| 2020/0195959 A1 | 6/2020 | Zhang |
| 2020/0236384 A1 | 7/2020 | Xu |
| 2020/0267381 A1 | 8/2020 | Vanam |
| 2020/0322628 A1 | 10/2020 | Lee |
| 2020/0336748 A1 | 10/2020 | Li |
| 2020/0344494 A1 | 10/2020 | Hu |
| 2020/0366891 A1 | 11/2020 | Hu |
| 2020/0374542 A1 | 11/2020 | Zhang |
| 2020/0389655 A1 | 12/2020 | Seregin |
| 2020/0404263 A1 | 12/2020 | Hu |
| 2020/0413038 A1 | 12/2020 | Zhang |
| 2020/0413044 A1 | 12/2020 | Zhang |
| 2021/0006787 A1 | 1/2021 | Zhang |
| 2021/0006788 A1 | 1/2021 | Zhang |
| 2021/0006790 A1 | 1/2021 | Zhang |
| 2021/0021811 A1 | 1/2021 | Xu |
| 2021/0021856 A1 | 1/2021 | Zheng |
| 2021/0029374 A1 | 1/2021 | Zhang |
| 2021/0051324 A1 | 2/2021 | Zhang |
| 2021/0076029 A1 | 3/2021 | Han |
| 2021/0084325 A1 | 3/2021 | Lim |
| 2021/0092379 A1 | 3/2021 | Zhang |
| 2021/0092436 A1 | 3/2021 | Zhang |
| 2021/0105482 A1 | 4/2021 | Zhang |
| 2021/0120242 A1 | 4/2021 | Nam |
| 2021/0127129 A1 | 4/2021 | Zhang |
| 2021/0136407 A1 | 5/2021 | Aono |
| 2021/0152846 A1 | 5/2021 | Zhang |
| 2021/0160529 A1 | 5/2021 | Zhang |
| 2021/0160532 A1 | 5/2021 | Zhang |

(56) References Cited

U.S. PATENT DOCUMENTS

| | | |
|---|---|---|
| 2021/0176501 A1 | 6/2021 | Chen |
| 2021/0185342 A1 | 6/2021 | Zhang |
| 2021/0195216 A1 | 6/2021 | Peng |
| 2021/0195234 A1 | 6/2021 | Zhang |
| 2021/0211647 A1 | 7/2021 | Liu |
| 2021/0235073 A1 | 7/2021 | Liu |
| 2021/0235108 A1 | 7/2021 | Zhang |
| 2021/0250602 A1 | 8/2021 | Zhang |
| 2021/0258575 A1 | 8/2021 | Zhang |
| 2021/0266537 A1 | 8/2021 | Zhang |
| 2021/0266562 A1 | 8/2021 | Zhang |
| 2021/0281859 A1 | 9/2021 | Zhang |
| 2021/0281875 A1 | 9/2021 | Liu |
| 2021/0281877 A1 | 9/2021 | Liu |
| 2021/0297659 A1 | 9/2021 | Zhang |
| 2021/0314614 A1 | 10/2021 | Zhang |
| 2021/0314623 A1 | 10/2021 | Chang |
| 2021/0314628 A1 | 10/2021 | Zhang |
| 2021/0321092 A1 | 10/2021 | Zhang |
| 2021/0321095 A1 | 10/2021 | Zhang |
| 2021/0321121 A1 | 10/2021 | Zhang |
| 2021/0329227 A1 | 10/2021 | Zheng |
| 2021/0337232 A1 | 10/2021 | Zheng |
| 2021/0352312 A1 | 11/2021 | Zhang |
| 2021/0368171 A1 | 11/2021 | Zhang |
| 2021/0377524 A1 | 12/2021 | Zhang |
| 2021/0385446 A1 | 12/2021 | Liu |
| 2021/0385451 A1 | 12/2021 | Zhang |
| 2021/0392333 A1 | 12/2021 | Paluri |
| 2021/0392381 A1 | 12/2021 | Wang |
| 2021/0409684 A1 | 12/2021 | Wang |
| 2021/0409720 A1 | 12/2021 | Meng |
| 2022/0007053 A1 | 1/2022 | Hanhart |
| 2022/0014791 A1* | 1/2022 | Liu ............ H04N 19/517 |
| 2022/0030226 A1 | 1/2022 | Lee |
| 2022/0053186 A1 | 2/2022 | Paluri |
| 2022/0086433 A1 | 3/2022 | Zhang |
| 2022/0094914 A1* | 3/2022 | Zhang ............ H04N 19/58 |
| 2022/0103834 A1 | 3/2022 | Zhang |
| 2022/0132118 A1 | 4/2022 | Zhang |
| 2022/0132119 A1 | 4/2022 | Zhang |

FOREIGN PATENT DOCUMENTS

| | | |
|---|---|---|
| CN | 103081467 A | 5/2013 |
| CN | 103636225 A | 3/2014 |
| CN | 103942793 A | 7/2014 |
| CN | 104094605 A | 10/2014 |
| CN | 104126302 A | 10/2014 |
| CN | 104205838 A | 12/2014 |
| CN | 104838657 A | 8/2015 |
| CN | 105141957 A | 12/2015 |
| CN | 105308960 A | 2/2016 |
| CN | 105325003 A | 2/2016 |
| CN | 105379282 A | 3/2016 |
| CN | 105794206 A | 7/2016 |
| CN | 106464874 A | 2/2017 |
| CN | 106797476 A | 5/2017 |
| CN | 106797477 A | 5/2017 |
| CN | 106961606 A | 7/2017 |
| CN | 107079161 A | 8/2017 |
| CN | 107211154 A | 9/2017 |
| CN | 107211156 A | 9/2017 |
| CN | 107690810 A | 2/2018 |
| CN | 108028939 A | 5/2018 |
| CN | 108141605 A | 6/2018 |
| CN | 108353184 A | 7/2018 |
| CN | 108370441 A | 8/2018 |
| CN | 108449599 A | 8/2018 |
| CN | 108462873 A | 8/2018 |
| CN | 108605126 A | 9/2018 |
| CN | 108713320 A | 10/2018 |
| CN | 108886620 A | 11/2018 |
| CN | 109076218 A | 12/2018 |
| CN | 109076236 A | 12/2018 |
| CN | 109479139 A | 3/2019 |
| CN | 109496430 A | 3/2019 |
| CN | 109743576 A | 5/2019 |
| CN | 109792515 A | 5/2019 |
| EP | 2173100 A2 | 4/2010 |
| GB | 2539213 A | 12/2016 |
| JP | 2013085234 A | 5/2013 |
| JP | 2017535180 A | 11/2017 |
| JP | 2018530249 A | 10/2018 |
| JP | 2020017970 A | 1/2020 |
| TW | 201201526 A | 1/2012 |
| TW | 201820872 A | 6/2018 |
| WO | 2012097740 A1 | 7/2012 |
| WO | 2013159643 A1 | 10/2013 |
| WO | 2015038877 A1 | 3/2015 |
| WO | 2015106121 A1 | 7/2015 |
| WO | 2015180014 A1 | 12/2015 |
| WO | 2016061245 A1 | 4/2016 |
| WO | 2016138854 A1 | 9/2016 |
| WO | 2017082670 A1 | 5/2017 |
| WO | 2017162911 A1 | 9/2017 |
| WO | 2017197126 A1 | 11/2017 |
| WO | 2018155986 A2 | 8/2018 |
| WO | 2018161954 A1 | 9/2018 |
| WO | 2018166357 A1 | 9/2018 |
| WO | 2019001734 A1 | 1/2019 |
| WO | 2019079611 A1 | 4/2019 |
| WO | 2019107927 A1 | 6/2019 |
| WO | 2020184555 A1 | 9/2020 |

OTHER PUBLICATIONS

Zhang et al. "Non-CE8: Simplified Ibc Bv Candidate List Construction Process," Joint Video Experts Team (JVET) of TU-T SG 16 WP 3 and ISO/IEC JTC 1/SC 29/WG 11 15th Meeting: Gothenburg, SE, Jul. 3-12, 2019, document JVET-O0626, 2019.

Nam et al. "CE8-related: Default Candidates for IBC Merge Mode," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0460, 2019.

Nam et al., "CE8-1.1: Block Vector Prediction for IBC," Joint Video Experts Team (JVET) of ITU-T SG 16 WP 3 and ISO/IEC JTC 1/SC 29/WG 1114th Meeting: Geneva, CH, Mar. 19-27, 2019, document JVET-N0457, 2019.

Zhao et al., "CE2: History Based Affine Motion Candidate (Test 2.2.3)," Joint Video Experts Team (JVET) of ITU-T SG 6 WP 3 and ISO/IEC JTC 1/SC 29/WG 11 13th Meeting: Marrakech, MA, Jan. 9-18, 2019, document JVET-M0125, 2019.

Yu et al. "CE4-Related: On MVP Candidate List Generation for AMVP," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0117, 2019.

Gao et al. "Non-CE8: IBC Merge List Simplification," Joint Video Experts Team (JVET) of ITU-T SG 16 WP 3 and ISO, IEC JTC 1/SC 29/WG 1114th Meeting: Geneva, CH, Mar. 19-27, 2019, document JVET-N0176, 2019.

Zhang et al. "Non-CE4: Cleanups on Syntax Design for Sub-Block Coding Tools," Joint Video Experts Team (JVET) of ITU-T SG 16 WP 3 and ISO/IEC JTC 1/SC 29NvG 11 15th Meeting: Gothenburg, SE, Jul. 3-12, 2019, document JVET-O0263, 2019.

Chen et al. "Non-CE4/8: On Disabling Blending Process in TPM," Joint Video Experts Team (JVET) of Itu-T Sg 16 WP 3 and Iso/Iec Jtc 1/SC 29/WG 11 15th Meeting: Gothenburg, SE, Jul. 3-17, 2019, document JVET-01172, 2019.

Chubach et al. "CE5-Related: On the Syntax Constraints of ALF APS," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0288, 2019.

Paluri et al. "AH17 Simplification of ALF Coefficients in the APS," Joint Video Experts Team {JVET) of ITU-T SG 16 WP 3 and ISO/IEC JTC 1/SC 29/WG 11 15th Meeting: Gothenburg, SE, Jul. 3-12, 2019, document JVET-O0302, 2019.

Huang et al. "Non-CE4: Merge Modes Signaling," Joint Video Experts Team (JVET) of ITU-T SG 16 WP 3 and ISO/IEC JTC 1/SC 29/WG 1115th Meeting: Gothenburg, SE, Jul. 3-12, 2019, document JVET-O0249, 2019.

(56) References Cited

OTHER PUBLICATIONS

Esenlik et al. "BoG Report on CE9 Decoder Motion Vector Derivation Related Contributions," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O1100, 2019.
Blasi et al. "Non-CE4: CIIP Using Triangular Partitions," Joint Video Experts Team (JVET) of ITU-T SG 16 WP 3 and ISO/IEC JTC 1/SC 29/WG 1115th Meeting: Gothenburg, SE, Jul. 3-12, 2019, document JVET-O0522, 2019.
Chen et al. "BoG Report on CE4 Inter Prediction with Merge Modifications," Joint Video Experts Team (JVET) of ITU-T SG 16 WP 3 and ISO/IEC JTC 1/SC 29/WG 1115th Meeting: Gothenburg, SE, Jul. 3-17, 2019, document JVET-O1039, 2019.
Esenlik et al. "BoG Report on CE9 Decoder Motion Vector Derivation Related Contributions," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0815, 2019.
Chen et al. "Crosscheck of JVET-N0150 (AHG12: One CTU Delay Wavefront Parallel Processing)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0646, 2019.
Chien et al. "Methodology and Reporting Template for Tool Testing," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2005, 2019.
Bross et al. "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N1001-v7, 2019.
Retrieved on the Internet: https://vcgit.hhi.fraunhofer.de/jvet/VVCSoftware_VTM/tags/VTM-5.0, Jun. 14, 2022.
Ku et al. "CE8-Related: Combination Test of JVET-N0176/JVET-N0317/JVET-N0382 on Simplification of IBC Vector Prediction," Joint Video Experts Team (JVET) of ITU-T SG 16 WP 3 and ISO/IEC JTC 1/SC 29/WG 1114th Meeting: Geneva, CH, Mar. 19-27, 2019, documentJVET-N0843, 2019.
Wang et al. "CE4-Related: An Improved Method for Triangle Merge List Construction," Joint Video Experts Team JVET) of ITU-T SG 16 WP 3 and 1SO/IEC JTC 1/SC 29NvG 1114th Meeting: Geneva, CH, Mar. 19-27, 2019, document JVET-N0340, 2019.
Jeong et al. "CE4 Ultimate Motion Vector Expression (Test 4.5.4)," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0054, 2018.
Chiang et al. "CE10.1.1: Multi-Hypothesis Prediction for Improving AMVP Mode, Skip or Merge Mode, and Intra Mode," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0100, 2018.
Bross et al. "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N1001-v2, 2019.
Sethuraman et al. "CE9: Results of DMVR Related Tests CE9.2.1 and CE9.2.2," Joint Video Experts Team (JVET) of ITU-T SG 16 WP 3 and ISO/IEC JTC 1/SC 29NvG 1113th Meeting: Marrakech, MA, Jan. 9-18, 2019, document JVET-M0147, 2019.
"Information Technology—High Efficiency Coding and Media Delivery in Heterogeneous Environments—Part 2: High Efficiency Video Coding" Apr. 20, 2018, ISO/DIS 23008, 4th Edition.
Rosewarne et al. "High Efficiency Video Coding {HEVC) Test Model 16 {HM 16) Improved Encoder Description Update 7," Joint Collaborative Team on Video Coding (JCT-VC)of ITU-T SG16 WP3 and ISO/IEC JTC1/SC29/ WG 11 25th Meeting: Chengdu, CN, Oct. 14-21, 2016, document JCTVC-Y1002, 2016.
Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
Retrieved From the Internet: https://jvet.hhi.fraunhofer.de/svn/svn_HMJEMSoftware/tags/ HM-16.6-JEM-7.0. Jun. 14, 2022.
Zhao et al. "Non-CE6: Configurable Max Transform Size in WC," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0545, 019.
Gao et al. "CE4: CE4-1.1, CE4-1.2 and CE4-1.14: Geometric Merge Mode (GEO)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0068, 2019.
Xiu et al. "CE9-Related: Complexity Reduction and Bit-Width Control for Bi-Directional Optical Flow (BIO)," Joint Video Experts Team (JVET) of ITU-T SG 16 WP 3 and ISO/IEC JTC 1/SC 29NvG 11 12th Meeting: Macao, CN, Oct. 3-12, 2018, document JVET-L0256, 2018.
Chujoh et al. "Non-CE9: An Improvement of BDOF," Joint Video Experts Team (JVET) of ITU-T SG 16 WP 3 and ISO/IEC JTC 1/SC 29/WG 1113th Meeting: Marrakech, MA, Jan. 9-18, 2019, document JVET-M0063, 2019.
Xiu et al. "CE9.1: Simplifications on Bi-Directional Optical Flow (BDOF)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0487, 2019.
Bross et al. "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2001, 2019.
Sarwer et al. "AHG9: Transform and Transform-Skip Related HLS Clean-Up," Joint Video Experts Team (JVET) of ITU-T SG 16 WP 3 and ISO/IEC JTC 1/SC 29/WG 11, 18th Meeting, by teleconference, Apr. 15-24, 2020, document JVET-R0097, 2020.
Nam et al. "CE8: Block Vector Prediction for CPR (Test 8.1.1a and Test 8.1.1b)." Joint Video Exploration Team of ISO/IEC JTC 1/SC 29/WG 11 and ITU-T SG 16, Jan. 9-18, 2019, document JVET-M0332, 2019.
Chen et al. "Algorithm Description for Versatile Video Coding and Test Model 5 (VTM 5)," Joint Video Experts Team JVET) of ITU-T SG 16 WP 3 and ISO/IEC JTC 1/SC 29/WG 11 14th Meeting, Geneva, CH Mar. 19-27, 2019, document JVET-N1002, 2019.
Document: JVET-N0362-v2, Zhao, X., "Non-CE6: Configurable max transform size in VVC," Joint Video Experts Team (JVET) of ITU-T SG 16 WP 3 and ISO/IEC JTC 1/SC 29/WG 11 14th Meeting: Geneva, CH, Mar. 19-27, 2019, 24 pages.
Document: JVET-N1001-v10, Bross, B., et al., "Versatile Video Coding (Draft 5)," Joint Video Experts Team (JVET) of ITU-T SG 16 WP3 and ISO/IEC JTC 1/SC 29/WG 11, 14th Meeting: Geneva, CH Jul. 2, 2019, 407 pages.
Document: JVET-P0405, Deng, Z., et al., "Non-CE6: Cleanups of maximum transform size related syntax elements," Joint Video Experts Team (JVET) of ITU-T SG 16 WP 3 and ISO/IEC JTC 1/SC 29/WG 11 16th Meeting: Geneva, CH, Oct. 1-11, 2019, 3 pages.
Extended European Search Report from European Patent Application No. 20817785.7 dated Jan. 2, 2023 (19 pages).
Partial European Search Report from European Patent Application No. 20817785.7 dated Sep. 21, 2022 (16 pages).
Extended European Search Report from European Patent Application No. 20840562.1 dated Jul. 25, 2022 (9 pages).
International Search Report and Written Opinion from International Patent Application No. PCT/CN2020/094305 dated Sep. 10, 2020 (16 pages).
International Search Report and Written Opinion from International Patent Application No. PCT/CN2020/094306 dated Aug. 31, 2020 (13 pages).
International Search Report and Written Opinion from International Patent Application No. PCT/CN2020/094310 dated Sep. 3, 2020 (13 pages).
International Search Report and Written Opinion from International Patent Application No. PCT/CN2020/101805 dated Oct. 13, 2020 (11 pages).

(56) References Cited

OTHER PUBLICATIONS

International Search Report and Written Opinion from International Patent Application No. PCT/CN2020/101819 dated Oct. 15, 2020 (9 pages).
Document: JVET-P0325-v1, Wang, Z., et al., "Non-CE4: Construction of spatial merge candidates," Joint Video Experts Team (JVET) of ITU-T SG 16 WP 3 and ISO/IEC JTC 1/SC 29/WG 11 16th Meeting: Geneva, CH, Oct. 1-11, 2019, 3 pages.
Foreign Communication From a Related Counterpart Application, European Application No. 20818357.4, Extended European Search Report dated May 11, 2023, 15 pages.
Document: JVET-N0024-v1, Yang, H., "CE4: Summary report on inter prediction and motion vector coding," Joint Video Experts Team (JVET) of ITU-T SG 16 WP 3 and ISO/IEC JTC 1/SC 29/WG 11 14th Meeting: Geneva, CH, Mar. 19-27, 2019, 21 pages.
Document: JVET-O2002-v1, Chen, J., "Algorithm description for Versatile Video Coding and Test Model 6 (VTM 6)," Joint Video Experts Team (JVET) of ITU-T SG 16 WP 3 and ISO/IEC JTC 1/SC 29/WG 11 15th Meeting: Gothenburg, SE, Jul. 3-12, 2019, 82 pages.
JCTVC-AA1002-v1, Rosewarne, C., "High Efficiency Video Coding (HEVC) Test Model 16 (HM 16) Improved Encoder Description Update 8," Joint Collaborative Team on Video Coding (JCT-VC) of ITU-T SG16 WP3 and ISO/IEC JTC1/SC29/WG11, 27th meeting: Hobart, AU, Mar.31-Apr. 7, 2017, 16 pages.
International Search Report and Written Opinion from International Patent Application No. PCT/CN2020/101820 dated Oct. 20, 2020 (10 pages).
International Search Report and Written Opinion from International Patent Application No. PCT/CN2020/118293 dated Dec. 30, 2020 (10 pages).
Non Final Office Action from U.S. Appl. No. 17/538,916 dated Feb. 16, 2022.
Non Final Office Action from U.S. Appl. No. 17/538,947 dated Feb. 17, 2022.
Ex Parte Quayle Office Action from U.S. Appl. No. 17/540,068 dated Feb. 22, 2022.
Examination Report from Indian Patent Application No. 202127056138 mailed May 10, 2022.
Examination Report from Indian Patent Application No. 202127056150 mailed May 10, 2022.
Non Final Office Action from U.S. Appl. No. 17/572,785 dated Mar. 30, 2022.
Non Final Office Action from U.S. Appl. No. 17/572,833 dated Apr. 28, 2022.
Non Final Office Action from U.S. Appl. No. 17/705,509 dated Jun. 27, 2022.
Document: JVET-N1001-v6, Bross, B., et al., "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, 379 pages.
Document: JVET-L0266-v1, Zhang, L., et al., "CE4: History-based Motion Vector Prediction (Test 4.4.7)," Joint Video Experts Team (JVET) of ITU-T SG 16 WP 3 and ISO/IEC JTC 1/SC 29/WG 11 12th Meeting: Macao, CN, Oct. 3-12, 2018, 4 pages.
Document: JVET-M0405-v1, Xu, X., et al., "CE4-related: Simplified merge candidate list for small blocks," Joint Video Exploration Team (JVET) of ITU-T SG 16 WP 3 and ISO/IEC JTC 1/SC 29/WG 11 13th Meeting: Marrakesh, MA, Jan. 9-18, 2019, 3 pages.
Murakami, A., et al., "High-efficiency image symbolization technology," High Efficiency Video Coding, HEVC/H.265, NOSE, May 26, 2022, 39 pages.
Non-Final Office Action from U.S. Appl. No. 18/173,306 dated Feb. 1, 2024, 67 pages.
Document: JVET-O0309, Ko, G., et al., "Non-CE4: Merge mode signalling overhead reduction," Joint Video Experts Team (JVET) of ITU-T SG 16 WP 3 and ISO/IEC JTC 1/SC 29/WG 11 15th Meeting: Gothenburg, SE, Jul. 3-12, 2019, 8 pages.
Document: JVET-O0660-r1, Panusopone, K., et al., Simplification of MV storage for blending blocks in triangle mode , Section 1, Jul. 12, 2019.

\* cited by examiner

FIG. 7

FIG. 16 performing a conversion between a first video unit of a visual media data and a bitstream representation of the visual media data, wherein the bitstream representation is configured in accordance with a format rule specifying that a first syntax element indicative of usage of a partitioning mode coding tool is signaled in the bitstream representation prior to a second syntax element indicative of usage of a combined inter-intra prediction (CIIP) coding tool for the first video unit, and wherein, in the combined inter intra prediction (CIIP) mode, a final prediction of a video unit is based on a weighted sum of an inter prediction of the video unit and an intra prediction of the video unit

FIG. 41

GEOMETRIC PARTITIONING MODE IN VIDEO CODING

CROSS-REFERENCE TO RELATED APPLICATION

This application is a continuation of U.S. application Ser. No. 17/705,509, filed on Mar. 28, 2022, which is a continuation of International Patent Application No. PCT/CN2020/118293, filed on Sep. 28, 2020, which claims the priority to and benefits of International Patent Application No. PCT/CN2019/108797 filed on Sep. 28, 2019. All the aforementioned patent applications are hereby incorporated by reference in their entireties.

TECHNICAL FIELD

This document is related to video and image coding and decoding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video or image decoder or encoder embodiments to perform coding or decoding of video bitstreams using non-rectangular partitioning such as a triangular partitioning mode.

In one example aspect, a method of video processing is disclosed. The method includes determining, for a conversion between a current video block of a visual media data and a bitstream representation of the visual media data, that a partitioning mode coding tool is disabled for the conversion based on a rule that depends on a dimension of the current video block; and performing the conversion based on the determining.

In another example aspect, a method of video processing is disclosed. The method includes determining, for a conversion between a current video block of a visual media data and a bitstream representation of the visual media data, based on a rule, applicability of a prediction with optical refinement (PROF) coding tool in which a prediction of the current video block is refined using an optical flow model; and performing the conversion according to the determining, wherein the rule is based on at least three factors including (1) a slice type of a slice in which the current video block is located, (2) whether a decoder side motion vector refinement (DMVR) coding tool is enabled for the current video block, and/or (3) whether a bidirectional optical flow (BDOF) coding tool is enabled for the current video block.

In another example aspect, a method of video processing is disclosed. The method includes performing a conversion between a first video unit of a visual media data and a bitstream representation of the visual media data, wherein the bitstream representation is configured in accordance with a format rule specifying that a first syntax element indicative of usage of a partitioning mode coding tool is signaled in the bitstream representation prior to a second syntax element indicative of usage of a combined inter-intra prediction (CIIP) coding tool for the first video unit, and wherein, in the combined inter intra prediction (CIIP) mode, a final prediction of a video unit is based on a weighted sum of an inter prediction of the video unit and an intra prediction of the video unit.

In another example aspect, the above-described methods may be implemented by a video decoder apparatus that comprises a processor.

In another example aspect, the above-described methods may be implemented by a video encoder apparatus that comprises a processor.

In yet another example aspect, these methods may be embodied in the form of processor-executable instructions and stored on a computer-readable program medium.

In yet another example aspect, these methods may be embodied in the form of bitstream representations stored in a computer readable storage medium.

These, and other, aspects are further described in the present document.

BRIEF DESCRIPTION OF THE DRAWINGS

FIG. 7 shows example of combined bi-predictive merge candidate.

FIG. 16 shows an example of motion vector storage.

FIG. 41 is a flowchart for an example of a visual media processing method.

DETAILED DESCRIPTION

Figure 1:
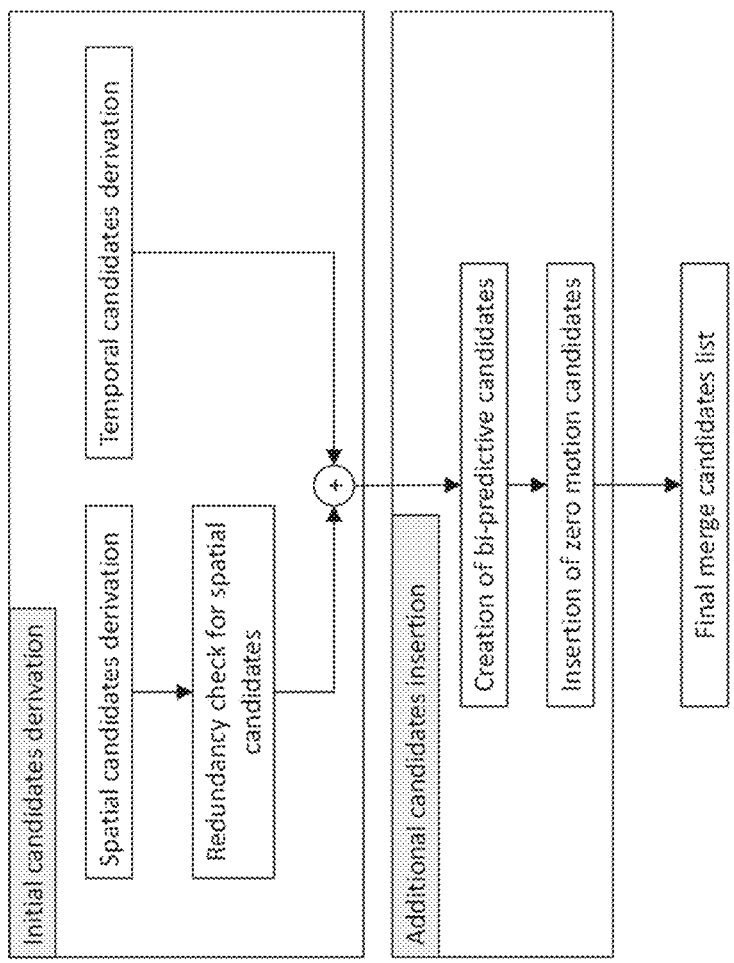
FIG. 1 shows a derivation process for merge candidate list construction.

The present document provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. BRIEF SUMMARY

This document is related to video coding technologies. Specifically, it is related to merge coding including triangular prediction mode. It may be applied to the existing video coding standard like high efficiency video coding (HEVC), or the standard (Versatile Video Coding) to be finalized. It may be also applicable to future video coding standards or video codec.

2. INITIAL DISCUSSION

Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 5) could be found at: http://phenix.it-sudparis.eu/jvet/doc_end_user/documents/14_Geneva/wg11/JVET-N1001-v7.zip The latest reference software of VVC, named VTM, could be found at: https://vcgit.hhi.fraunhofer.de/jvet/VVCSoftware_VTM/tags/VTM-5.0

2.1 Inter Prediction in HEVC/H.265

For inter-coded coding units (CUs), it may be coded with one prediction unit (PU), 2 PUs according to partition mode. Each inter-predicted PU has motion parameters for one or two reference picture lists. Motion parameters include a motion vector and a reference picture index. Usage of one of the two reference picture lists may also be signalled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighbouring PUs, including spatial and temporal candidates. The merge mode can be applied to any inter-predicted PU, not only for skip mode. The alternative to merge mode is the explicit transmission of motion parameters, where motion vector (to be more precise, motion vector differences (MVD) compared to a motion vector predictor), corresponding reference picture index for each reference picture list and reference picture list usage are signalled explicitly per each PU. Such a mode is named Advanced motion vector prediction (AMVP) in this disclosure.

When signalling indicates that one of the two reference picture lists is to be used, the PU is produced from one block of samples. This is referred to as 'uni-prediction'. Uni-prediction is available both for P-slices and B-slices.

When signalling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.1.1 Reference Picture List

In HEVC, the term inter prediction is used to denote prediction derived from data elements (e.g., sample values or motion vectors) of reference pictures other than the current decoded picture. Like in H.264/AVC, a picture can be predicted from multiple reference pictures. The reference pictures that are used for inter prediction are organized in one or more reference picture lists. The reference index identifies which of the reference pictures in the list should be used for creating the prediction signal.

A single reference picture list, List 0, is used for a P slice and two reference picture lists, List 0 and List 1 are used for B slices. It should be noted reference pictures included in List 0/1 could be from past and future pictures in terms of capturing/display order.

2.1.2 Merge Mode
2.1.2.1 Derivation of Candidates for Merge Mode

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
    Step 1.1: Spatial candidates derivation
    Step 1.2: Redundancy check for spatial candidates
    Step 1.3: Temporal candidates derivation
Step 2: Additional candidates insertion
    Step 2.1: Creation of bi-predictive candidates
    Step 2.2: Insertion of zero motion candidates These steps are also schematically depicted in FIG. 1. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

2.1.2.2 Spatial Candidates Derivation

Figure 2:
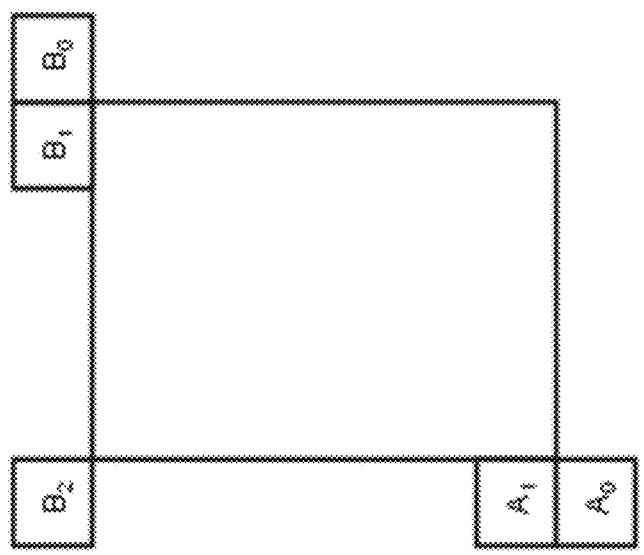
FIG. 2 shows an example of positions of spatial merge candidates.
Figure 3:
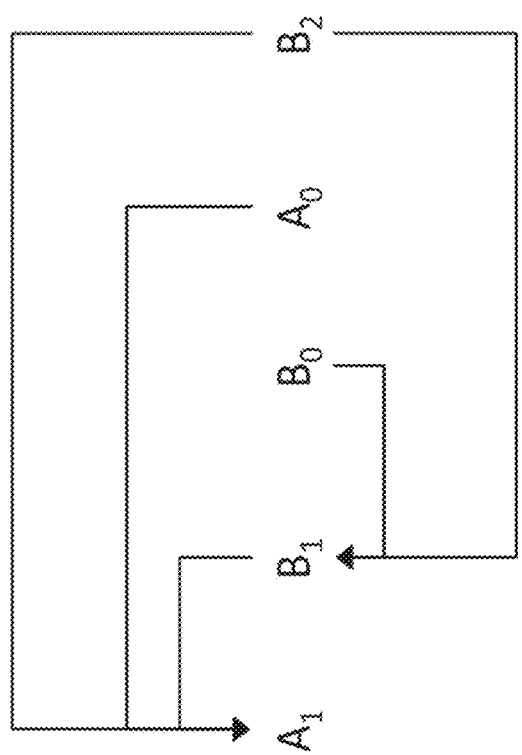
FIG. 3 shows an example of candidate pairs considered for redundancy check of spatial merge candidates.
Figure 4:
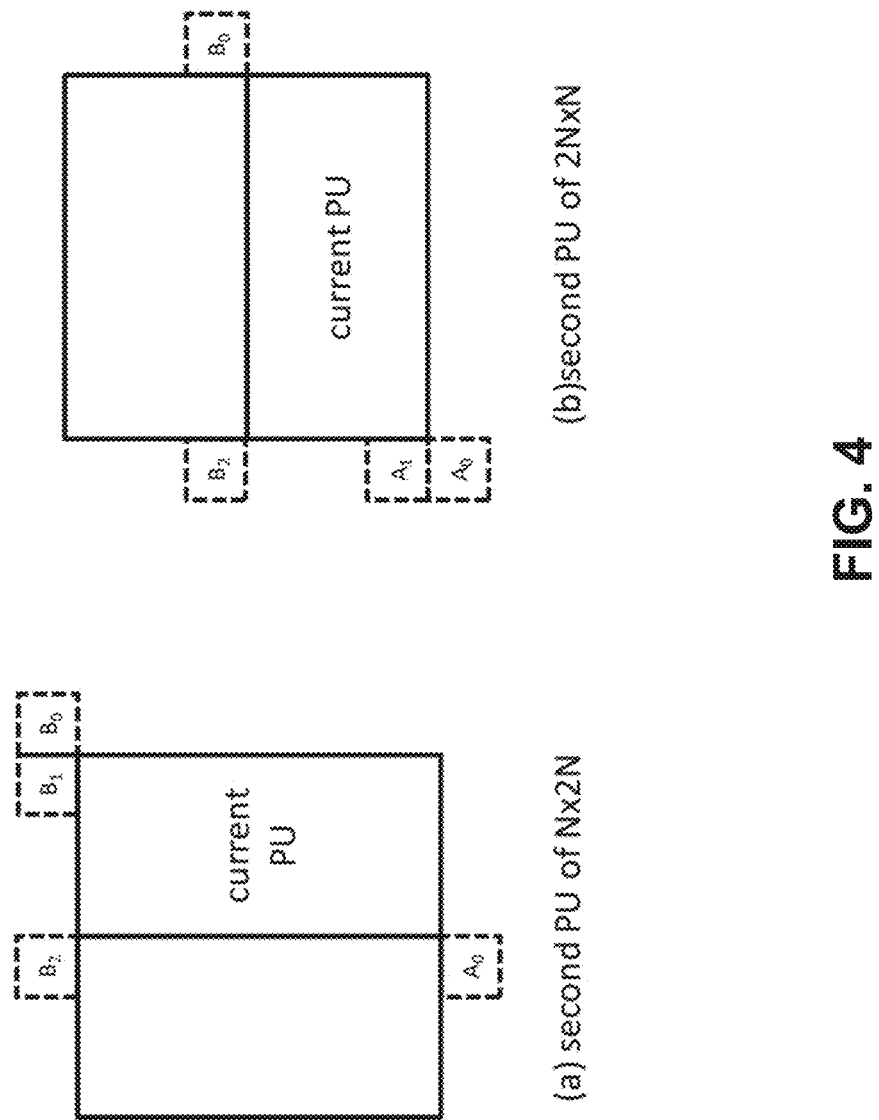
FIG. 4 shows an example positions for the second prediction unit (PU) of N×2N and 2N×N partitions.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIG. 4 depicts the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

2.1.2.3 Temporal Candidates Derivation

In this step, only one candidate is added to the list. Particularly, in the derivation of this temporal merge candidate, a scaled motion vector is derived based on co-located PU in a co-located picture. The scaled motion vector for temporal merge candidate is obtained as illustrated by the dotted line in FIG. 5, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification [1]. For a B-slice, two motion vectors, one is for reference picture list 0 and the other is for reference picture list 1, are obtained and combined to make the bi-predictive merge candidate.

2.1.2.4 Co-Located Picture and Co-Located PU

When TMVP is enabled (i.e., slice_temporal_mvp_enabled_flag is equal to 1), the variable ColPic representing the col-located picture is derived as follows:

If current slice is B slice and the signalled collocated_from_l0_flag is equal to 0, ColPic is set equal to RefPicList1[collocated_ref_idx].
    Otherwise (slice_type is equal to B and collocated_from_l0_flag is equal to 1, or slice_type is equal to P), ColPic is set equal to RefPicList0[collocated_ref_idx].

wherein collocated_ref_idx and collocated_from_l0_flag are two syntax elements which may be signalled in slice header.

Figure 6:
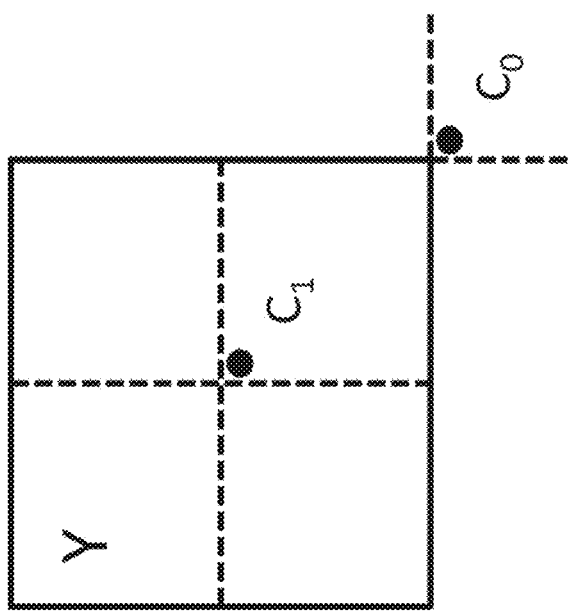
FIG. 6 shows an example of candidate positions for temporal merge candidate, C0 and C1.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current coding tree unit (CTU) aka. LCU (largest coding unit)) row, position $C_1$ is used. Otherwise, position $C_0$ is used in the derivation of the temporal merge candidate.

Related syntax elements are described as follows:

7.3.6.1 General Slice Segment Header Syntax

|  | Descriptor |
|---|---|
| slice_segment_header( ) { | |
|   first_slice_segment_in_pic_flag | u(1) |
|   ... | |
|   if( slice_type = = P | | slice_type = = B ) { | |
|     num_ref_idx_active_override_flag | u(1) |
|     if( num_ref_idx_active_override_flag ) { | |
|       num_ref_idx_l0_active_minus1 | ue(v) |
|       if( slice_type = = B ) | |
|       num_ref_idx_l1_active_minus1 | ue(v) |
|     } | |
|   ... | |
|   IF( SLICE_TEMPORAL_MVP_ENABLED_FLAG ) { | |
|     IF( SLICE TYPE = = B ) | |
|       COLLOCATED FROM L0 FLAG | U(1) |
|     IF( ( COLLOCATED_FROM_L0_FLAG && NUM_REF_IDX_L0_ACTIVE_MINUS1 > 0 ) | | ( !COLLOCATED_FROM_L0_FLAG && NUM_REF_IDX_L1_ACTIVE_MINUS1 > 0 ) ) | |
|       COLLOCATED_REF_IDX | UE(V) |
|   } | |

-continued

| | Descriptor |
|---|---|
| ... byte_alignment( ) } | |

2.1.2.5 Derivation of MVs for the TMVP Candidate

More specifically, the following steps are performed in order to derive the TMVP candidate:

1) set reference picture list X=0, target reference picture to be the reference picture with index equal to 0 (i.e., curr_ref) in list X. Invoke the derivation process for collocated motion vectors to get the MV for list X pointing to curr_ref.

2) if current slice is B slice, set reference picture list X=1, target reference picture to be the reference picture with index equal to 0 (i.e., curr_ref) in list X. Invoke the derivation process for collocated motion vectors to get the MV for list X pointing to curr_ref.

The derivation process for collocated motion vectors is described in the next sub-section 2.1.2.5.1.

2.1.2.5.1 Derivation Process for Collocated Motion Vectors

For the co-located block, it may be intra or inter coded with uni-prediction or bi-prediction. If it is intra coded, TMVP candidate is set to be unavailable.

If it is uni-prediction from list A, the motion vector of list A is scaled to the target reference picture list X.

If it is bi-prediction and the target reference picture list is X, the motion vector of list A is scaled to the target reference picture list X, and A is determined according to the following rules:

If none of reference pictures has a greater POC values compared to current picture, A is set equal to X.
Otherwise, A is set equal to collocated_from_l0_flag.

The related working draft in JCTVC-W1005-v4 is described as follows:

8.5.3.2.9 Derivation Process for Collocated Motion Vectors

Inputs to this process are:—
- a variable currPb specifying the current prediction block,
- a variable colPb specifying the collocated prediction block inside the collocated picture specified by ColPic,
- a luma location (xColPb, yColPb) specifying the top-left sample of the collocated luma prediction block specified by colPb relative to the top-left luma sample of the collocated picture specified by ColPic,
- a reference index refIdxLX, with X being 0 or 1.

Outputs of this process are:
- the motion vector prediction mvLXCol,
- the availability flag availableFlagLXCol.

The variable currPic specifies the current picture.

The arrays predFlagL0Col[x][y], mvL0Col[x][y], and refIdxL0Col[x][y] are set equal to PredFlagL0[x][y], MvL0[x][y], and RefIdxL0[x][y], respectively, of the collocated picture specified by ColPic, and the arrays predFlagL1Col[x][y], mvL1Col[x][y], and refIdxL1Col[x][y] are set equal to PredFlagL1[x][y], MvL1[x][y], and RefIdxL1[x][y], respectively, of the collocated picture specified by ColPic.

The variables mvLXCol and availableFlagLXCol are derived as follows:

If colPb is coded in an intra prediction mode, both components of mvLXCol are set equal to 0 and availableFlagLXCol is set equal to 0.

Otherwise, the motion vector mvCol, the reference index refIdxCol, and the reference list identifier listCol are derived as follows:

If predFlagL0Col[xColPb][yColPb] is equal to 0, mvCol, refIdxCol, and listCol are set equal to mvL1Col[xColPb][yColPb], refIdxL1Col[xColPb][yColPb], and L1, respectively.

Otherwise, if predFlagL0Col[xColPb][yColPb] is equal to 1 and predFlagL1Col[xColPb][yColPb] is equal to 0, mvCol, refIdxCol, and listCol are set equal to mvL0Col[xColPb][yColPb], refIdxL0Col[xColPb][yColPb], and L0, respectively.

Otherwise (predFlagL0Col[xColPb][yColPb] is equal to 1 and predFlagL1Col[xColPb][yColPb] is equal to 1), the following assignments are made:

If NoBackwardPredFlag is equal to 1, mvCol, refIdxCol, and listCol are set equal to mvLXCol[xColPb][yColPb], refIdxLXCol[xColPb][yColPb], and LX, respectively.

Otherwise, mvCol, refIdxCol, and listCol are set equal to mvLNCol[xColPb][yColPb], refIdxLNCol[xColPb][yColPb], and LN, respectively, with N being the value of collocated_from_l0_flag.

and mvLXCol and availableFlagLXCol are derived as follows:

If LongTermRefPic(currPic, currPb, refIdxLX, LX) is not equal to LongTermRefPic(ColPic, colPb, refIdxCol, listCol), both components of mvLXCol are set equal to 0 and availableFlagLXCol is set equal to 0.

Otherwise, the variable availableFlagLXCol is set equal to 1, refPicListCol[refIdxCol] is set to be the picture with reference index refIdxCol in the reference picture list listCol of the slice containing prediction block colPb in the collocated picture specified by ColPic, and the following applies:

$$colPocDiff = DiffPicOrderCnt(ColPic, refPicListCol[refIdxCol]) \tag{2-1}$$

$$currPocDiff = DiffPicOrderCnt(currPic, RefPicListX[refIdxLX]) \tag{2-2}$$

If RefPicListX[refIdxLX] is a long-term reference picture, or colPocDiff is equal to currPocDiff, mvLXCol is derived as follows:

$$mvLXCol = mvCol \tag{2-3}$$

Otherwise, mvLXCol is derived as a scaled version of the motion vector mvCol as follows:

$$tx = (16384 + (Abs(td) >> 1))/td \tag{2-4}$$

$$distScaleFactor = Clip3(-4096, 4095, (tb*tx+32) >> 6) \tag{2-5}$$

$$mvLXCol = Clip3(-32768, 32767, Sign(distScaleFactor*mvCol)*((Abs(distScaleFactor*mvCol)+127) >> 8)) \tag{2-6}$$

where td and tb are derived as follows:

$$td = Clip3(-128, 127, colPocDiff) \tag{2-7}$$

$$tb = Clip3(-128, 127, currPocDiff) \tag{2-8}$$

Definition of NoBackwardPredFlag is:
The variable NoBackwardPredFlag is derived as follows:
If DiffPicOrderCnt(aPic, CurrPic) is less than or equal to 0 for each picture aPic in RefPicList0 or RefPicList1 of the current slice, NoBackwardPredFlag is set equal to 1.
Otherwise, NoBackwardPredFlag is set equal to 0.

2.1.2.6 Additional Candidates Insertion

Figure 7:
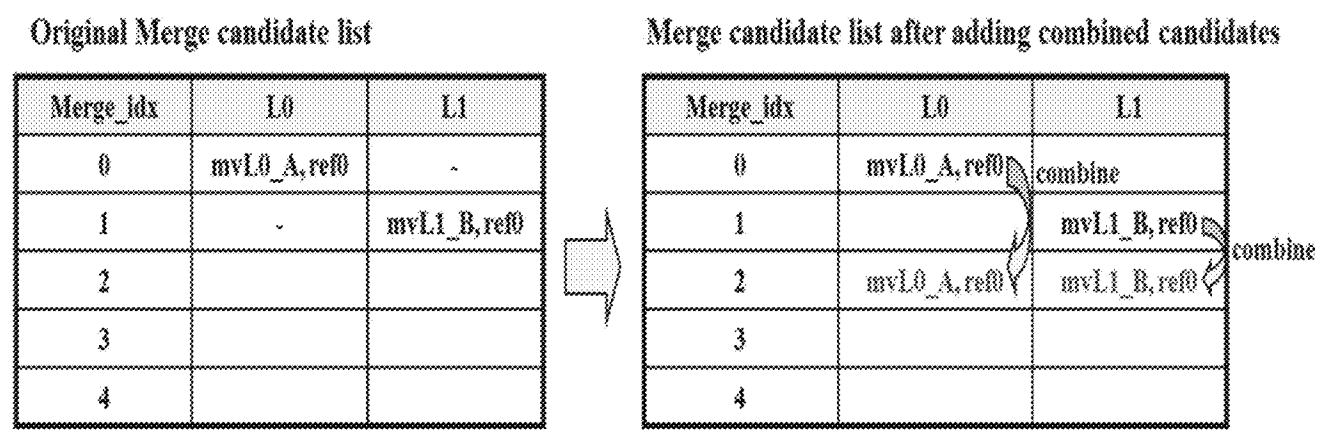

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 7 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates, defined in [1].

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. Finally, no redundancy check is performed on these candidates.

2.1.3 AMVP

AMVP exploits spatio-temporal correlation of motion vector with neighbouring PUs, which is used for explicit transmission of motion parameters. For each reference picture list, a motion vector candidate list is constructed by firstly checking availability of left, above temporally neighbouring PU positions, removing redundant candidates and adding zero vector to make the candidate list to be constant length. Then, the encoder can select the best predictor from the candidate list and transmit the corresponding index indicating the chosen candidate. Similarly with merge index signalling, the index of the best motion vector candidate is encoded using truncated unary. The maximum value to be encoded in this case is 2 (see FIG. 8). In the following sections, details about derivation process of motion vector prediction candidate are provided.

2.1.3.1 Derivation of AMVP Candidates

Figure 8:
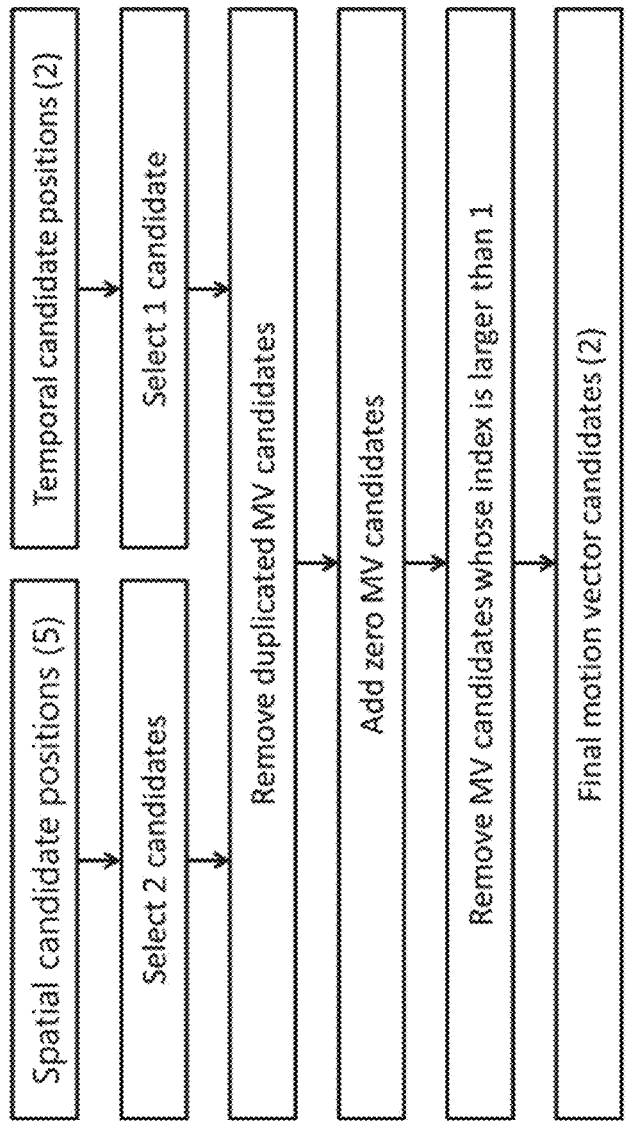
FIG. 8 shows examples of derivation process for motion vector prediction candidates.

FIG. 8 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.1.3.2 Spatial Motion Vector Candidates

In the derivation of spatial motion vector candidates, a maximum of two candidates are considered among five potential candidates, which are derived from PUs located in positions as depicted in FIG. 2, those positions being the same as those of motion merge. The order of derivation for the left side of the current PU is defined as $A_0, A_1$, and scaled $A_0$, scaled $A_1$. The order of derivation for the above side of the current PU is defined as $B_0, B_1, B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows.

No spatial scaling
  (1) Same reference picture list, and same reference picture index (same POC)
  (2) Different reference picture list, but same reference picture (same POC)
Spatial scaling
  (3) Same reference picture list, but different reference picture (different POC)
  (4) Different reference picture list, and different reference picture (different POC)

The no-spatial-scaling cases are checked first followed by the spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
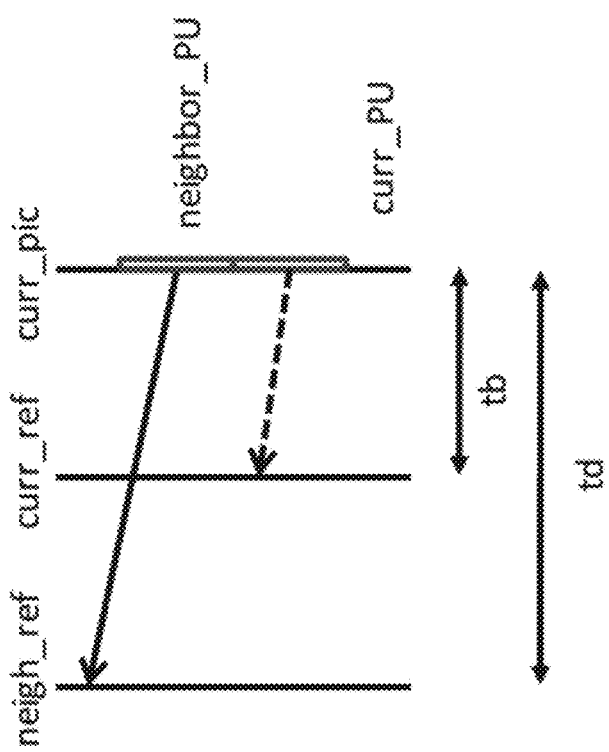
FIG. 9 shows an example illustration of motion vector scaling for spatial motion vector candidate.

In a spatial scaling process, the motion vector of the neighbouring PU is scaled in a similar manner as for temporal scaling, as depicted as FIG. 9. The main difference is that the reference picture list and index of current PU is given as input; the actual scaling process is the same as that of temporal scaling.

2.1.3.3 Temporal Motion Vector Candidates

Apart for the reference picture index derivation, all processes for the derivation of temporal merge candidates are the same as for the derivation of spatial motion vector candidates (see FIG. 6). The reference picture index is signalled to the decoder.

2.2 Inter Prediction Methods in VVC

There are several new coding tools for inter prediction improvement, such as Adaptive Motion Vector difference Resolution (AMVR) for signaling MVD, Merge with Motion Vector Differences (MMVD), Triangular prediction mode (TPM), Combined intra-inter prediction (CIIP), Advanced TMVP (ATMVP, aka SbTMVP), affine prediction mode, Generalized Bi-Prediction (GBI), Decoder-side Motion Vector Refinement (DMVR) and Bi-directional Optical flow (BIO, a.k.a BDOF).

There are three different merge list construction processes supported in VVC:
  1) Sub-block merge candidate list: it includes ATMVP and affine merge candidates. One merge list construction process is shared for both affine modes and ATMVP mode. Here, the ATMVP and affine merge candidates may be added in order. Sub-block merge list size is signaled in slice header, and maximum value is 5.
  2) Regular merge list: For inter-coded blocks, one merge list construction process is shared. Here, the spatial/temporal merge candidates, History based motion vector prediction (HMVP), pairwise merge candidates and zero motion candidates may be inserted in order. Regular merge list size is signaled in slice header, and maximum value is 6. MMVD, TPM, CIIP rely on the regular merge list.
  3) IBC merge list: it is done in a similar way as the regular merge list.

Similarly, there are three AMVP lists supported in VVC:
1) Affine AMVP candidate list
2) Regular AMVP candidate list
3) IBC AMVP candidate list: the same construction process as the IBC merge list due to the adoption of JVET-N0843

2.2.1 Coding Block Structure in VVC

In VVC, a Quad-Tree/Binary Tree/Ternary-Tree (QT/BT/TT) structure is adopted to divide a picture into square or rectangle blocks.

Besides QT/BT/TT, separate tree (a.k.a. Dual coding tree) is also adopted in VVC for I-frames. With separate tree, the coding block structure are signaled separately for the luma and chroma components.

In addition, the CU is set equal to PU and TU, except for blocks coded with a couple of specific coding methods (such as intra sub-partition prediction wherein PU is equal to TU, but smaller than CU, and sub-block transform for inter-coded blocks wherein PU is equal to CU, but TU is smaller than PU).

2.2.2 Affine Prediction Mode

Figure 10:
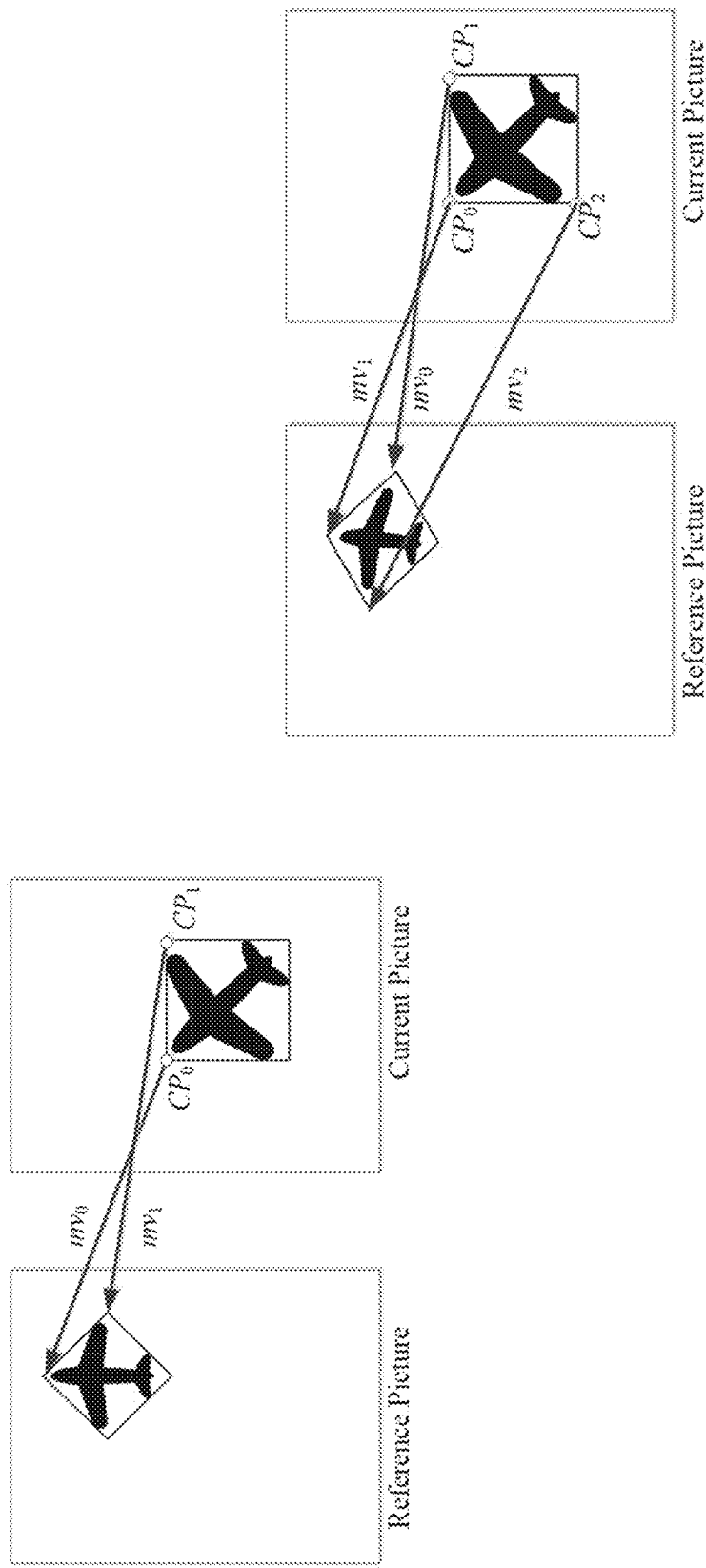
FIG. 10 shows an example simplified affine motion model for 4-parameter affine mode (left) and 6-parameter affine model (right).

In HEVC, only translation motion model is applied for motion compensation prediction (MCP). While in the real world, there are many kinds of motion, e.g. zoom in/out, rotation, perspective motions and the other irregular motions. In VVC, a simplified affine transform motion compensation prediction is applied with 4-parameter affine model and 6-parameter affine model. As shown FIG. 10, the affine motion field of the block is described by two control point motion vectors (CPMVs) for the 4-parameter affine model and 3 CPMVs for the 6-parameter affine model.

The motion vector field (MVF) of a block is described by the following equations with the 4-parameter affine model (wherein the 4-parameter are defined as the variables a, b, e and f) in equation (1) and 6-parameter affine model (wherein the 4-parameter are defined as the variables a, b, c, d, e and f) in equation (2) respectively:

$$\begin{cases} mv^h(x, y) = ax - by + e = \frac{(mv_1^h - mv_0^h)}{w}x - \frac{(mv_1^v - mv_0^v)}{w}y + mv_0^h \\ mv^v(x, y) = bx + ay + f = \frac{(mv_1^v - mv_0^v)}{w}x + \frac{(mv_1^h - mv_0^h)}{w}y + mv_0^v \end{cases} \quad (1)$$

$$\begin{cases} mv^h(x, y) = ax + cy + e = \frac{(mv_1^h - mv_0^h)}{w}x + \frac{(mv_2^h - mv_0^h)}{h}y + mv_0^h \\ mv^v(x, y) = bx + dy + f = \frac{(mv_1^v - mv_0^v)}{w}x + \frac{(mv_2^v - mv_0^v)}{h}y + mv_0^v \end{cases} \quad (2)$$

where $(mv^h_0, mv^v_0)$ is motion vector of the top-left corner control point, and $(mv^h_1, mv^v_1)$ is motion vector of the top-right corner control point and $(mv^h_2, mv^v_2)$ is motion vector of the bottom-left corner control point, all of the three motion vectors are called control point motion vectors (CPMV), (x, y) represents the coordinate of a representative point relative to the top-left sample within current block and $(mv^h(x,y), mv^v(x,y))$ is the motion vector derived for a sample located at (x, y). The CP motion vectors may be signaled (like in the affine AMVP mode) or derived on-the-fly (like in the affine merge mode). w and h are the width and height of the current block. In practice, the division is implemented by right-shift with a rounding operation. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2). For each sub-block (i.e., 4×4 in VTM), the representative point is utilized to derive the motion vector for the whole sub-block.

Figure 11:
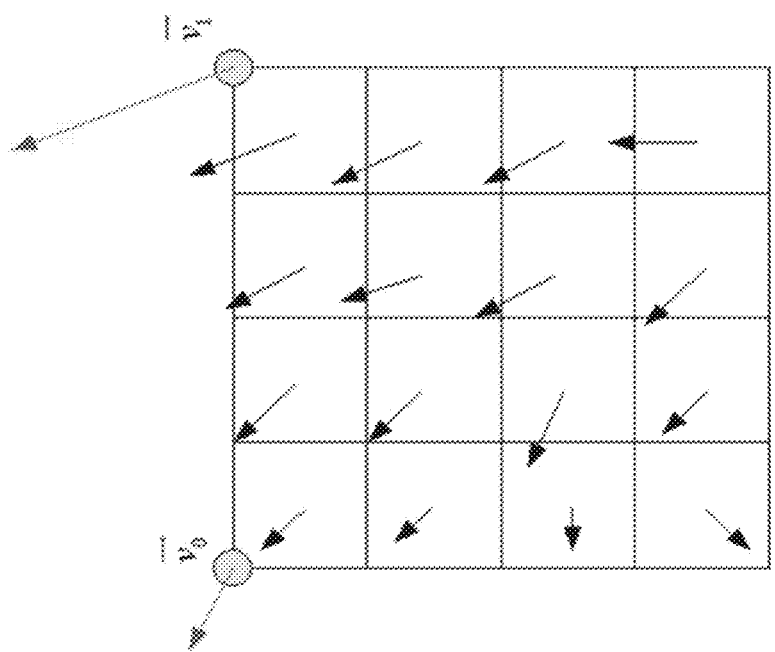
FIG. 11 shows an example of affine motion vector field per sub-block.

In order to further simplify the motion compensation prediction, sub-block based affine transform prediction is applied. To derive motion vector of each M×N (both M and N are set to 4 in current VVC) sub-block, the motion vector of the center sample of each sub-block, as shown in FIG. 11, is calculated according to Equation (1) and (2), and rounded to 1/16 fraction accuracy. Then the motion compensation interpolation filters for 1/16-pel are applied to generate the prediction of each sub-block with derived motion vector. The interpolation filters for 1/16-pel are introduced by the affine mode.

After MCP, the high accuracy motion vector of each sub-block is rounded and saved as the same accuracy as the normal motion vector.

2.2.3 MERGE for Whole Block 2.2.3.1 Merge List Construction of Translational Regular Merge Mode 2.2.3.1.1 History-Based Motion Vector Prediction (HMVP)

Different from the merge list design, in VVC, the history-based motion vector prediction (HMVP) method is employed.

Figure 12:
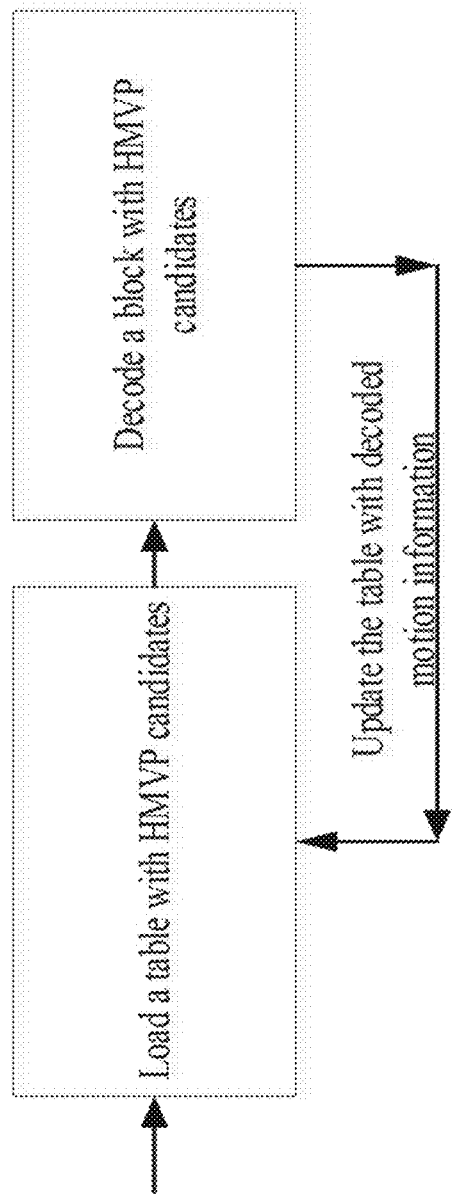
FIG. 12 shows an example Candidates position for affine merge mode.

In HMVP, the previously coded motion information is stored. The motion information of a previously coded block is defined as an HMVP candidate. Multiple HMVP candidates are stored in a table, named as the HMVP table, and this table is maintained during the encoding/decoding process on-the-fly. The HMVP table is emptied when starting coding/decoding a new tile/LCU row/a slice. Whenever there is an inter-coded block and non-sub-block, non-TPM mode, the associated motion information is added to the last entry of the table as a new HMVP candidate. The overall coding flow is depicted in FIG. 12.

2.2.3.1.2. Regular Merge List Construction Process

Figure 13:
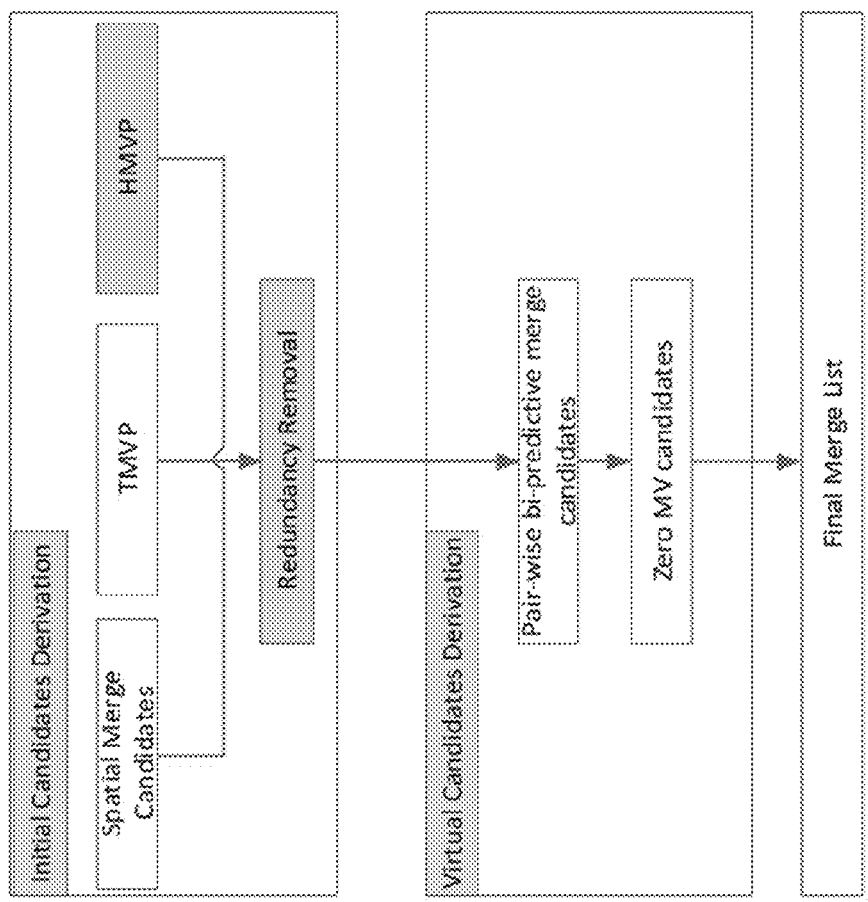
FIG. 13 shows an example of Modified merge list construction process.

The construction of the regular merge list (for translational motion) can be summarized according to the following sequence of steps:
Step 1: Derivation of spatial candidates
Step 2: Insertion of HMVP candidates
Step 3: Insertion of pairwise average candidates
Step 4: default motion candidates HMVP candidates could be used in both AMVP and merge candidate list construction processes. FIG. 13 depicts the modified merge candidate list construction process (highlighted in greyed boxes). When the merge candidate list is not full after the TMVP candidate insertion, HMVP candidates stored in the HMVP table could be utilized to fill in the merge candidate list. Considering that one block usually has a higher correlation with the nearest neighbouring block in terms of motion information, the HMVP candidates in the table are inserted in a descending order of indices. The last entry in the table is firstly added to the list, while the first entry is added in the end. Similarly, redundancy removal is applied on the HMVP candidates. Once the total number of available merge candidates reaches the maximal number of merge candidates allowed to be signaled, the merge candidate list construction process is terminated.

It is noted that all the spatial/temporal/HMVP candidate shall be coded with non-intra block copy (IBC) mode. Otherwise, it is not allowed to be added to the regular merge candidate list.

HMVP table contains up to 5 regular motion candidates and each of them is unique.

2.2.3.1.2.1 Pruning Processes

A candidate is only added to the list if the corresponding candidate used for redundancy check has not the same motion information. Such comparison process is called pruning process.

The pruning process among the spatial candidates is dependent on the usage of TPM for current block.

When current block is coded without TPM mode (e.g., regular merge, MMVD, CIIP), the HEVC pruning process (i.e., five pruning) for the spatial merge candidates is utilized.

2.2.4 Triangular Prediction Mode (TPM)

In VVC, a triangle partition mode is supported for inter prediction. The triangle partition mode is only applied to CUs that are 8×8 or larger and are coded in merge mode but not in MMVD or CIIP mode. For a CU satisfying these conditions, a CU-level flag is signalled to indicate whether the triangle partition mode is applied or not.

Figure 14:
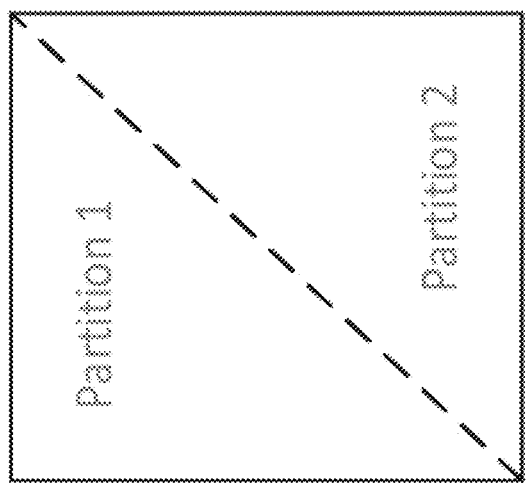
FIG. 14 shows an example of triangle partition based inter prediction.
Figure 14:
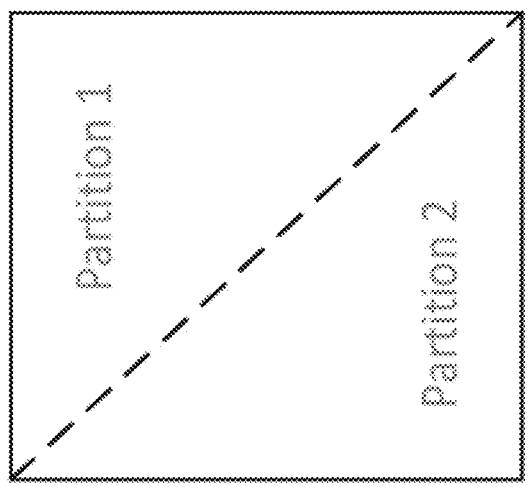

When this mode is used, a CU is split evenly into two triangle-shaped partitions, using either the diagonal split or the anti-diagonal split, as depicted in FIG. 14. Each triangle partition in the CU is inter-predicted using its own motion; only uni-prediction is allowed for each partition, that is, each partition has one motion vector and one reference index. The uni-prediction motion constraint is applied to ensure that same as the conventional bi-prediction, only two motion compensated prediction are needed for each CU.

If the CU-level flag indicates that the current CU is coded using the triangle partition mode, a flag indicating the direction of the triangle partition (diagonal or anti-diagonal), and two merge indices (one for each partition) are further signalled. After predicting each of the triangle partitions, the sample values along the diagonal or anti-diagonal edge are adjusted using a blending processing with adaptive weights. This is the prediction signal for the whole CU and transform and quantization process will be applied to the whole CU as in other prediction modes. Finally, the motion field of a CU predicted using the triangle partition mode is stored in 4×4 units.

The regular merge candidate list is re-used for triangle partition merge prediction with no extra motion vector pruning. For each merge candidate in the regular merge candidate list, one and only one of its L0 or L1 motion vector is used for triangle prediction. In addition, the order of selecting the L0 vs. L1 motion vector is based on its merge index parity. With this scheme, the regular merge list can be directly used.

2.2.4.1 Merge List Construction Process for TPM

Basically, the regular merge list construction process is applied as proposed in WET-N0340. However, some modifications are added.

Specifically, the followings are applied:
1) How to do the pruning process is dependent on the usage of TPM for current block
   If the current block is not coded with TPM, the HEVC 5 pruning applied to spatial merge candidates is invoked
   Otherwise (if the current block is coded with TPM), full pruning is applied when adding a new spatial merge candidates. That is, B1 is compared to A1; B0 is compared to A1 and B1; A0 is compared to A1, B1, and B0; B2 is compared to A1, B1, A0, and B0.
2) The condition on whether to check of motion information from B2 is dependent on the usage of TPM for current block
   If the current block is not coded with TPM, B2 is accessed and checked only when there are less than 4 spatial merge candidates before checking B2.
   Otherwise (if the current block is coded with TPM), B2 is always accessed and checked regardless how many available spatial merge candidates before adding B2.

2.2.4.2 Adaptive Weighting Process

After predicting each triangular prediction unit, an adaptive weighting process is applied to the diagonal edge between the two triangular prediction units to derive the final prediction for the whole CU. Two weighting factor groups are defined as follows:

$1^{st}$ weighting factor group: $\{7/8, 6/8, 4/8, 2/8, 1/8\}$ and $\{7/8, 4/8, 1/8\}$ are used for the luminance and the chrominance samples, respectively;

$2^{nd}$ weighting factor group: $\{7/8, 6/8, 5/8, 4/8, 3/8, 2/8, 1/8\}$ and $\{6/8, 4/8, 2/8\}$ are used for the luminance and the chrominance samples, respectively.

Weighting factor group is selected based on the comparison of the motion vectors of two triangular prediction units. The $2^{nd}$ weighting factor group is used when any one of the following condition is true:

the reference pictures of the two triangular prediction units are different from each other absolute value of the difference of two motion vectors' horizontal values is larger than 16 pixels.

absolute value of the difference of two motion vectors' vertical values is larger than 16 pixels.

Figure 15:
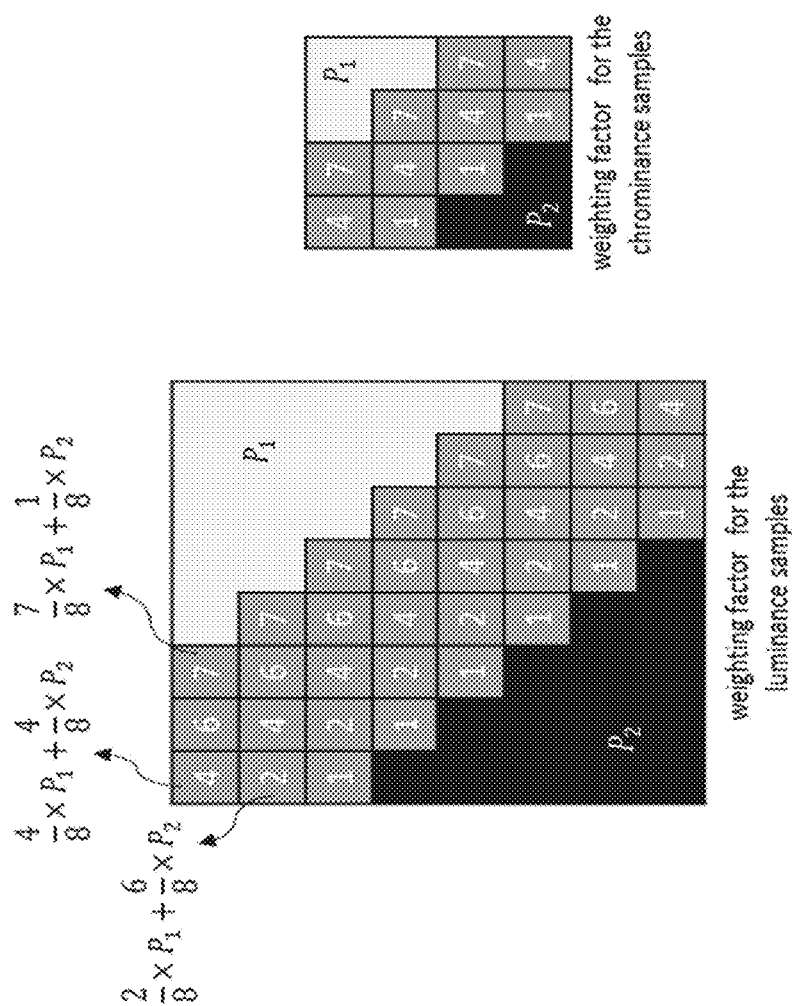
FIG. 15 shows an example of a coding unit (CU) applying the $1^{st}$ weighting factor group.
Figure 17:
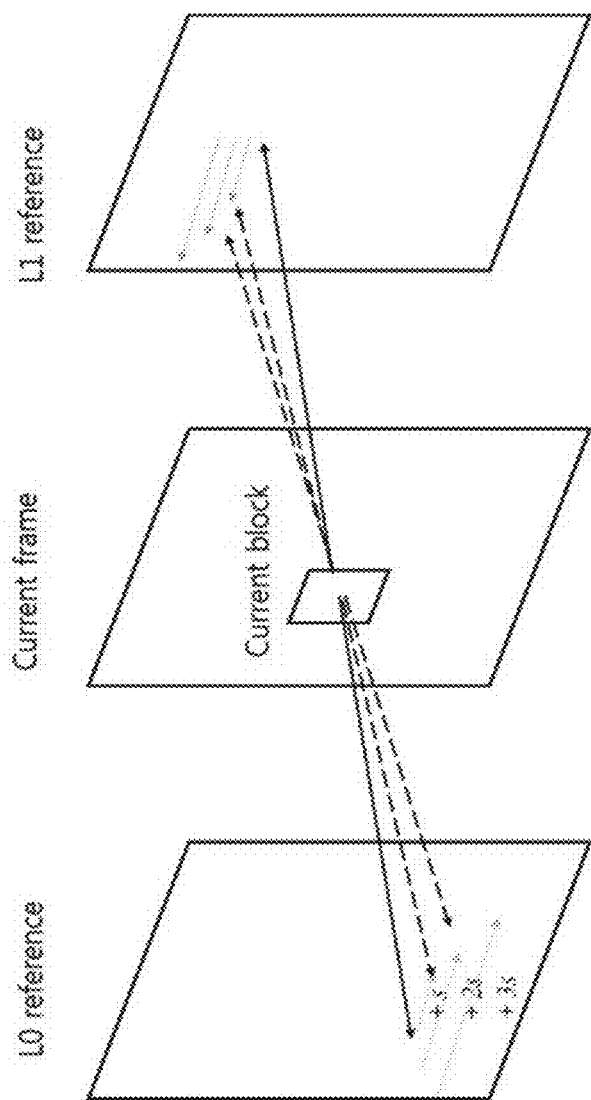
FIG. 17 shows an example of ultimate motion vector expression (UMVE) search process.
Figure 18:
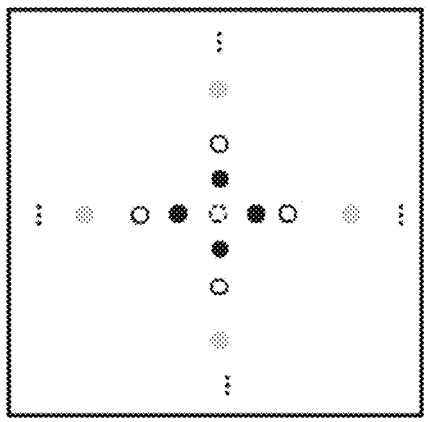
FIG. 18 shows an example of UMVE search points.
Figure 18:
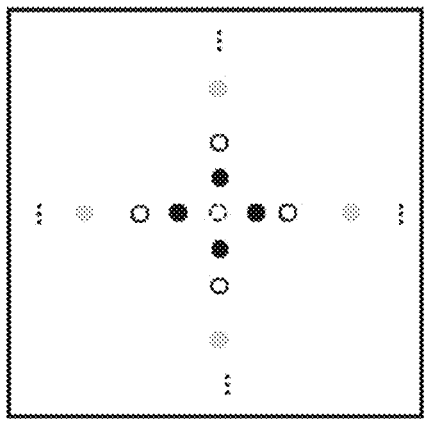

Otherwise, the $1^{st}$ weighting factor group is used. An example is shown in FIG. 15.

2.2.4.3 Motion Vector Storage

Figure 16:
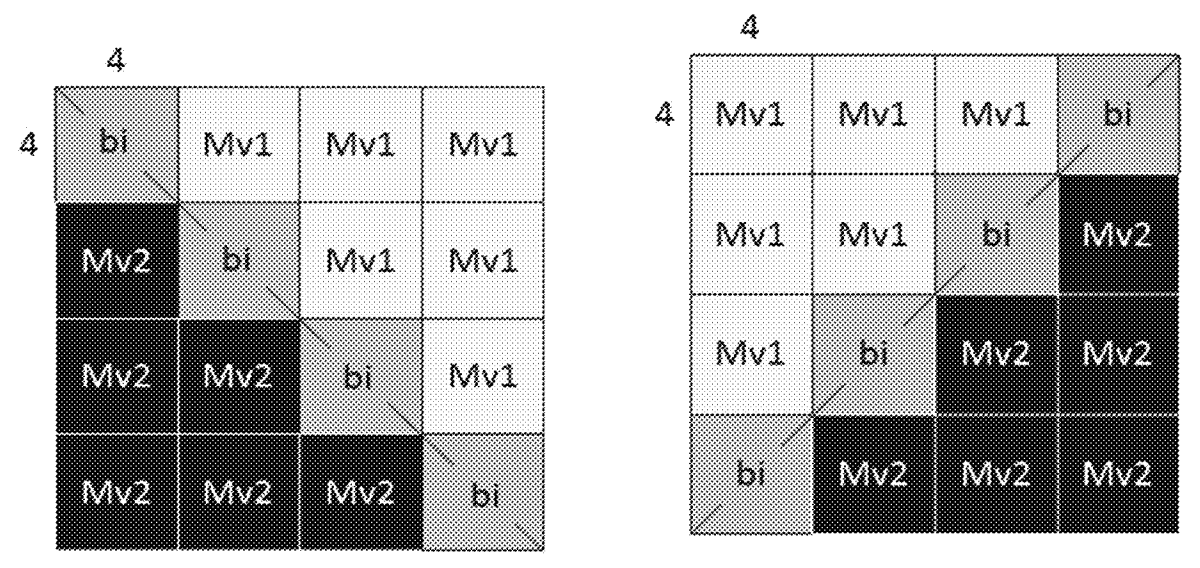

The motion vectors (Mv1 and Mv2 in FIG. 16) of the triangular prediction units are stored in 4×4 grids. For each 4×4 grid, either uni-prediction or bi-prediction motion vector is stored depending on the position of the 4×4 grid in the CU. As shown in FIG. 16, uni-prediction motion vector, either Mv1 or Mv2, is stored for the 4×4 grid located in the non-weighted area (that is, not located at the diagonal edge). On the other hand, a bi-prediction motion vector is stored for the 4×4 grid located in the weighted area. The bi-prediction motion vector is derived from Mv1 and Mv2 according to the following rules:

1) In the case that Mv1 and Mv2 have motion vector from different directions (L0 or L1), Mv1 and Mv2 are simply combined to form the bi-prediction motion vector.
2) In the case that both Mv1 and Mv2 are from the same L0 (or L1) direction,
   If the reference picture of Mv2 is the same as a picture in the L1 (or L0) reference picture list, Mv2 is scaled to the picture. Mv1 and the scaled Mv2 are combined to form the bi-prediction motion vector.
   If the reference picture of Mv1 is the same as a picture in the L1 (or L0) reference picture list, Mv1 is scaled to the picture. The scaled Mv1 and Mv2 are combined to form the bi-prediction motion vector.
   Otherwise, only Mv1 is stored for the weighted area.

2.2.4.4 Syntax Tables, Semantics and Decoding Process for Merge Mode 7.3.5.1 General Slice Header Syntax

|  | Descriptor |
|---|---|
| slice_header( ) { |  |
|   slice_pic_parameter_set_id | ue(v) |
|   if( rect_slice_flag \|\| NumBricksInPic > 1 ) |  |
|     slice_address | u(v) |
|   if( !rect_slice_flag && !single_brick_per_slice_flag ) |  |
|     num_bricks_in_slice_minus1 | ue(v) |
|   slice_type | ue(v) |
| ... |  |
|   IF ( SLICE_TYPE != I ) { |  |
|     if( sps_temporal_mvp_enabled_flag ) |  |
|       slice_temporal_mvp_enabled_flag | u(1) |
|     if( slice_type == B ) |  |
|       mvd_l1_zero_flag | u(1) |
|     if( cabac_init_present_flag ) |  |
|       cabac_init_flag | u(1) |
|     if( slice_temporal_mvp_enabled_flag ) { |  |
|       if( slice_type == B ) |  |
|         collocated_from_l0_flag | u(1) |
|     } |  |
|     if( ( weighted_pred_flag && slice_type == P ) \|\| |  |
|       ( weighted_bipred_flag && slice_type == B ) ) |  |
|       pred_weight_table( ) |  |
|   SIX_MINUS_MAX_NUM_MERGE_CAND | ue(v) |
|   IF( SPS_AFFINE_ENABLED_FLAG ) |  |
|     FIVE_MINUS_MAX_NUM_SUBBLOCK_MERGE_CAND | UE(V) |
|   IF( SPS_FPEL_MMVD_ENABLED_FLAG ) |  |
|     SLICE_FPEL_MMVD_ENABLED_FLAG | U(1) |
|   IF( SPS_TRIANGLE_ENABLED_FLAG && MAXNUMMERGECAND >= 2 ) |  |
|     MAX_NUM_MERGE_CAND_MINUS_MAX_NUM_TRIANGLE_CAND | UE(V) |
|   } ELSE IF ( SPS_IBC_ENABLED_FLAG ) |  |
|     SIX_MINUS_MAX_NUM_MERGE_CAND | ue(v) |
|   slice_qp_delta | se(v) |
|   if( pps_slice_chroma_qp_offsets_present_flag ) { |  |
|     slice_cb_qp_offset | se(v) |
|     slice_cr_qp_offset | se(v) |
|   } |  |
| ... |  |
|   byte_alignment( ) |  |
| } |  |

7.3.7.5 Coding Unit Syntax

|  | Descriptor |
|---|---|
| coding_unit( x0, y0, cbWidth, cbHeight, treeType ) { |  |
|   if( slice_type != I \|\| sps_ibc_enabled_flag ) { |  |
|     if( treeType != DUAL_TREE_CHROMA && |  |
|       !( cbWidth == 4 && cbHeight == 4 && !sps_ibc_enabled_flag ) ) |  |
|       cu_skip_flag[ x0 ][ y0 ] | ae(v) |
|     if( cu_skip_flag[ x0 ][ y0 ] == 0 && slice_type != I && !( cbWidth == 4 && cbHeight == 4 ) ) |  |
|       pred_mode_flag | ae(v) |
|     if( ( ( slice_type == I && cu_skip_flag[ x0 ][ y0 ] ==0 ) \|\| |  |
|       ( slice_type != I && ( CuPredMode[ x0 ][ y0 ] != MODE_INTRA \|\| |  |
|       ( cbWidth == 4 && cbHeight == 4 && cu_skip_flag[ x0 ][ y0 ] == 0 ) ) ) ) && |  |
|       sps_ibc_enabled_flag && ( cbWidth != 128 \|\| cbHeight != 128 ) ) |  |
|       pred_mode_ibc_flag | ae(v) |
|   } |  |
|   if( CuPredMode[ x0 ][ y0 ] == MODE_INTRA ) { |  |
|   ... |  |
|   } |  |
|   } else if( treeType != DUAL_TREE_CHROMA ) { /* MODE_INTER or MODE_IBC */ |  |
|     if( cu_skip_flag[ x0 ][ y0 ] == 0 ) |  |
|       general_merge_flag[ x0 ][ y0 ] | ae(v) |
|     if( general_merge_flag[ x0 ][ y0 ] ) { |  |
|       merge_data( x0, y0, cbWidth, cbHeight ) |  |
|     } ELSE IF ( CUPREDMODE[X0 ][Y0 ] == MODE_IBC ) { |  |
|       MVD_CODING( X0, Y0, 0, 0 ) |  |
|       MVP_L0_FLAG[X0 ][Y0 ] | AE(V) |

-continued

| | Descriptor |
|---|---|
| `IF( SPS_AMVR_ENABLED_FLAG &&`<br>`    ( MVDL0[X0 ][Y0 ][0 ]!= 0 | | MVDL0[X0 ][Y0 ][1 ]!= 0 ) ) {`<br>`    AMVR_PRECISION_FLAG [X0 ][Y0 ]` | AE(V) |
| `    }`<br>`} else {`<br>`    if( slice_type = = B )`<br>`        inter_pred_idc[ x0 ][ y0 ]` | ae(v) |
| `    if( sps_affine_enabled_flag && cbWidth >= 16 && cbHeight >= 16 ) {`<br>`        inter_affine_flag[ x0 ][ y0 ]` | ae(v) |
| `        if( sps_affine_type_flag && inter_affine_flag[ x0 ][ y0 ] )`<br>`            cu_affine_type_flag[ x0 ][ y0 ]`<br>`    }` | ae(v) |
| `    if( sps_smvd_enabled_flag && inter_pred_idc[ x0 ][ y0 ] = = PRED_BI &&`<br>`        !inter_affine_flag[ x0 ][ y0 ] && RefIdxSymL0 >-1 && RefIdxSymL1 >-1 )`<br>`        sym_mvd_flag[ x0 ][ y0 ]`<br>`...`<br>`    }`<br>`}` | ae(v) |

7.3.7.7 Merge Data Syntax

| | Descriptor |
|---|---|
| `merge_data( x0, y0, cbWidth, cbHeight ) {`<br>`    IF ( CUPREDMODE[X0 ][Y0 ] = = MODE_IBC ) {`<br>`        IF( MAXNUMMERGECAND > 1 )`<br>`            MERGE_IDX[X0 ][Y0 ]` | AE(V) |
| `    } ELSE {`<br>`        if( sps_mmvd_enabled_flag | | cbWidth * cbHeight != 32 )`<br>`            regular_merge_flag[ x0 ][ y0 ]` | ae(v) |
| `        if ( regular_merge_flag[ x0 ][ y0 ] = = 1 ){`<br>`            if( MaxNumMergeCand > 1 )`<br>`                merge_idx[ x0 ][ y0 ]` | ae(v) |
| `        } else {`<br>`            if( sps_mmvd_enabled_flag && cbWidth * cbHeight != 32 )`<br>`                mmvd_merge_flag[ x0 ][ y0 ]` | ae(v) |
| `            if( mmvd_merge_flag[ x0 ][ y0 ] = = 1 ) {`<br>`                if( MaxNumMergeCand > 1 )`<br>`                    mmvd_cand_flag[ x0 ][ y0 ]`<br>`                mmvd_distance_idx[ x0 ][ y0 ]`<br>`                mmvd_direction_idx[ x0 ][ y0 ]` | ae(v)<br>ae(v)<br>ae(v) |
| `            } else {`<br>`                if( MaxNumSubblockMergeCand > 0 && cbWidth >= 8 && cbHeight >= 8 )`<br>`                    merge_subblock_flag[ x0 ][ y0 ]` | ae(v) |
| `                if( merge_subblock_flag[ x0 ][ y0 ] = = 1 ) {`<br>`                    if( MaxNumSubblockMergeCand > 1 )`<br>`                        merge_subblock_idx[ x0 ][ y0 ]` | ae(v) |
| `                } else {`<br>`                    if( sps_ciip_enabled_flag && cu_skip_flag[ x0 ][y0 ] = = 0 &&`<br>`                        ( cbWidth * cbHeight ) >= 64 && cbWidth < 128 && cbHeight < 128 ) {`<br>`                        ciip_flag[ x0 ][ y0 ]` | ae(v) |
| `                        if( ciip_flag[ x0 ][ y0 ] && MaxNumMergeCand > 1 )`<br>`                            merge_idx[ x0 ][ y0 ]`<br>`                    }` | ae(v) |
| `                    if( MergeTriangleFlag[ x0 ][ y0 ] ) {`<br>`                        merge_triangle_split_dir[ x0 ][ y0 ]`<br>`                        merge_triangle_idx0[ x0 ][ y0 ]`<br>`                        merge_triangle_idx1[ x0 ][ y0 ]`<br>`                    }`<br>`                }`<br>`            }`<br>`        }`<br>`    }`<br>`}` | ae(v)<br>ae(v)<br>ae(v) |

7.4.6.1 General Slice Header Semantics six_minus_max_num_merge_cand specifies the maximum number of merging motion vector prediction (MVP) candidates supported in the slice subtracted from 6. The maximum number of merging MVP candidates, MaxNumMergeCand is derived as follows:

MaxNumMergeCand=6−six_minus_max_num_
 merge_cand (7-57)

The value of MaxNumMergeCand shall be in the range of 1 to 6, inclusive.
five_minus_max_num_subblock_merge_cand specifies the maximum number of subblock-based merging motion vector prediction (MVP) candidates supported in the slice subtracted from 5. When five_minus_max_num_subblock_merge_cand is not present, it is inferred to be equal to 5−sps_sbtmvp_enabled_flag. The maximum number of subblock-based merging MVP candidates, MaxNumSubblockMergeCand is derived as follows:

MaxNumSubblockMergeCand=5−five_minus_max_
 num_subblock_merge_cand (7-58)

The value of MaxNumSubblockMergeCand shall be in the range of 0 to 5, inclusive.

7.4.8.5 Coding Unit Semantics pred_mode_flag equal to 0 specifies that the current coding unit is coded in inter prediction mode. pred_mode_flag equal to 1 specifies that the current coding unit is coded in intra prediction mode.

When pred_mode_flag is not present, it is inferred as follows:
  If cbWidth is equal to 4 and cbHeight is equal to 4, pred_mode_flag is inferred to be equal to 1.
  Otherwise, pred_mode_flag is inferred to be equal to 1 when decoding an I slice, and equal to 0 when decoding a P or B slice, respectively.
The variable CuPredMode[x][y] is derived as follows for x=x0 . . . x0+cbWidth−1 and y=y0 . . . y0+cbHeight−1:
  If pred_mode_flag is equal to 0, CuPredMode[x][y] is set equal to MODE_INTER.
  Otherwise (pred_mode_flag is equal to 1), CuPredMode[x][y] is set equal to MODE_INTRA.
pred_mode_ibc_flag equal to 1 specifies that the current coding unit is coded in IBC prediction mode. pred_mode_ibc_flag equal to 0 specifies that the current coding unit is not coded in IBC prediction mode.

When pred_mode_ibc_flag is not present, it is inferred as follows:
  If cu_skip_flag[x0][y0] is equal to 1, and cbWidth is equal to 4, and cbHeight is equal to 4, pred_mode_ibc_flag is inferred to be equal 1.
  Otherwise, if both cbWidth and cbHeight are equal to 128, pred_mode_ibc_flag is inferred to be equal to 0.
  Otherwise, pred_mode_ibc_flag is inferred to be equal to the value of sps_ibc_enabled_flag when decoding an I slice, and 0 when decoding a P or B slice, respectively.
When pred_mode_ibc_flag is equal to 1, the variable CuPredMode[x][y] is set to be equal to MODE_IBC for x=x0 . . . x0+cbWidth−1 and y=y0 . . . y0+cbHeight−1.
general_merge_flag[x0][y0] specifies whether the inter prediction parameters for the current coding unit are inferred from a neighbouring inter-predicted partition. The array indices x0, y0 specify the location (x0, y0) of the top-left luma sample of the considered coding block relative to the top-left luma sample of the picture.

When general_merge_flag[x0][y0] is not present, it is inferred as follows:
  If cu_skip_flag[x0][y0] is equal to 1, general_merge_flag[x0][y0] is inferred to be equal to 1.
  Otherwise, general_merge_flag[x0][y0] is inferred to be equal to 0.
mvp_l0_flag[x0][y0] specifies the motion vector predictor index of list 0 where x0, y0 specify the location (x0, y0) of the top-left luma sample of the considered coding block relative to the top-left luma sample of the picture.

When mvp_l0_flag[x0][y0] is not present, it is inferred to be equal to 0.
mvp_l1_flag[x0][y0] has the same semantics as mvp_l0_flag, with l0 and list 0 replaced by l1 and list 1, respectively.
inter_pred_idc[x0][y0] specifies whether list0, list1, or bi-prediction is used for the current coding unit according to Table 7-10. The array indices x0, y0 specify the location (x0, y0) of the top-left luma sample of the considered coding block relative to the top-left luma sample of the picture.

TABLE 7-10

Name association to inter prediction mode

| inter_pred_idc | Name of inter_pred_idc | | |
|---|---|---|---|
| | (cbWidth + cbHeight) > 12 | (cbWidth + cbHeight) == 12 | (cbWidth + cbHeight) == 8 |
| 0 | PRED_L0 | PRED_L0 | n.a. |
| 1 | PRED_L1 | PRED_L1 | n.a. |
| 2 | PRED_BI | n.a. | n.a. |

When inter_pred_idc[x0][y0] is not present, it is inferred to be equal to PRED_L0.

7.4.8.7 Merge Data Semantics regular_merge_flag[x0][y0] equal to 1 specifies that regular merge mode is used to generate the inter prediction parameters of the current coding unit. The array indices x0, y0 specify the location (x0, y0) of the top-left luma sample of the considered coding block relative to the top-left luma sample of the picture.

When regular_merge_flag[x0][y0] is not present, it is inferred as follows:
  If all the following conditions are true, regular_merge_flag[x0][y0] is inferred to be equal to 1:
    sps_mmvd_enabled_flag is equal to 0.
    general_merge_flag[x0][y0] is equal to 1.
    cbWidth*cbHeight is equal to 32.
  Otherwise, regular_merge_flag[x0][y0] is inferred to be equal to 0.
mmvd_merge_flag[x0][y0] equal to 1 specifies that merge mode with motion vector difference is used to generate the inter prediction parameters of the current coding unit. The array indices x0, y0 specify the location (x0, y0) of the top-left luma sample of the considered coding block relative to the top-left luma sample of the picture.

When mmvd_merge_flag[x0][y0] is not present, it is inferred as follows:
  If all the following conditions are true, mmvd_merge_flag[x0][y0] is inferred to be equal to 1:
    sps_mmvd_enabled_flag is equal to 1.
    general_merge_flag[x0][y0] is equal to 1.
    cbWidth*cbHeight is equal to 32.
    regular_merge_flag[x0][y0] is equal to 0.
  Otherwise, mmvd_merge_flag[x0][y0] is inferred to be equal to 0.
mmvd_cand_flag[x0][y0] specifies whether the first (0) or the second (1) candidate in the merging candidate list is used with the motion vector difference derived from mmvd_distance_idx[x0][y0] and mmvd_direction_idx[x0][y0]. The array indices x0, y0 specify the location (x0, y0) of the top-left luma sample of the considered coding block relative to the top-left luma sample of the picture.

When mmvd_cand_flag[x0][y0] is not present, it is inferred to be equal to 0.

mmvd_distance_idx[x0][y0] specifies the index used to derive MmvdDistance[x0][y0] as specified in Table 7-12. The array indices x0, y0 specify the location (x0, y0) of the top-left luma sample of the considered coding block relative to the top-left luma sample of the picture.

TABLE 7-12

Specification of MmvdDistance[ x0 ][ y0 ] based on mmvd_distance_idx[ x0 ][ y0 ].

| mmvd_distance_idx [ x0 ][ y0 ] | MmvdDistance[ x0 ][ y0 ] | |
|---|---|---|
| | slice_fpel_mmvd_enabled_flag == 0 | slice_fpel_mmvd_enabled_flag == 1 |
| 0 | 1 | 4 |
| 1 | 2 | 8 |
| 2 | 4 | 16 |
| 3 | 8 | 32 |
| 4 | 16 | 64 |
| 5 | 32 | 128 |
| 6 | 64 | 256 |
| 7 | 128 | 512 | mmvd_direction_idx[x0][y0] specifies index used to derive MmvdSign[x0][y0] as specified in Table 7-13. The array indices x0, y0 specify the location (x0, y0) of the top-left luma sample of the considered coding block relative to the top-left luma sample of the picture.

TABLE 7-13

Specification of MmvdSign[ x0 ][ y0 ] based on mmvd_direction_idx[ x0 ][ y0 ]

| mmvd_direction_idx [ x0 ][ y0 ] | MmvdSign [ x0 ][ y0 ][0] | MmvdSign [ x0 ][ y0 ][1] |
|---|---|---|
| 0 | +1 | 0 |
| 1 | −1 | 0 |
| 2 | 0 | +1 |
| 3 | 0 | −1 |

Both components of the merge plus MVD offset MmvdOffset[x0][y0] are derived as follows:

MmvdOffset[x0][y0][0]=(MmvdDistance[x0][y0]<<2)
  *MmvdSign[x0][y0][0]  (7-124)

MmvdOffset[x0][y0][1]=(MmvdDistance[x0][y0]<<2)
  *MmvdSign[x0][y][1]  (7-125)

merge_subblock_flag[x0][y0] specifies whether the subblock-based inter prediction parameters for the current coding unit are inferred from neighbouring blocks. The array indices x0, y0 specify the location (x0, y0) of the top-left luma sample of the considered coding block relative to the top-left luma sample of the picture. When merge_subblock_flag[x0][y0] is not present, it is inferred to be equal to 0.

merge_subblock_idx[x0][y0] specifies the merging candidate index of the subblock-based merging candidate list where x0, y0 specify the location (x0, y0) of the top-left luma sample of the considered coding block relative to the top-left luma sample of the picture.

When merge_subblock_idx[x0][y0] is not present, it is inferred to be equal to 0.

ciip_flag[x0][y0] specifies whether the combined inter-picture merge and intra-picture prediction is applied for the current coding unit. The array indices x0, y0 specify the location (x0, y0) of the top-left luma sample of the considered coding block relative to the top-left luma sample of the picture.

When ciip_flag[x0][y0] is not present, it is inferred to be equal to 0.

When ciip_flag[x0][y0] is equal to 1, the variable IntraPredModeY[x][y] with x=xCb . . . xCb+cbWidth−1 and y=yCb . . . yCb+cbHeight−1 is set to be equal to INTRA_PLANAR.

The variable MergeTriangleFlag[x0][y0], which specifies whether triangular shape based motion compensation is used to generate the prediction samples of the current coding unit, when decoding a B slice. is derived as follows:

If all the following conditions are true, MergeTriangleFlag[x0][y0] is set equal to 1:
  sps_triangle_enabled_flag is equal to 1.
  slice_type is equal to B.
  general_merge_flag[x0][y0] is equal to 1.
  MaxNumTriangleMergeCand is greater than or equal to 2.
  cbWidth*cbHeight is greater than or equal to 64.
  regular_merge_flag[x0][y0] is equal to 0.
  mmvd_merge_flag[x0][y0] is equal to 0.
  merge_subblock_flag[x0][y0] is equal to 0.
  ciip_flag[x0][y0] is equal to 0.

Otherwise, MergeTriangleFlag[x0][y0] is set equal to 0.

merge_triangle_split_dir[x0][y0] specifies the splitting direction of merge triangle mode. The array indices x0, y0 specify the location (x0, y0) of the top-left luma sample of the considered coding block relative to the top-left luma sample of the picture.

When merge_triangle_split_dir[x0][y0] is not present, it is inferred to be equal to 0.

merge_triangle_idx0[x0][y0] specifies the first merging candidate index of the triangular shape based motion compensation candidate list where x0, y0 specify the location (x0, y0) of the top-left luma sample of the considered coding block relative to the top-left luma sample of the picture.

When merge_triangle_idx0[x0][y0] is not present, it is inferred to be equal to 0.

merge_triangle_idx1[x0][y0] specifies the second merging candidate index of the triangular shape based motion compensation candidate list where x0, y0 specify the location (x0, y0) of the top-left luma sample of the considered coding block relative to the top-left luma sample of the picture.

When merge_triangle_idx1[x0][y0] is not present, it is inferred to be equal to 0.

merge_idx[x0][y0] specifies the merging candidate index of the merging candidate list where x0, y0 specify the location (x0, y0) of the top-left luma sample of the considered coding block relative to the top-left luma sample of the picture.

When merge_idx[x0][y0] is not present, it is inferred as follows:
  If mmvd_merge_flag[x0][y0] is equal to 1, merge_idx[x0][y0] is inferred to be equal to mmvd_cand_flag[x0][y0].
  Otherwise (mmvd_merge_flag[x0][y0] is equal to 0), merge_idx[x0][y0] is inferred to be equal to 0.

2.2.4.4.1 Decoding Process

The decoding process as provided in the WET-N0340 is defined as follows:

8.5.2.2 Derivation Process for Luma Motion Vectors for Merge Mode

This process is only invoked when general_merge_flag [xCb][yCb] is equal to 1, where (xCb, yCb) specify the top-left sample of the current luma coding block relative to the top-left luma sample of the current picture.

Inputs to this process are:
a luma location (xCb, yCb) of the top-left sample of the current luma coding block relative to the top-left luma sample of the current picture,
a variable cbWidth specifying the width of the current coding block in luma samples,
a variable cbHeight specifying the height of the current coding block in luma samples.

Outputs of this process are:
the luma motion vectors in 1/16 fractional-sample accuracy mvL0 [0][0] and mvL1 [0][0],
the reference indices refIdxL0 and refIdxL1,
the prediction list utilization flags predFlagL0 [0][0] and predFlagL1 [0][0],
the bi-prediction weight index bcwIdx.
the merging candidate list mergeCandList.

The bi-prediction weight index bcwIdx is set equal to 0.
The motion vectors mvL0 [0][0] and mvL1 [0][0], the reference indices refIdxL0 and refIdxL1 and the prediction utilization flags predFlagL0 [0][0] and predFlagL1 [0][0] are derived by the following ordered steps:

1. The derivation process for spatial merging candidates from neighbouring coding units as specified in clause 8.5.2.3 is invoked with the luma coding block location (xCb, yCb), the luma coding block width cbWidth, and the luma coding block height cbHeight as inputs, and the output being the availability flags availableFlag$A_0$, availableFlag$A_1$, availableFlag$B_0$, availableFlag$B_1$ and availableFlag$B_2$, the reference indices refIdxLX$A_0$, refIdxLX$A_1$, refIdxLX$B_0$, refIdxLX$B_1$ and refIdxLX$B_2$, the prediction list utilization flags predFlagLX$A_0$, predFlagLX$A_1$, predFlagLX$B_0$, predFlagLX$B_1$ and predFlagLX$B_2$, and the motion vectors mvLX$A_0$, mvLX$A_1$, mvLX$B_0$, mvLX$B_1$ and mvLX$B_2$, with X being 0 or 1, and the bi-prediction weight indices bcwIdx$A_0$, bcwIdx$A_1$, bcwIdx$B_0$, bcwIdx$B_1$, bcwIdx$B_2$.

2. The reference indices, refIdxLXCol, with X being 0 or 1, and the bi-prediction weight index bcwIdxCol for the temporal merging candidate Col are set equal to 0.

3. The derivation process for temporal luma motion vector prediction as specified in in clause 8.5.2.11 is invoked with the luma location (xCb, yCb), the luma coding block width cbWidth, the luma coding block height cbHeight and the variable refIdxL0Col as inputs, and the output being the availability flag availableFlagL0Col and the temporal motion vector mvL0Col. The variables availableFlagCol, predFlagL0Col and predFlagL1Col are derived as follows:

availableFlagCol=availableFlagL0Col (8-263)

predFlagL0Col=availableFlagL0Col (8-264)

predFlagL1Col=0 (8-265)

4. When slice_type is equal to B, the derivation process for temporal luma motion vector prediction as specified in clause 8.5.2.11 is invoked with the luma location (xCb, yCb), the luma coding block width cbWidth, the luma coding block height cbHeight and the variable refIdxL1Col as inputs, and the output being the availability flag availableFlagL1Col and the temporal motion vector mvL1Col. The variables availableFlagCol and predFlagL1Col are derived as follows:

availableFlagCol=availableFlagL0Col||availableFlagL1Col (8-266)

predFlagL1Col=availableFlagL1Col (8-267)

5. The merging candidate list, mergeCandList, is constructed as follows:

i=0 if(availableFlag$A_1$)

mergeCandList[i++]=$A_1$ if(availableFlag$B_1$)

mergeCandList[i++]=$B_1$ if(availableFlag$B_0$)

mergeCandList[i++]=$B_0$ if(availableFlag$A_0$)

mergeCandList[i++]=$A_0$ if(availableFlag$B_2$)

mergeCandList[i++]=$B_2$ if(availableFlagCol)

mergeCandList[i++]=Col (8-268)

6. The variable numCurrMergeCand and numOrigMergeCand are set equal to the number of merging candidates in the mergeCandList.

7. When numCurrMergeCand is less than (MaxNumMergeCand −1) and NumHmvpCand is greater than 0, the following applies:
   The derivation process of history-based merging candidates as specified in 8.5.2.6 is invoked with mergeCandList and numCurrMergeCand as inputs, and modified mergeCandList and numCurrMergeCand as outputs.
   numOrigMergeCand is set equal to numCurrMergeCand.

8. When numCurrMergeCand is less than MaxNumMergeCand and greater than 1, the following applies:
   The derivation process for pairwise average merging candidate specified in clause 8.5.2.4 is invoked with mergeCandList, the reference indices refIdxL0N and refIdxL1N, the prediction list utilization flags predFlagL0N and predFlagL1N, the motion vectors mvL0N and mvL1N of every candidate N in mergeCandList, and numCurrMergeCand as inputs, and the output is assigned to mergeCandList, numCurrMergeCand, the reference indices refIdxL0avgCand and refIdxL1avgCand, the prediction list utilization flags predFlagL0avgCand and predFlagL1avgCand and the motion vectors mvL0avgCand and mvL1avgCand of candidate avgCand being added into mergeCandList. The bi-prediction weight index bcwIdx of candidate avgCand being added into mergeCandList is set equal to 0.
   numOrigMergeCand is set equal to numCurrMergeCand.

9. The derivation process for zero motion vector merging candidates specified in clause 8.5.2.5 is invoked with the mergeCandList, the reference indices refIdxL0N and refIdxL1N, the prediction list utilization flags predFlagL0N and predFlagL1N, the motion vectors mvL0N and mvL1N of every candidate N in mergeCandList and numCurrMergeCand as inputs, and the output is assigned to mergeCandList, numCurrMergeCand, the reference indices refIdxL0zeroCand$_m$ and refIdxL1zeroCand$_m$, the prediction list utilization flags predFlagL0zeroCand$_m$ and predFlagL1zeroCand$_m$ and the motion vectors mvL0zeroCand$_m$ and mvL1zeroCand$_m$ of every new candidate zeroCand$_m$ being added into mergeCandList. The bi-prediction weight index bcwIdx of every new candidate zeroCand$_m$ being added into mergeCandList is set equal to 0. The number of candidates being added, numZeroMergeCand, is set equal to (numCurrMergeCand−numOrigMergeCand). When numZeroMergeCand is greater than 0, m ranges from 0 to numZeroMergeCand −1, inclusive.

10. The following assignments are made with N being the candidate at position merge_idx[xCb][yCb] in the merging candidate list mergeCandList (N=mergeCandList[merge_idx[xCb][yCb]]) and X being replaced by 0 or 1:

refIdxLX=refIdxLXN    (8-269)

predFlagLX[0][0]=predFlagLXN    (8-270)

mvLX[0][0][0]=mvLXN[0]    (8-271)

mvLX[0][0][1]=mvLXN[1]    (8-272)

bcwIdx=bcwIdxN    (8-273)

11. When mmvd_merge_flag[xCb][yCb] is equal to 1, the following applies:

The derivation process for merge motion vector difference as specified in 8.5.2.7 is invoked with the luma location (xCb, yCb), the reference indices refIdxL0, refIdxL1 and the prediction list utilization flags predFlagL0 [0][0] and predFlagL1 [0][0] as inputs, and the motion vector differences mMvdL0 and mMvdL1 as outputs.

The motion vector difference mMvdLX is added to the merge motion vectors mvLX for X being 0 and 1 as follows:

mvLX[0][0][0]+=mMvdLX[0]    (8-274)

mvLX[0][0][1]+=mMvdLX[1]    (8-275)

mvLX[0][0][0]=Clip3(−2$^{17}$,2$^{17}$−1,mvLX[0][0][0])    (8-276)

mvLX[0][0][1]=Clip3(−2$^{17}$,2$^{17}$−1,mvLX[0][0][1])    (8-277)

8.5.2.3 Derivation Process for Spatial Merging Candidates
Inputs to this process are:
a luma location (xCb, yCb) of the top-left sample of the current luma coding block relative to the top-left luma sample of the current picture,
a variable cbWidth specifying the width of the current coding block in luma samples,
a variable cbHeight specifying the height of the current coding block in luma samples.
Outputs of this process are as follows, with X being 0 or 1:
the availability flags availableFlagA$_0$, availableFlagA$_1$, availableFlagB$_0$, availableFlagB$_1$ and availableFlagB$_2$ of the neighbouring coding units,
the reference indices refIdxLXA$_0$, refIdxLXA$_1$, refIdxLXB$_0$, refIdxLXB$_1$ and refIdxLXB$_2$ of the neighbouring coding units,
the prediction list utilization flags predFlagLXA$_0$, predFlagLXA$_1$, predFlagLXB$_0$, predFlagLXB$_1$ and predFlagLXB$_2$ of the neighbouring coding units,
the motion vectors in 1/16 fractional-sample accuracy mvLXA$_0$, mvLXA$_1$, mvLXB$_0$, mvLXB$_1$ and mvLXB$_2$ of the neighbouring coding units,
the bi-prediction weight indices gbiIdxA$_0$, gbiIdxA$_1$, gbiIdxB$_0$, gbiIdxB$_1$, and gbiIdxB$_2$.

For the derivation of availableFlagA$_1$, refIdxLXA$_1$, predFlagLXA$_1$ and mvLXA$_1$ the following applies:
The luma location (xNbA$_1$, yNbA$_1$) inside the neighbouring luma coding block is set equal to (xCb−1, yCb+cbHeight−1).
The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location (xNbA$_1$, yNbA$_1$) as inputs, and the output is assigned to the block availability flag availableA$_1$.
The variables availableFlagA$_1$, refIdxLXA$_1$, predFlagLXA$_1$ and mvLXA$_1$ are derived as follows:
If availableA$_1$ is equal to FALSE, availableFlagA$_1$ is set equal to 0, both components of mvLXA$_1$ are set equal to 0, refIdxLXA$_1$ is set equal to −1 and predFlagLXA$_1$ is set equal to 0, with X being 0 or 1, and gbiIdxA$_1$ is set equal to 0.
Otherwise, availableFlagA$_1$ is set equal to 1 and the following assignments are made:

mvLXA$_1$=MvLX[xNbA$_1$][yNbA$_1$]    (8-294)

refIdxLXA$_1$=RefIdxLX[xNbA$_1$][yNbA$_1$]    (8-295)

predFlagLXA$_1$=PredFlagLX[xNbA$_1$][yNbA$_1$]    (8-296)

gbiIdxA$_1$=GbiIdx[xNbA$_1$][yNbA$_1$]    (8-297)

For the derivation of availableFlagB$_1$, refIdxLXB$_1$, predFlagLXB$_1$ and mvLXB$_1$ the following applies:
The luma location (xNbB$_1$, yNbB$_1$) inside the neighbouring luma coding block is set equal to (xCb+cbWidth−1, yCb−1).
The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location (xNbB$_1$, yNbB$_1$) as inputs, and the output is assigned to the block availability flag availableB$_1$.
The variables availableFlagB$_1$, refIdxLXB$_1$, predFlagLXB$_1$ and mvLXB$_1$ are derived as follows:
If one or more of the following conditions are true, availableFlagB$_1$ is set equal to 0, both components of mvLXB$_1$ are set equal to 0, refIdxLXB$_1$ is set equal to −1 and predFlagLXB$_1$ is set equal to 0, with X being 0 or 1, and gbiIdxB$_1$ is set equal to 0:
availableB$_1$ is equal to FALSE.
availableA$_1$ is equal to TRUE and the luma locations (xNbA$_1$, yNbA$_1$) and (xNbB$_1$, yNbB$_1$) have the same motion vectors and the same reference indices.
Otherwise, availableFlagB$_1$ is set equal to 1 and the following assignments are made:

$$mvLXB_1 = MvLX[xNbB_1][yNbB_1] \quad (8\text{-}298)$$

$$refIdxLXB_1 = RefIdxLX[xNbB_1][yNbB_1] \quad (8\text{-}299)$$

$$predFlagLXB_1 = PredFlagLX[xNbB_1][yNbB_1] \quad (8\text{-}300)$$

$$gbiIdxB_1 = GbiIdx[xNbB_1][yNbB_1] \quad (8\text{-}301)$$

For the derivation of availableFlag$B_0$, refIdxLX$B_0$, predFlagLX$B_0$ and mvLX$B_0$ the following applies:
- The luma location (xNb$B_0$, yNb$B_0$) inside the neighbouring luma coding block is set equal to (xCb+cbWidth, yCb−1).
- The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location (xNb$B_0$, yNb$B_0$) as inputs, and the output is assigned to the block availability flag available$B_0$.
- The variables availableFlag$B_0$, refIdxLX$B_0$, predFlagLX$B_0$ and mvLX$B_0$ are derived as follows:
  - If one or more of the following conditions are true, availableFlag$B_0$ is set equal to 0, both components of mvLX$B_0$ are set equal to 0, refIdxLX$B_0$ is set equal to −1 and predFlagLX$B_0$ is set equal to 0, with X being 0 or 1, and gbiIdx$B_0$ is set equal to 0:
    - available$B_0$ is equal to FALSE.
    - available$B_1$ is equal to TRUE and the luma locations (xNb$B_1$, yNb$B_1$) and (xNb$B_0$, yNb$B_0$) have the same motion vectors and the same reference indices.
    - available$A_1$ is equal to TRUE, the luma locations (xNb$A_1$, yNb$A_1$) and (xNb$B_0$, yNb$B_0$) have the same motion vectors and the same reference indices and merge triangle flag[xCb][yCb] is equal to 1.
  - Otherwise, availableFlag$B_0$ is set equal to 1 and the following assignments are made:

$$mvLXB_0 = MvLX[xNbB_0][yNbB_0] \quad (8\text{-}302)$$

$$refIdxLXB_0 = RefIdxLX[xNbB_0][yNbB_0] \quad (8\text{-}303)$$

$$predFlagLXB_0 = PredFlagLX[xNbB_0][yNbB_0] \quad (8\text{-}304)$$

$$gbiIdxB_0 = GbiIdx[xNbB_0][yNbB_0] \quad (8\text{-}305)$$

For the derivation of availableFlag$A_0$, refIdxLX$A_0$, predFlagLX$A_0$ and mvLX$A_0$ the following applies:
- The luma location (xNb$A_0$, yNb$A_0$) inside the neighbouring luma coding block is set equal to (xCb−1, yCb+cbWidth).
- The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location (xNb$A_0$, yNb$A_0$) as inputs, and the output is assigned to the block availability flag available$A_0$.
- The variables availableFlag$A_0$, refIdxLX$A_0$, predFlagLX$A_0$ and mvLX$A_0$ are derived as follows:
  - If one or more of the following conditions are true, availableFlag$A_0$ is set equal to 0, both components of mvLX$A_0$ are set equal to 0, refIdxLX$A_0$ is set equal to −1 and predFlagLX$A_0$ is set equal to 0, with X being 0 or 1, and gbiIdx$A_0$ is set equal to 0:
    - available$A_0$ is equal to FALSE.
    - available$A_1$ is equal to TRUE and the luma locations (xNb$A_1$, yNb$A_1$) and (xNb$A_0$, yNb$A_0$) have the same motion vectors and the same reference indices.
    - available$B_1$ is equal to TRUE, the luma locations (xNb$B_1$, yNb$B_1$) and (xNb$A_0$, yNb$A_0$) have the same motion vectors and the same reference indices and merge_triangle_flag[xCb][yCb] is equal to 1.
    - available$B_0$ is equal to TRUE, the luma locations (xNb$B_0$, yNb$B_0$) and (xNb$A_0$, yNb$A_0$) have the same motion vectors and the same reference indices and merge_triangle_flag[xCb][yCb] is equal to 1.
  - Otherwise, availableFlag$A_0$ is set equal to 1 and the following assignments are made:

$$mvLXA_0 = MvLX[xNbA_0][yNbA_0] \quad (8\text{-}306)$$

$$refIdxLXA_0 = RefIdxLX[xNbA_0][yNbA_0] \quad (8\text{-}307)$$

$$predFlagLXA_0 = PredFlagLX[xNbA_0][yNbA_0] \quad (8\text{-}308)$$

$$gbiIdxA_0 = GbiIdx[xNbA_0][yNbA_0] \quad (8\text{-}309)$$

For the derivation of availableFlag$B_2$, refIdxLX$B_2$, predFlagLX$B_2$ and mvLX$B_2$ the following applies:
- The luma location (xNb$B_2$, yNb$B_2$) inside the neighbouring luma coding block is set equal to (xCb−1, yCb−1).
- The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location (xNb$B_2$, yNb$B_2$) as inputs, and the output is assigned to the block availability flag available$B_2$.
- The variables availableFlag$B_2$, refIdxLX$B_2$, predFlagLX$B_2$ and mvLX$B_2$ are derived as follows:
  - If one or more of the following conditions are true, availableFlag$B_2$ is set equal to 0, both components of mvLX$B_2$ are set equal to 0, refIdxLX$B_2$ is set equal to −1 and predFlagLX$B_2$ is set equal to 0, with X being 0 or 1, and gbiIdx$B_2$ is set equal to 0:
    - available$B_2$ is equal to FALSE.
    - available$A_1$ is equal to TRUE and the luma locations (xNb$A_1$, yNb$A_1$) and (xNb$B_2$, yNb$B_2$) have the same motion vectors and the same reference indices.
    - available$B_1$ is equal to TRUE and the luma locations (xNb$B_1$, yNb$B_1$) and (xNb$B_2$, yNb$B_2$) have the same motion vectors and the same reference indices.
    - available$B_0$ is equal to TRUE, the luma locations (xNb$B_0$, yNb$B_0$) and (xNb$B_2$, yNb$B_2$) have the same motion vectors and the same reference indices and merge_triangle_flag[xCb][yCb] is equal to 1.
    - available$A_0$ is equal to TRUE, the luma locations (xNb$A_0$, yNb$A_0$) and (xNb$B_2$, yNb$B_2$) have the same motion vectors and the same reference indices and merge_triangle_flag[xCb][yCb] is equal to 1.
    - availableFlag$A_0$+availableFlag$A_1$+availableFlag$B_0$+availableFlag$B_1$ is equal to 4 and merge_triangle_flag[xCb][yCb] is equal to 0.
  - Otherwise, availableFlag$B_2$ is set equal to 1 and the following assignments are made:

$$mvLXB_2=MvLX[xNbB_2][yNbB_2] \quad (8\text{-}310)$$

$$refIdxLXB_2=RefIdxLX[xNbB_2][yNbB_2] \quad (8\text{-}311)$$

$$predFlagLXB_2=PredFlagLX[xNbB_2][yNbB_2] \quad (8\text{-}312)$$

$$gbiIdxB_2=GbiIdx[xNbB_2][yNbB_2] \quad (8\text{-}313)$$

2.2.5 MMVD

In JVET-L0054, ultimate motion vector expression (UMVE, also known as MMVD) is presented. UMVE is used for either skip or merge modes with a proposed motion vector expression method.

UMVE re-uses merge candidate as same as those included in the regular merge candidate list in VVC. Among the merge candidates, a base candidate can be selected, and is further expanded by the proposed motion vector expression method.

UMVE provides a new motion vector difference (MVD) representation method, in which a starting point, a motion magnitude and a motion direction are used to represent a MVD.

This proposed technique uses a merge candidate list as it is. But only candidates which are default merge type (MRG_TYPE_DEFAULT_N) are considered for UMVE's expansion.

Base candidate index defines the starting point. Base candidate index indicates the best candidate among candidates in the list as follows.

TABLE 4

Base candidate (IDX)

| Base candidate IDX | 0 | 1 | 2 | 3 |
|---|---|---|---|---|
| $N^{th}$ MVP | $1^{st}$ MVP | $2^{nd}$ MVP | $3^{rd}$ MVP | $4^{th}$ MVP |

If the number of base candidate is equal to 1, Base candidate IDX is not signaled.

Distance index is motion magnitude information. Distance index indicates the pre-defined distance from the starting point information. Pre-defined distance is as follows:

TABLE 5

Distance IDX

| | Distance IDX | | | | | | | |
|---|---|---|---|---|---|---|---|---|
| | 0 | 1 | 2 | 3 | 4 | 5 | 6 | 7 |
| Pixel distance | 1/4-pel | 1/2-pel | 1-pel | 2-pel | 4-pel | 8-pel | 16-pel | 32-pel |

Direction index represents the direction of the MVD relative to the starting point. The direction index can represent of the four directions as shown below.

TABLE 6

Direction IDX

| Direction IDX | 00 | 01 | 10 | 11 |
|---|---|---|---|---|
| x-axis | + | − | N/A | N/A |
| y-axis | N/A | N/A | + | − |

UMVE flag is signaled right after sending a skip flag or merge flag. If skip or merge flag is true, UMVE flag is parsed. If UMVE flag is equal to 1, UMVE syntaxes are parsed. But, if not 1, AFFINE flag is parsed. If AFFINE flag is equal to 1, that is AFFINE mode, But, if not 1, skip/merge index is parsed for VTM's skip/merge mode.

Additional line buffer due to UMVE candidates is not needed. Because a skip/merge candidate of software is directly used as a base candidate. Using input UMVE index, the supplement of MV is decided right before motion compensation. There is no need to hold long line buffer for this.

In current common test condition, either the first or the second merge candidate in the merge candidate list could be selected as the base candidate.

UMVE is also known as Merge with MV Differences (MMVD).

2.2.6 Combined Intra-Inter Prediction (CIIP)

In JVET-L0100, multi-hypothesis prediction is proposed, wherein combined intra and inter prediction is one way to generate multiple hypotheses.

When the multi-hypothesis prediction is applied to improve intra mode, multi-hypothesis prediction combines one intra prediction and one merge indexed prediction. In a merge CU, one flag is signaled for merge mode to select an intra mode from an intra candidate list when the flag is true. For luma component, the intra candidate list is derived from only one intra prediction mode, i.e., planar mode. The weights applied to the prediction block from intra and inter prediction are determined by the coded mode (intra or non-intra) of two neighboring blocks (A1 and B1).

2.2.7 MERGE for Sub-Block-Based Technologies

It is suggested that all the sub-block related motion candidates are put in a separate merge list in addition to the regular merge list for non-sub block merge candidates.

The sub-block related motion candidates are put in a separate merge list is named as 'sub-block merge candidate list'.

In one example, the sub-block merge candidate list includes ATMVP candidate and affine merge candidates.

The sub-block merge candidate list is filled with candidates in the following order:
 a. ATMVP candidate (maybe available or unavailable);
 b. Affine merge lists (including Inherited Affine candidates; and Constructed Affine candidates)
 c. Padding as zero MV 4-parameter affine model 2.2.7.1 ATMVP (Aka Sub-Block Temporal Motion Vector Predictor, SbTMVP)

Basic idea of ATMVP is to derive multiple sets of temporal motion vector predictors for one block. Each sub-block is assigned with one set of motion information. When an ATMVP merge candidate is generated, the motion compensation is done in 8×8 level instead of the whole block level.

In current design, ATMVP predicts the motion vectors of the sub-CUs within a CU in two steps which are described in the following two sub-sections 2.2.7.1.1 and 2.2.7.1.2, respectively.

2.2.7.1.1 Derivation of Initialized Motion Vector

Denote the initialized motion vector by tempMv. When block A1 is available and non-intra coded (i.e., coded with inter or IBC mode), the following is applied to derive the initialized motion vector.

If all of the following conditions are true, tempMv is set equal to the motion vector of block A1 from list 1, denoted by $mvL1A_1$:
  Reference picture index of list 1 is available (not equal to −1), and it has the same picture order count (POC)

value as the collocated picture (i.e., DiffPicOrderCnt (ColPic, RefPicList[1][refIdxL1A$_1$]) is equal to 0), All reference pictures are with no larger POC compared to the current picture (i.e., DiffPicOrderCnt(aPic, currPic) is less than or equal to 0 for every picture aPic in every reference picture list of the current slice), Current slice is equal to B slice, collocated_from_l0_flag is equal to 0.

Otherwise if all of the following conditions are true, tempMv is set equal to the motion vector of block A1 from list 0, denoted by mvL0A$_1$:

Reference picture index of list 0 is available (not equal to −1), it has the same POC value as the collocated picture (i.e., DiffPicOrderCnt(ColPic, RefPicList[0][refIdxL0A$_1$]) is equal to 0).

Otherwise, zero motion vector is used as the initialized MV.

A corresponding block (with center position of current block plus the rounded MV, clipped to be in certain ranges in necessary) is identified in the collocated picture signaled at the slice header with the initialized motion vector.

If the block is inter-coded, then go to the 2$^{nd}$ step. Otherwise, the ATMVP candidate is set to be NOT available.

2.2.7.1.2 Sub-CU Motion Derivation

The second step is to split the current CU into sub-CUs and obtain the motion information of each sub-CU from the block corresponding to each sub-CU in the collocated picture.

If the corresponding block for a sub-CU is coded with inter mode, the motion information is utilized to derive the final motion information of current sub-CU by invoking the derivation process for collocated MVs which is not different with the process for conventional TMVP process. Basically, if the corresponding block is predicted from the target list X for uni-prediction or bi-prediction, the motion vector is utilized; otherwise, if it is predicted from list Y (Y=1−X) for uni or bi-prediction and NoBackwardPredFlag is equal to 1, MV for list Y is utilized. Otherwise, no motion candidate could be found.

If the block in the collocated picture identified by the initialized MV and location of current sub-CU is intra or IBC coded, or no motion candidate could be found as described aforementioned, the following further apply:

Denote the motion vector used to fetch the motion field in the collocated picture R$_{col}$ as MV$_{col}$. To minimize the impact due to MV scaling, the MV in the spatial candidate list used to derive MV$_{col}$ is selected in the following way: if the reference picture of a candidate MV is the collocated picture, this MV is selected and used as MV$_{col}$ without any scaling. Otherwise, the MV having a reference picture closest to the collocated picture is selected to derive MV$_{col}$ with scaling.

The related decoding process for collocated motion vectors derivation process in WET-N1001 is described as follows, with the parts related to ATMVP highlighted in bolded, capitalized font:

8.5.2.12 Derivation Process for Collocated Motion Vectors

Inputs to this process are:

a variable currCb specifying the current coding block, a variable colCb specifying the collocated coding block inside the collocated picture specified by ColPic, a luma location (xColCb, yColCb) specifying the top-left sample of the collocated luma coding block specified by colCb relative to the top-left luma sample of the collocated picture specified by ColPic, a reference index refIdxLX, with X being 0 or 1, a flag indicating a subblock temporal merging candidate sbFlag.

Outputs of this process are:

the motion vector prediction mvLXCol in 1/16 fractional-sample accuracy, the availability flag availableFlagLXCol.

The variable currPic specifies the current picture.

The arrays predFlagL0Col[x][y], mvL0Col[x][y] and refIdxL0Col[x][y] are set equal to PredFlagL0[x][y], MvDmvrL0[x][y] and RefIdxL0[x][y], respectively, of the collocated picture specified by ColPic, and the arrays predFlagL1Col[x][y], mvL1Col[x][y] and refIdxL1Col[x][y] are set equal to PredFlagL1[x][y], MvDmvrL1[x][y] and RefIdxL1[x][y], respectively, of the collocated picture specified by ColPic.

The variables mvLXCol and availableFlagLXCol are derived as follows:

If colCb is coded in an intra or IBC prediction mode, both components of mvLXCol are set equal to 0 and availableFlagLXCol is set equal to 0.

Otherwise, the motion vector mvCol, the reference index refIdxCol and the reference list identifier listCol are derived as follows:

If sbFlag is equal to 0, availableFlagLXCol is set to 1 and the following applies:

If predFlagL0Col[xColCb][yColCb] is equal to 0, mvCol, refIdxCol and listCol are set equal to mvL1Col[xColCb][yColCb], refIdxL1Col[xColCb][yColCb] and L1, respectively.

Otherwise, if predFlagL0Col[xColCb][yColCb] is equal to 1 and predFlagL1Col[xColCb][yColCb] is equal to 0, mvCol, refIdxCol and listCol are set equal to mvL0Col[xColCb][yColCb], refIdxL0Col[xColCb][yColCb] and L0, respectively.

Otherwise (predFlagL0Col[xColCb][yColCb] is equal to 1 and predFlagL1Col[xColCb][yColCb] is equal to 1), the following assignments are made:

If NoBackwardPredFlag is equal to 1, mvCol, refIdxCol and listCol are set equal to mvLXCol[xColCb][yColCb], refIdxLXCol[xColCb][yColCb] and LX, respectively.

Otherwise, mvCol, refIdxCol and listCol are set equal to mvLNCol[xColCb][yColCb], refIdxLNCol[xColCb][yColCb] and LN, respectively, with N being the value of collocated_from_l0_flag.

OTHERWISE (SBFLAG IS EQUAL TO 1), THE FOLLOWING APPLIES:

IF PREDFLAGLXCOL[XCOLCB][YCOLCB] IS EQUAL TO 1, MVCOL, REFIDXCOL, AND LISTCOL ARE SET EQUAL TO MVLXCOL[XCOLCB][YCOLCB], REFIDXLXCOL[XCOLCB][YCOLCB], AND LX, RESPECTIVELY, AVAILABLEFLAGLXCOL IS SET TO 1.

OTHERWISE (PREDFLAGLXCOL[XCOLCB][YCOLCB] IS EQUAL TO 0), THE FOLLOWING APPLIES:

IF DIFFPICORDERCNT(APIC, CURRPIC) IS LESS THAN OR EQUAL TO 0 FOR EVERY PICTURE APIC IN EVERY REFERENCE PICTURE LIST OF THE CURRENT SLICE AND PREDFLAGLYCOL[XCOLCB][YCOLCB] IS EQUAL TO 1, MVCOL, REFIDXCOL, AND LISTCOL ARE SET TO MVLYCOL[XCOLCB][YCOLCB], REFIDXLYCOL[XCOLCB][YCOLCB] AND LY,

RESPECTIVELY, WITH Y BEING EQUAL TO !X WHERE X BEING THE VALUE OF X THIS PROCESS IS INVOKED FOR. AVAILABLEFLAGLXCOL IS SET TO 1.

BOTH THE COMPONENTS OF MVLXCOL ARE SET TO 0 AND AVAILABLEFLAGLXCOL IS SET EQUAL TO 0.

When availableFlagLXCol is equal to TRUE, mvLXCol and availableFlagLXCol are derived as follows:

If LongTermRefPic(currPic, currCb, refIdxLX, LX) is not equal to LongTermRefPic(ColPic, colCb, refIdxCol, listCol), both components of mvLXCol are set equal to 0 and availableFlagLXCol is set equal to 0.

Otherwise, the variable availableFlagLXCol is set equal to 1, refPicList[listCol][refIdxCol] is set to be the picture with reference index refIdxCol in the reference picture list listCol of the slice containing coding block colCb in the collocated picture specified by ColPic, and the following applies:

$$colPocDiff=DiffPicOrderCnt(ColPic, refPicList[listCol][refIdxCol]) \quad (8\text{-}402)$$

$$currPocDiff=DiffPicOrderCnt(currPic, RefPicList[X][refIdxLX]) \quad (8\text{-}403)$$

The temporal motion buffer compression process for collocated motion vectors as specified in clause 8.5.2.15 is invoked with mvCol as input, and the modified mvCol as output.

If RefPicList[X][refIdxLX] is a long-term reference picture, or colPocDiff is equal to currPocDiff, mvLXCol is derived as follows:

$$mvLXCol=mvCol \quad (8\text{-}404)$$

Otherwise, mvLXCol is derived as a scaled version of the motion vector mvCol as follows:

$$tx=(16384+(Abs(td)>>1))/td \quad (8\text{-}405)$$

$$distScaleFactor=Clip3(-4096,4095,(tb*tx+32)>>6) \quad (8\text{-}406)$$

$$mvLXCol=Clip3(-131072,131071, (distScaleFactor*mvCol+128-(distScaleFactor*mvCol>=0))>>8)) \quad (8\text{-}407)$$

where td and tb are derived as follows:

$$td=Clip3(-128,127,colPocDiff) \quad (8\text{-}408)$$

$$tb=Clip3(-128,127,currPocDiff) \quad (8\text{-}409)$$

2.2.8 Regular Inter Mode (AMVP)

2.2.8.1 AMVP Motion Candidate List

Similar to the AMVP design in HEVC, up to 2 AMVP candidates may be derived. However, the HMVP candidates may also be added after the TMVP candidate. The HMVP candidates in the HMVP table are traversed in an ascending order of index (i.e., from index equal to 0, the oldest one). Up to 4 HMVP candidates may be checked to find whether its reference picture is the same as the target reference picture (i.e., same POC value).

2.2.8.2 AMVR

In HEVC, motion vector differences (MVDs) (between the motion vector and predicted motion vector of a PU) are signalled in units of quarter luma samples when use_integer_mv_flag is equal to 0 in the slice header. In the VVC, a locally adaptive motion vector resolution (AMVR) is introduced. In the VVC, MVD can be coded in units of quarter luma samples, integer luma samples or four luma samples (i.e., ¼-pel, 1-pel, 4-pel). The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

2.2.8.3 Symmetric Motion Vector Difference in JVET-N1001-v2

In JVET-N1001-v2, symmetric motion vector difference (SMVD) is applied for motion information coding in bi-prediction.

Firstly, in slice level, variables RefIdxSymL0 and RefIdxSymL1 to indicate the reference picture index of list 0/1 used in SMVD mode, respectively, are derived with the following steps as specified in N1001-v2. When at least one of the two variables are equal to −1, SMVD mode shall be disabled.

2.2.9 Refinement of Motion Information 2.2.9.1 Decoder-Side Motion Vector Refinement (DMVR)

In bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined.

Figure 19:
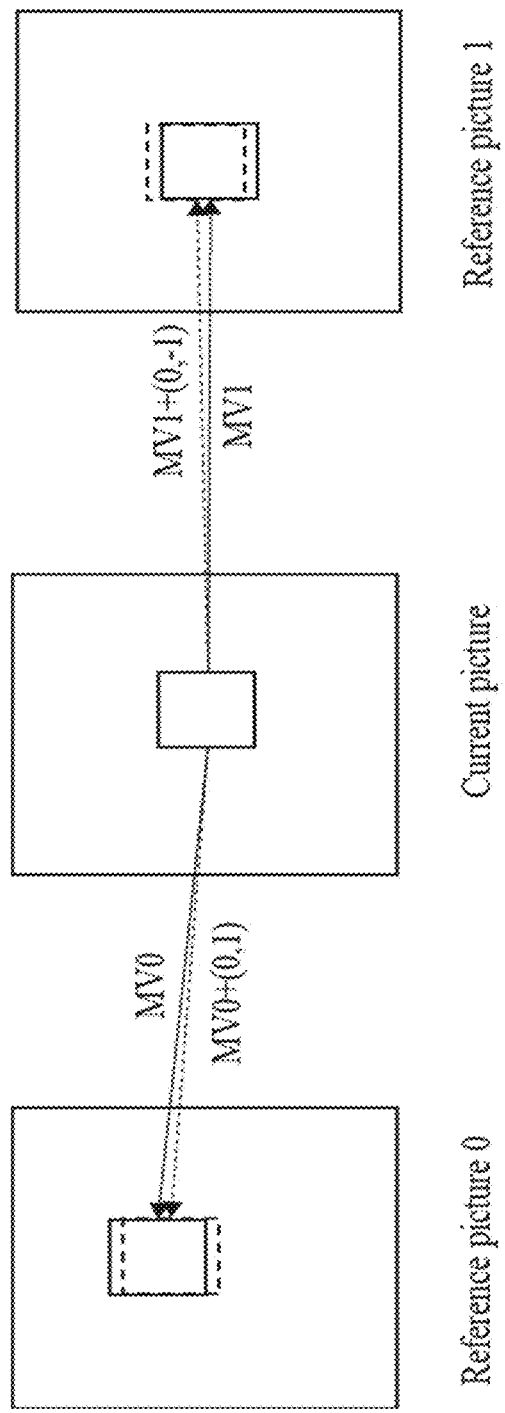
FIG. 19 shows an example of motion vector difference (MVD) (0, 1) mirrored between list 0 and list 1 in DMVR.

For DMVR in VVC, MVD mirroring between list 0 and list 1 is assumed as shown in FIG. 19 and bilateral matching is performed to refine the MVs, i.e., to find the best MVD among several MVD candidates. Denote the MVs for two reference picture lists by MVL0(L0X, L0Y), and MVL1 (L1X, L1Y). The MVD denoted by (MvdX, MvdY) for list 0 that could minimize the cost function (e.g., sum of absolute differences (SAD)) is defined as the best MVD. For the SAD function, it is defined as the SAD between the reference block of list 0 derived with a motion vector (L0X+MvdX, L0Y+MvdY) in the list 0 reference picture and the reference block of list 1 derived with a motion vector (L1X−MvdX, L1Y−MvdY) in the list 1 reference picture.

Figure 20:
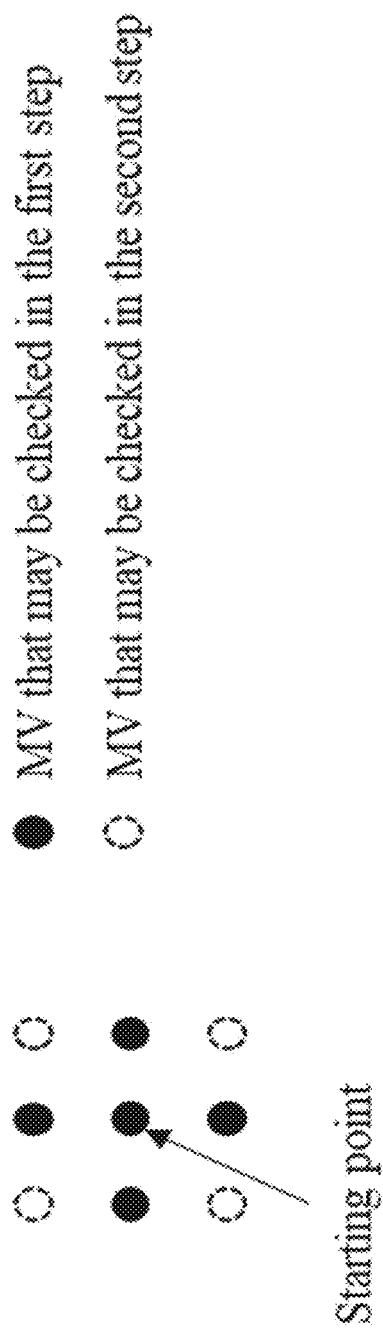
FIG. 20 shows MVs that may be checked in one iteration.

The motion vector refinement process may iterate twice. In each iteration, at most 6 MVDs (with integer-pel precision) may be checked in two steps, as shown in FIG. 20. In the first step, MVD (0, 0), (−1, 0), (1, 0), (0, −1), (0, 1) are checked. In the second step, one of the MVD (−1, −1), (−1, 1), (1, −1) or (1, 1) may be selected and further checked. Suppose function Sad(x, y) returns SAD value of the MVD (x, y). The MVD, denoted by (MvdX, MvdY), checked in the second step is decided as follows:

MvdX=−1;
MvdY=−1;
If (Sad(1, 0)<Sad(−1, 0))
  MvdX=1;
If (Sad(0, 1)<Sad(0,−1))
  MvdY=1;

In the first iteration, the starting point is the signaled MV, and in the second iteration, the starting point is the signaled MV plus the selected best MVD in the first iteration. DMVR applies only when one reference picture is a preceding picture and the other reference picture is a following picture, and the two reference pictures are with same picture order count distance from the current picture.

To further simplify the process of DMVR, JVET-M0147 proposed several changes to the design in JEM. More specifically, the adopted DMVR design to VTM-4.0 (to be released soon) has the following main features:

Early termination when (0,0) position SAD between list0 and list1 is smaller than a threshold.
Early termination when SAD between list0 and list1 is zero for some position.
Block sizes for DMVR: W*H>=64 && H>=8, wherein W and H are the width and height of the block.
Split the CU into multiple of 16×16 sub-blocks for DMVR of CU size>16*16. If only width or height of the CU is larger than 16, it is only split in vertical or horizontal direction.
Reference block size (W+7)*(H+7) (for luma).
25 points SAD-based integer-pel search (i.e. (+−) 2 refinement search range, single stage)
Bilinear-interpolation based DMVR.
"Parametric error surface equation" based sub-pel refinement. This procedure is performed only when the minimum SAD cost is not equal to zero and the best MVD is (0, 0) in the last MV refinement iteration.
Luma/chroma MC w/reference block padding (if needed).
Refined MVs used for MC and TMVPs only.

2.2.9.1.1 Usage of DMVR

When the following conditions are all true, DMVR may be enabled:

DMVR enabling flag in the SPS (i.e., sps_dmvr_enabled_flag) is equal to 1
TPM flag, inter-affine flag and subblock merge flag (either ATMVP or affine merge), MMVD flag are all equal to 0
Merge flag is equal to 1
Current block is bi-predicted, and POC distance between current picture and reference picture in list 1 is equal to the POC distance between reference picture in list 0 and current picture
The current CU height is greater than or equal to 8
Number of luma samples (CU width*height) is greater than or equal to 64

2.2.9.1.2 "Parametric Error Surface Equation" Based Sub-Pel Refinement

The method is summarized below:
1. The parametric error surface fit is computed only if the center position is the best cost position in a given iteration.
2. The center position cost and the costs at (−1,0), (0,−1), (1,0) and (0,1) positions from the center are used to fit a 2-D parabolic error surface equation of the form $$E(x,y) = A(x-x_0)^2 + B(y-y_0)^2 + C$$

where $(x_0, y_0)$ corresponds to the position with the least cost and C corresponds to the minimum cost value. By solving the 5 equations in 5 unknowns, $(x_0, y_0)$ is computed as:

$$x_0 = (E(-1,0) - E(1,0))/(2(E(-1,0) + E(1,0) - 2E(0,0)))$$

$$y_0 = (E(0,-1) - E(0,1))/(2(E(0,-1) + E(0,1) - 2E(0,0)))$$

$(x_0, y_0)$ can be computed to any required sub-pixel precision by adjusting the precision at which the division is performed (i.e. how many bits of quotient are computed). For $1/16^{th}$-pel accuracy, just 4-bits in the absolute value of the quotient needs to be computed, which lends itself to a fast-shifted subtraction-based implementation of the 2 divisions required per CU.

3. The computed $(x_0, y_0)$ are added to the integer distance refinement MV to get the sub-pixel accurate refinement delta MV.

2.2.9.2 Bi-Directional Optical Flow (BDOF, a.k.a. BIO)

2.2.9.2.1 Theoretical Analysis

In BIO, motion compensation is first performed to generate the first predictions (in each prediction direction) of the current block. The first predictions are used to derive the spatial gradient, the temporal gradient and the optical flow of each subblock/pixel within the block, which are then used to generate the second prediction, i.e., the final prediction of the subblock/pixel. The details are described as follows.

Bi-directional Optical flow (BIO) is sample-wise motion refinement which is performed on top of block-wise motion compensation for bi-prediction. The sample-level motion refinement doesn't use signalling Let $I^{(k)}$ be the luma value from reference k (k=0, 1) after block motion compensation, and $\partial I^{(k)}/\partial x$, $\partial I^{(k)}/\partial y$ are horizontal and vertical components of the $I^{(k)}$ gradient, respectively. Assuming the optical flow is valid, the motion vector field $(v_x, v_y)$ is given by an equation $$\partial I^{(k)}/\partial t + v_x \partial I^{(k)}/\partial x + v_y \partial I^{(k)}/\partial y = 0. \quad (7)$$

Combining this optical flow equation with Hermite interpolation for the motion trajectory of each sample results in a unique third-order polynomial that matches both the function values $I^{(k)}$ and derivatives $\partial I^{(k)}/\partial x$, $\partial I^{(k)}/\partial y$ at the ends. The value of this polynomial at t=0 is the BIO prediction:

$$pred_{BIO} = 1/2 \cdot (I^{(0)} + I^{(1)} + v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)). \quad (8)$$

Figure 26:
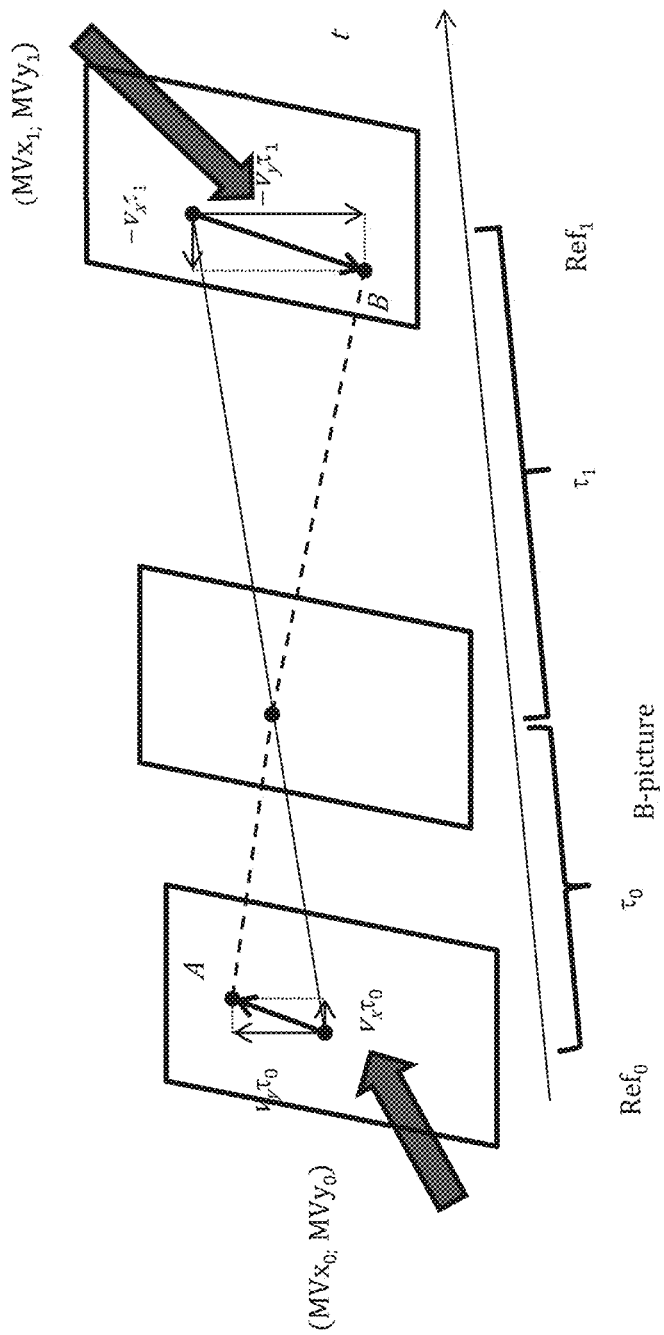
FIG. 26 shows an example of an optical flow trajectory.

Here, $\tau_0$ and $\tau_1$ denote the distances to the reference frames as shown in FIG. 26. Distances $\tau_0$ and $\tau_1$ are calculated based on POC for Ref0 and Ref1: $\tau_0$=POC(current)−POC(Ref0), $\tau_1$=POC(Ref1)−POC(current). If both predictions come from the same time direction (either both from the past or both from the future) then the signs are different (i.e., $\tau_0 \cdot \tau_1 < 0$). In this case, BIO is applied only if the prediction is not from the same time moment (i.e., $\tau_0 \neq \tau_1$), both referenced regions have non-zero motion ($MVx_0$, $MVy_0$, $MVx_1$, $MVy_1 \neq 0$) and the block motion vectors are proportional to the time distance ($MVx_0/MVx_1 = MVy_0/MVy_1 = -\tau_0/\tau_1$).

The motion vector field $(v_x, v_y)$ is determined by minimizing the difference Δ between values in points A and B (intersection of motion trajectory and reference frame planes in FIG. 26). Model uses only first linear term of a local Taylor expansion for Δ:

$$\Delta = I^{(0)} - I^{(1)} + v_x(\tau_1 \partial I^{(1)}/\partial x + \tau_0 \partial I^{(0)}/\partial x) + v_y(\tau_1 \partial I^{(1)}/\partial y + \tau_0 \partial I^{(0)}/\partial y)) \quad (9)$$

All values in Equation (9) depend on the sample location (i', j'), which was omitted from the notation so far. Assuming the motion is consistent in the local surrounding area, we minimize Δ inside the (2M+1)×(2M+1) square window Ω centered on the currently predicted point (i,j), where M is equal to 2:

$$(v_x, v_y) = \underset{v_x,v_y}{\operatorname{argmin}} \sum_{[i',j]\in\Omega} \Delta^2[i', j'] \quad (10)$$

For this optimization problem, the JEM uses a simplified approach making first a minimization in the vertical direction and then in the horizontal direction. This results in $$v_x = (s_1 + r) > m?\; \operatorname{clip3}\left(-thBIO,\; thBIO,\; -\frac{s_3}{(s_1+r)}\right): 0 \quad (11)$$

$$v_y = (s_5 + r) > m?\; \operatorname{clip3}\left(-thBIO,\; thBIO,\; -\frac{s_6 - v_x s_2/2}{(s_5+r)}\right): 0 \text{ where,} \quad (12)$$

$$s_1 = \sum_{[i',j]\in\Omega} \left(\tau_1 \partial I^{(1)}/\partial x + \tau_0 \partial I^{(0)}/\partial x\right)^2; \quad (13)$$

$$s_3 = \sum_{[i',j]\in\Omega} \left(I^{(1)} - I^{(0)}\right)\left(\tau_1 \partial I^{(1)}/\partial x + \tau_0 \partial I^{(0)}/\partial x\right);$$

$$s_2 = \sum_{[i',j]\in\Omega} \left(\tau_1 \partial I^{(1)}/\partial x + \tau_0 \partial I^{(0)}/\partial x\right)\left(\tau_1 \partial I^{(1)}/\partial y + \tau_0 \partial I^{(0)}/\partial y\right);$$

$$s_5 = \sum_{[i',j]\in\Omega} \left(\tau_1 \partial I^{(1)}/\partial y + \tau_0 \partial I^{(0)}/\partial y\right)^2;$$

$$s_6 = \sum_{[i',j]\in\Omega} \left(I^{(1)} - I^{(0)}\right)\left(\tau_1 \partial I^{(1)}/\partial y + \tau_0 \partial I^{(0)}/\partial y\right)$$

In order to avoid division by zero or a very small value, regularization parameters r and m are introduced in Equations (11) and (12).

$$r = 500 \cdot 4^{d-8} \quad (14)$$

$$m = 700 \cdot 4^{d-8} \quad (15)$$

Here d is bit depth of the video samples.

Figure 27B:
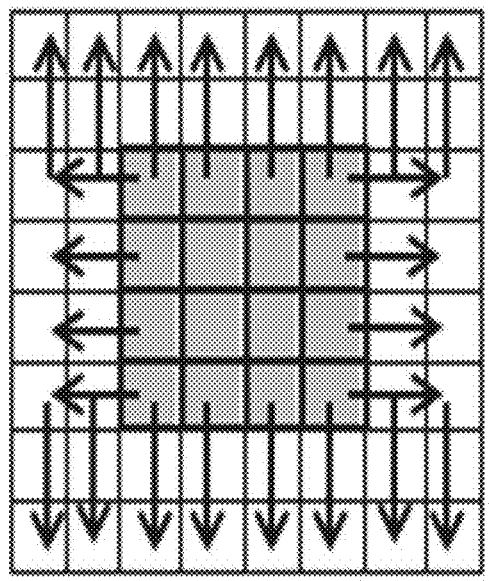
FIGS. 27A-27B show examples of Bi-directional Optical flow (BIO) w/o block extension.
Figure 27A:
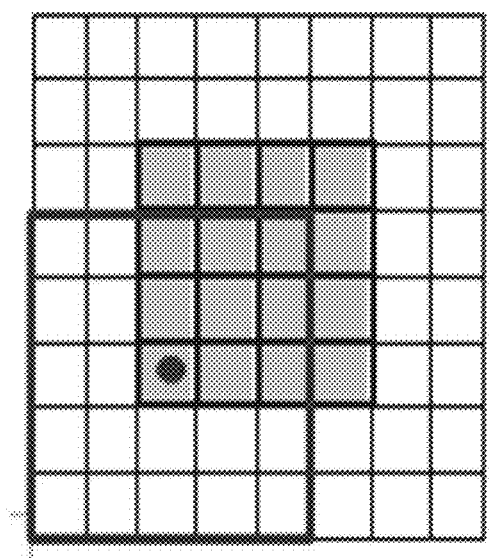

FIG. 27A shows access positions outside of the block. FIG. 27B shows that padding is used in order to avoid extra memory access and calculation. In order to keep the memory access for BIO the same as for regular bi-predictive motion compensation, all prediction and gradients values, $I^{(k)}$, $\partial I^{(k)}/\partial x$, $\partial I^{(k)}/\partial y$, are calculated only for positions inside the current block. In Equation (13), $(2M+1)\times(2M+1)$ square window $\Omega$ centered in currently predicted point on a boundary of predicted block needs to accesses positions outside of the block (as shown in FIG. 27A. In the JEM, values of $I^{(k)}$, $\partial I^{(k)}/\partial x$, $\partial I^{(k)}/\partial y$ outside of the block are set to be equal to the nearest available value inside the block. For example, this can be implemented as padding, as shown in FIG. 27B.

With BIO, it's possible that the motion field can be refined for each sample. To reduce the computational complexity, a block-based design of BIO is used in the JEM. The motion refinement is calculated based on 4×4 block. In the block-based BIO, the values of $s_n$ in Equation (13) of all samples in a 4×4 block are aggregated, and then the aggregated values of $s_n$ in are used to derived BIO motion vectors offset for the 4×4 block. More specifically, the following formula is used for block-based BIO derivation:

$$s_{1,b_k} = \sum_{(x,y)\in b_k} \sum_{[i',j]\in\Omega(x,y)} \left(\tau_1 \partial I^{(1)}/\partial x + \tau_0 \partial I^{(0)}/\partial x\right)^2; \quad (16)$$

$$s_{3,b_k} = \sum_{(x,y)\in b_k} \sum_{[i',j]\in\Omega} \left(I^{(1)} - I^{(0)}\right)\left(\tau_1 \partial I^{(1)}/\partial x + \tau_0 \partial I^{(0)}/\partial x\right);$$

-continued $$s_{2,b_k} = \sum_{(x,y)\in b_k} \sum_{[i',j]\in\Omega} \left(\tau_1 \partial I^{(1)}/\partial x + \tau_0 \partial I^{(0)}/\partial x\right)\left(\tau_1 \partial I^{(1)}/\partial y + \tau_0 \partial I^{(0)}/\partial y\right);$$

$$s_{5,b_k} = \sum_{(x,y)\in b_k} \sum_{[i',j]\in\Omega} \left(\tau_1 \partial I^{(1)}/\partial y + \tau_0 \partial I^{(0)}/\partial y\right)^2;$$

$$s_{6,b_k} = \sum_{(x,y)\in b_k} \sum_{[i',j]\in\Omega} \left(I^{(1)} - I^{(0)}\right)\left(\tau_1 \partial I^{(1)}/\partial y + \tau_0 \partial I^{(0)}/\partial y\right)$$

where $b_k$ denotes the set of samples belonging to the k-th 4×4 block of the predicted block. $s_n$ in Equations (11) and (12) are replaced by $((s_{n,b_k}) >> 4)$ to derive the associated motion vector offsets.

In some cases, MV regiment of BIO might be unreliable due to noise or irregular motion. Therefore, in BIO, the magnitude of MV regiment is clipped to a threshold value thBIO. The threshold value is determined based on whether the reference pictures of the current picture are all from one direction. If all the reference pictures of the current picture are from one direction, the value of the threshold is set to $12\times2^{14-d}$; otherwise, it is set to $12\times2^{13-d}$.

Gradients for BIO are calculated at the same time with motion compensation interpolation using operations consistent with HEVC motion compensation process (two dimensional (2D) separable finite impulse response (FIR)). The input for this 2D separable FIR is the same reference frame sample as for motion compensation process and fractional position (fracX, fracY) according to the fractional part of block motion vector. In case of horizontal gradient $\partial I/\partial y$ signal first interpolated vertically using BIOfilterS corresponding to the fractional position fracY with de-scaling shift d−8, then gradient filter BIOfilterG is applied in horizontal direction corresponding to the fractional position fracX with de-scaling shift by 18−d. In case of vertical gradient $\partial I/\partial y$ first gradient filter is applied vertically using BIOfilterG corresponding to the fractional position fracY with de-scaling shift d−8, then signal displacement is performed using BIOfilterS in horizontal direction corresponding to the fractional position fracX with de-scaling shift by 18−d. The length of interpolation filter for gradients calculation BIOfilterG and signal displacement BIOfilterF is shorter (6-tap) in order to maintain reasonable complexity.

In the JEM, BIO is applied to all bi-predicted blocks when the two predictions are from different reference pictures. When local illumination compensation (LIC) is enabled for a CU, BIO is disabled.

In the JEM, overlapped block motion compensation (OBMC) is applied for a block after normal MC process. To reduce the computational complexity, BIO is not applied during the OBMC process. This means that BIO is only applied in the MC process for a block when using its own MV and is not applied in the MC process when the MV of a neighboring block is used during the OBMC process.

2.2.9.2.2 BIO in VTM-3.0 as Proposed in JVET-L0256

Step 1: Judge Whether BIO is Applicable (W and H are Width and Height of Current Block)

BIO is not applicable if
    Affine coded
    ATMVP coded
    (iPOC−iPOC0)*(iPOC−iPOC1)>=0
    H==4 or (W==4 and H==8)
    With Weighted Prediction
    GBi weights are not (1,1)
BIO is not used if
    Total SAD between the two reference blocks (denoted as R0 and R1) is smaller than a threshold.

$$SAD = \sum_{(x,y)} |R0(x, y) - R1(x, y)|$$

Step 2: Data Preparation

For a W×H block, (W+2)×(H+2) samples are interpolated.

The inner W×H samples are interpolated with the 8-tap interpolation filter as in normal motion compensation The four side outer lines of samples (black circles in FIG. 28) are interpolated with the bi-linear filter For each position, gradients are calculated on the two reference blocks (denoted as R0 and R1)

$$Gx0(x,y)=(R0(x+1,y)-R0(x-1,y))>>4$$

$$Gy0(x,y)=(R0(x,y+1)-R0(x,y-1))>>4$$

$$Gx1(x,y)=(R1(x+1,y)-R1(x-1,y))>>4$$

$$Gy1(x,y)=(R1(x,y+1)-R1(x,y-1))>>4$$

For each position, internal values are calculated as $$T1=(R0(x,y)>>6)-(R1(x,y)>>6), T2=(Gx0(x,y)+Gx1(x,y))>>3,$$

$$T3=(Gy0(x,y)+Gy1(x,y))>>3$$

$$B1(x,y)=T2*T2, B_2(x,y)=T2*T3, B3(x,y)=-T1*T2, B5(x,y)=T3*T3,$$

$$B6(x,y)=-T1*T3$$

Step 3: Calculate Prediction for Each Block

BIO is skipped for a 4×4 block if SAD between the two 4×4 reference blocks is smaller than a threshold.
Calculate Vx and Vy.

Calculate the final prediction for each position in the 4×4 block.

$$b(x,y)—(Vx(Gx^0(x,y)-Gx^1(x,y))+Vy(Gy^0(x,y)-Gy^1(x,y))+1)>>1$$

$$P(x,y)—(R^0(x,y)+R^1(x,y)+b(x,y)+\text{offset})>>\text{shift}$$

b(x,y) is known as a correction item.

2.2.9.2.2 BIO in VTM-4.0

WET-M0063, which proposed to round the results of calculation in BDOF depending on bit-depth was adopted into VTM-4.0.

Figure 28:
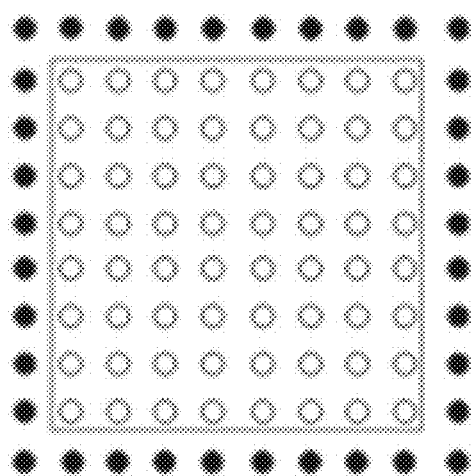
FIG. 28 shows examples of interpolated samples used in BIO.

WET-M0487 was adopted into VTM-4.0, which removed the bi-linear filtering and fetched the nearest integer pixel of the reference block to pad the four side outer lines of samples (black circles in FIG. 28).

2.2.9.3 PROF

VVC has a method to refine the sub-block based affine motion compensated prediction with optical flow. After the sub-block based affine motion compensation is performed, prediction sample is refined by adding a difference derived by the optical flow equation, which is referred as prediction refinement with optical flow (PROF). The proposed method can achieve inter prediction in pixel level granularity without increasing the memory access bandwidth.

To achieve a finer granularity of motion compensation, this contribution proposes a method to refine the sub-block based affine motion compensated prediction with optical flow. After the sub-block based affine motion compensation is performed, luma prediction sample is refined by adding a difference derived by the optical flow equation. The proposed PROF (prediction refinement with optical flow) is described as following four steps.

Step 1) The sub-block-based affine motion compensation is performed to generate sub-block prediction I(i,j).

Step 2) The spatial gradients $g_x(i,j)$ and $g_y(i,j)$ of the sub-block prediction are calculated at each sample location using a 3-tap filter [−1, 0, 1].

$$g_x(i,j)=i(i+1,j)-I(i-1,j)$$

$$g_y(i,j)=I(i,j+1)-I(i,j-1)$$

The sub-block prediction is extended by one pixel on each side for the gradient calculation. To reduce the memory bandwidth and complexity, the pixels on the extended borders are copied from the nearest integer pixel position in the reference picture. Therefore, additional interpolation for padding region is avoided.

Figure 29:
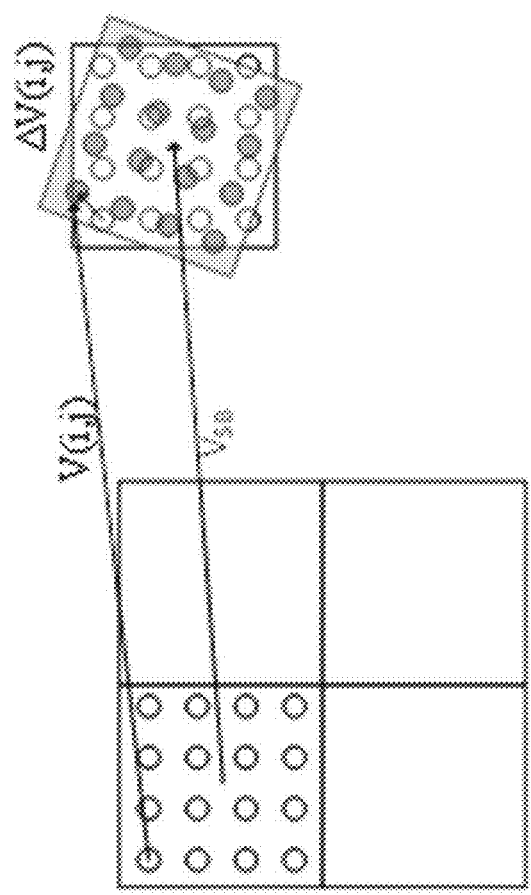
FIG. 29 shows an example of Sub-block motion vector (MV) vestigal side band (VSB) and pixel Δv(i, j).

Step 3) The luma prediction refinement (denoted ΔI) as is calculated by the optical flow equation.

$$\Delta I(i,j)=g_x(i,j)*\Delta v_x(i,j)+g_y(i,j)*\Delta v_y(i,j)$$

where the delta MV (denoted as Δv(i, j)) is the difference between pixel MV computed for sample location (i,j), denoted by v(i,j), and the sub-block MV of the sub-block to which pixel (i,j) belongs, as shown in FIG. 29. This is indicated by the arrows in FIG. 29.

Since the affine model parameters and the pixel location relative to the sub-block center are not changed from sub-block to sub-block, Δv(i,j) can be calculated for the first sub-block, and reused for other sub-blocks in the same CU. Let x and y be the horizontal and vertical offset from the pixel location to the center of the sub-block, Δv(x, y) can be derived by the following equation, $$\begin{cases} \Delta v_x(x, y) = c*x + d*y \\ \Delta v_y(x, y) = e*x + f*y \end{cases}$$

For 4-parameter affine model, $$\begin{cases} c = f = \dfrac{v_{1x} - v_{0x}}{w} \\ e = -d = \dfrac{v_{1y} - v_{0y}}{w} \end{cases}$$

For 6-parameter affine model, $$\begin{cases} c = \dfrac{v_{1x} - v_{0x}}{w} \\ d = \dfrac{v_{2x} - v_{0x}}{h} \\ e = \dfrac{v_{1y} - v_{0y}}{w} \\ f = \dfrac{v_{2y} - v_{0y}}{h} \end{cases}$$

where $(v_{0x}, v_{0y})$, $(v_{1x}, v_{1y})$, $(v_{2x}, v_{2y})$ are the top-left, top-right and bottom-left control point motion vectors, w and h are the width and height of the CU.

Step 4) Finally, the luma prediction refinement is added to the sub-block prediction I(i,j). The final prediction I' is generated as the following equation.

$$I'(i,j)=I(i,j)+\Delta I(i,j)$$

2.2.9.4 Enabling/Disabling of DMVR/BIO/PROF

DMVR/BIO/PROF could be enabled/disabled in SPS level. An enabling/disabling flag for each of the three coding tools, i.e., DMVR, BIO, PROF, is signaled in SPS. More specifically, sps_bdof_enabled_flag, sps_dmvr_enabled_flag, sps_affine_prof_enabled_flag are the three corresponding flags in the VVC working draft.

DMVR and BIO could also be enabled/disabled in slice level according to the flag of slice_disable_bdof_dmvr_flag. If the slice level flag indicates the tools are disabled, all blocks within the slice are disallowed to use DMVR/BDOF. In addition to that, when the flag indicates the tools are allowed, then for a block, the DMVR/BDOF may be further disabled if certain conditions are satisfied.

The syntax and semantics related to the three tools are highlighted as follows:

However, PROF couldn't be enabled/disabled in slice level.

7.3.2.3 Sequence Parameter Set Raw Byte Sequence Payload (RBSP) Syntax

| | Descriptor |
|---|---|
| seq_parameter_set_rbsp( ) { | |
|   sps_decoding_parameter_set_id | u(4) |
|   SPS_BDOF_ENABLED_FLAG | U(1) |
|   sps_smvd_enabled_flag | u(1) |
|   SPS_DMVR_ENABLED_FLAG | U(1) |
|   IF( SPS_BDOF_ENABLED_FLAG || SPS_DMVR_ENABLED_FLAG) | |
|     SPS_BDOF_DMVR_SLICE_PRESENT_FLAG | U(1) |
|   sps_mmvd_enabled_flag | u(1) |
|   sps_isp_enabled_flag | u(1) |
|   sps_mrl_enabled_flag | u(1) |
|   sps_mip_enabled_flag | u(1) |
|   ... | |
|   sps_sbt_enabled_flag | u(1) |
|   if( sps_sbt_enabled_flag ) | |
|     sps_sbt_max_size_64_flag | u(1) |
|   sps_affine_enabled_flag | u(1) |
|   IF( SPS_AFFINE_ENABLED_FLAG ) { | |
|     sps_affine_type_flag | u(1) |
|     sps_affine_amvr_enabled_flag | u(1) |
|     SPS_AFFINE_PROF_ENABLED_FLAG | U(1) |
|   } | |
|   if( chroma_format_idc == 3 ) | |
|     sps_palette_enabled_flag | u(1) |
|   sps_bcw_enabled_flag | u(1) |
|   sps_ibc_enabled_flag | u(1) |
|   sps_ciip_enabled_flag | u(1) |
|   if( sps_mmvd_enabled_flag ) | |
|     sps_fpel_mmvd_enabled_flag | u(1) |
|   sps_triangle_enabled_flag | u(1) |
|   sps_lmcs_enabled_flag | u(1) |
|   ... | |
| } | |

7.4.3.3 Sequence Parameter Set RBSP Semantics sps_bdof_enabled_flag equal to 0 specifies that the bi-directional optical flow inter prediction is disabled. sps_bdof_enabled_flag equal to 1 specifies that the bi-directional optical flow inter prediction is enabled.

sps_dmvr_enabled_flag equal to 1 specifies that decoder motion vector refinement based inter bi-prediction is enabled. sps_dmvr_enabled_flag equal to 0 specifies that decoder motion vector refinement based inter bi-prediction is disabled.

sps_bdof_dmvr_slice_present_flag equal to 1 specifies that slice_disable_bdof_dmvr_flag is present in slice headers referring to the SPS. sps_bdof_dmvr_slice_present_flag equal to 0 specifies that slice_disable_bdof_dmvr_flag is not present in slice headers referring to the SPS. When sps_bdof_dmvr_slice_present_flag is not present, the value of sps_bdof_dmvr_slice_present_flag is inferred to be equal to 0.

sps_affine_prof_enabled_flag specifies whether the prediction refinement with optical flow can be used for affine motion compensation. If sps_affine_prof_enabled_flag is equal to 0, the affine motion compensation shall not be refined with optical flow. Otherwise (sps_affine_prof_enabled_flag is equal to 1), the affine motion compensation can be refined with optical flow. When not present, the value of sps_affine_prof_enabled_flag is inferred to be equal to 0.

7.3.6 Slice Header Syntax
7.3.6.1 General Slice Header Syntax

| | Descriptor |
|---|---|
| slice_header( ) { | |
|   ... | |
|   if( ( pps_weighted_pred_flag && slice_type == P ) || | |
|     ( pps_weighted_bipred_flag && slice_type == B ) ) | |
|     pred_weight_table( ) | |
|   if( !pps_six_minus_max_num_merge_cand_plus1 ) | |
|     six_minus_max_num_merge_cand | ue(v) |
|   if( sps_affine_enabled_flag && | |
|     !pps_five_minus_max_num_subblock_merge_cand_plus1 ) | |
|     five_minus_max_num_subblock_merge_cand | ue(v) |
|   if( sps_fpel_mmvd_enabled_flag ) | |
|     slice_fpel_mmvd_enabled_flag | u(1) |
|   IF( SPS_BDOF_DMVR_SLICE_PRESENT_FLAG ) | |
|     SLICE_DISABLE_BDOF_DMVR_FLAG | U(1) |
|   if( sps_triangle_enabled_flag && MaxNumMergeCand >= 2 && | |
|     !pps_max_num_merge_cand_minus_max_num_triangle_cand_minus1 ) | |
|     max_num_merge_cand_minus_max_num_triangle_cand | ue(v) |
|   } | |
|   ... | |
| } | |

Disabling DMVR for a block happens when dmvrFlag is set to false.

8.5.1 General Decoding Process for Coding Units Coded in Inter Prediction Mode

The decoding process for coding units coded in inter prediction mode consists of the following ordered steps:
1. The variable dmvrFlag is set equal to 0 and the variable hpelIfIdx is set equal to 0.
2. The motion vector components and reference indices of the current coding unit are derived as follows:
   If MergeTriangleFlag[xCb][yCb], inter affine flag [xCb][yCb] and merge_subblock_flag[xCb][yCb] are all equal to 0, the following applies:
       The derivation process for motion vector components and reference indices as specified in clause 8.5.2.1 is invoked with the luma coding block location (xCb, yCb), the luma coding block width cbWidth and the luma coding block height cbHeight as inputs, and the luma motion vectors mvL0 [0][0] and mvL1 [0][0], the reference indices refIdxL0 and refIdxL1 and the prediction list utilization flags predFlagL0 [0][0] and predFlagL1 [0][0], the half sample interpolation filter index hpelIfIdx, and the bi-prediction weight index bcwIdx as outputs.
       When all of the following conditions are true, dmvrFlag is set equal to 1:
           sps_dmvr_enabled_flag is equal to 1 and slice_disable_bdof_dmvr_flag is equal to 0
           general_merge_flag[xCb][yCb] is equal to 1
           both predFlagL0 [0][0] and predFlagL1 [0][0] are equal to 1
           mmvd_merge_flag[xCb][yCb] is equal to 0
           ciip_flag[xCb][yCb] is equal to 0
           DiffPicOrderCnt(currPic, RefPicList[0][refIdxL0]) is equal to DiffPicOrderCnt(RefPicList[1][refIdxL1], currPic)
           BcwIdx[xCb][yCb] is equal to 0
           Both luma_weight_l0_flag[refIdxL0] and luma_weight_l1_flag[refIdxL1] are equal to 0
           cbWidth is greater than or equal to 8
           cbHeight is greater than or equal to 8
           cbHeight*cbWidth is greater than or equal to 128
           For X being each of 0 and 1, the pic_width_in_luma_samples and pic_height_in_luma_samples of the reference picture refPicLX associated with the refIdxLX are equal to the pic_width_in_luma_samples and pic_height_in_luma_samples of the current picture, respectively.

Disabling BDOF for a block happens when bdofFlag is set to false.

8.5.6 Decoding Process for Inter Blocks
8.5.6.1 General

Let predSamplesL0$_L$, predSamplesL0$_L$ and predSamplesIntra$_L$ be (cbWidth)×(cbHeight) arrays of predicted luma sample values and, predSamplesL0$_{Cb}$, predSamplesL1$_{Cb}$, predSamplesL0$_{Cr}$ and predSamplesL1$_{Cr}$, predSamplesIntra$_{Cb}$, and predSamplesIntra$_{Cr}$ be (cbWidth/Sub WidthC)×(cbHeight/SubHeightC) arrays of predicted chroma sample values.

The variable currPic specifies the current picture and the variable bdofFlag is derived as follows:
1. If all of the following conditions are true, bdofFlag is set equal to TRUE.
   sps_bdof_enabled_flag is equal to 1 and slice_disable_bdof_dmvr_flag is equal to 0.
   predFlagL0[xSbIdx][ySbIdx] and predFlagL1[xSbIdx][ySbIdx] are both equal to 1.
   DiffPicOrderCnt(currPic, RefPicList[0][refIdxL0]) *DiffPicOrderCnt(currPic, RefPicList[1][refIdxL1]) is less than 0.
   MotionModelIdc[xCb][yCb] is equal to 0.
   merge_subblock_flag[xCb][yCb] is equal to 0.
   sym_mvd_flag[xCb][yCb] is equal to 0.
   ciip_flag[xCb][yCb] is equal to 0.
   BcwIdx[xCb][yCb] is equal to 0.
   luma_weight_l0_flag[refIdxL0] and luma_weight_l1_flag[refIdxL1] are both equal to 0.
   cbWidth is greater than or equal to 8.
   cbHeight is greater than or equal to 8.
   cbHeight*cbWidth is greater than or equal to 128.
   For X being each of 0 and 1, the pic_width_in_luma_samples and pic_height_in_luma_samples of the reference picture refPicLX associated with the refIdxLX are equal to the pic_width_in_luma_samples and pic_height_in_luma_samples of the current picture, respectively.
   cIdx is equal to 0.
2. Otherwise, bdofFlag is set equal to FALSE.

2.2.10 GEO

Geometric merge mode (GEO) was proposed in NET-P0068 as additional mode of TPM.

2.2.10.1 Concept Description

Figure 30:
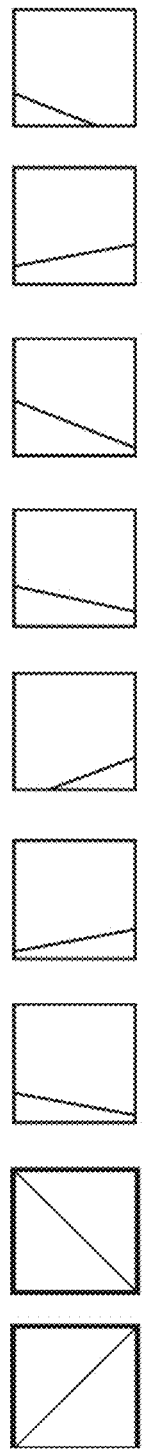
FIG. 30 shows example of a proposal in Joint Video Exploration Team (JVET)-P0068 and Triangular prediction mode (TPM) design in versatile video coding (VVC) test model (VTM)-6.0.

FIG. 30 illustrates TPM in VTM-6.0 and additional shapes proposed for non-rectangular inter blocks.

Similarly to TPM proposed GEO partitioning for inter is allowed for uni-predicted blocks not smaller than 8×8 in order to have the same memory bandwidth with bi-predicted blocks at decoder side. Motion vector prediction for GEO partitioning is aligned with TPM. As well as in TPM blending between 2 predictions is applied on inner boundary.

Figure 31:
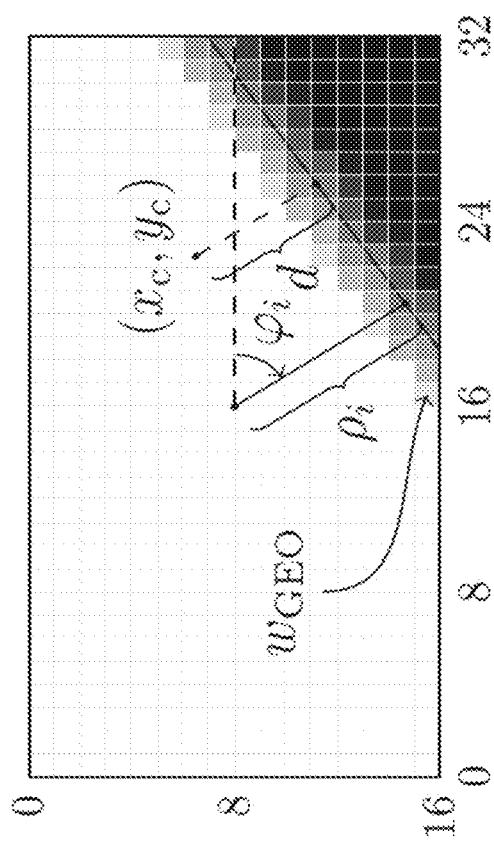
FIG. 31 shows Geometric merge mode (GEO) split boundary description.
Figure 32:
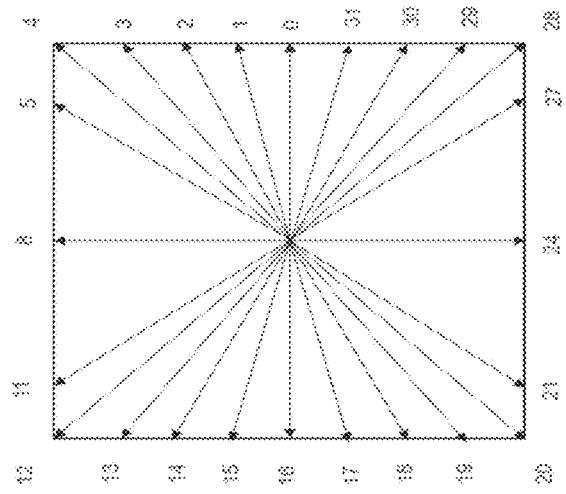
FIG. 32 shows examples of angles quantization of geometric merge mode.
Figure 32:
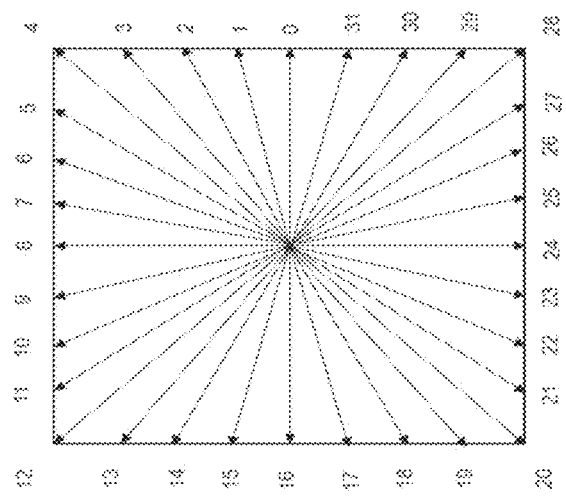

The split boundary of geometric merge mode is descripted by angle $\varphi_i$ and distance offset $\rho_i$ as shown in FIG. 31. Angle $\varphi_i$ represents a quantized angle between 0 and 360 degrees and distance offset $\rho_i$ represents a quantized offset of the largest distance $\rho_{max}$. In addition, the split directions overlapped with binary tree splits and TPM splits are excluded.

2.2.10.2 Angle and Distance Quantization.

Angles $\varphi_i$ is quantized between 0 and 360 degrees with a fix step.

Distance $p_i$ is quantized from the largest possible distance $\rho_{max}$ with a fixed step. The value of $\rho_{max}$ can be geometrically derived by Eq. (1) for either w or h is equal to 8 and scaled with log 2 scaled short edge length. For $\varphi$ is equal to 0 degree case, $\rho_{max}$ is equal to w/2 and for $\varphi$ is equal to 90 degree case, $\rho_{max}$ is equal to h/2 and. The shifted back "1.0" samples is to avoid that the split boundary is too close to the corner.

$$\rho_{max}(\varphi, w, h) = \cos(\varphi)\left(\frac{h}{2\tan\left(\frac{\pi}{2} - \varphi\right)} + \frac{w}{2}\right) - 1.0, 0 < \varphi < \frac{\pi}{2} \quad (1)$$

The distance $\rho_i$ is quantized with 5 steps, considering 32 angles there is in total 140 split modes excludes the binary tree and TPM splits. Or with 108 modes, the distance $\rho_i$ is quantized with 4 steps, considering 32 angles there is in total 108 split modes exclude the binary tree and TPM splits. Or with 80 modes, the distance $\rho_i$ is quantized with 4 steps, considering 24 angles there is in total 80 split modes exclude the binary tree and TPM splits.

2.2.10.3 Blending Operation for Luma Blocks

Same as TPM mode, in geometric merge mode, the final predictor $P_B$ with the 3 bits blending mask $W_0$ and $W_1$ as in Eq. (2)

$$P_B=(W_0P_0W_1P_1+4)>>3 \qquad (2)$$

The blending masks of geometric merge mode are derived from the distance of the sample position and the split boundary using look-up tables with Eq. (3), (4) and (5)

$$\text{distFromLine}=((x<<1)+1)*Dis[\text{displacement}X]+ \\ ((y<<1)+1))*Dis[\text{displacement}Y]-rho \qquad (3)$$

$$\text{distScaled}=\text{Clip3}(0,26,(\text{abs}(\text{distFromLine})+4)>>3) \qquad (4)$$

$$\text{sampleWeightL}[x][y]=\text{distFromLine}<=0?\text{GeoFilter} \\ [\text{distScaled}]:8-\text{GeoFilter}[\text{distScaled}] \qquad (5)$$

where 3 look-up tables, Dis[·] with 32 entries, StepDis[·] with 36 entries and GeoFilter[·] with 26 entries are involved.

The bottom-left sample of current block is guaranteed to be predicted from $P_0$. In other words, when the distFromLine of the bottom-left sample is negative, $W_0$ is equal to sampleWeightL[x][y] and $W_1$ is equal to 8–$W_0$. Otherwise (the distFromLine of the bottom-left sample is positive), $W_1$ is equal to sampleWeightL[x][y] and $W_0$ is equal to 8–$W_1$

2.2.10.4 Blending Operation for Chroma Blocks

The sample weights calculated for the luma samples are subsampled and are used for chroma blending without any computation. The chroma sample weight at coordinate (x,y) is set equal to luma sample weight at coordinate (2x,2y) w.r.t. the top-left sample of luma block.

2.2.10.5 Motion Vector Derivation

Same merge list derivation process that is used for TPM is used for deriving motion vectors of each partition of the GEO block. Each partition is predicted only by uni-prediction.

2.2.10.6 Motion Vector Storage

The distance between the central position of a 4×4 motion storage unit and the split boundary is calculated and compared with a fixed threshold to decide whether uni- or bi prediction motion information is storage for this 4×4 motion storage unit. The sign of the distance is indicate which uni-prediction motion information should be stored in uni-prediction storage case. In CE4-1.14 the dependency of blending mask and motion storage are removed.

2.2.10.7 Mode Signalling

According to the proposed method the GEO mode is signalled as an additional merge mode together with TPM mode.

TABLE 3

Syntax elements introduced by the proposal

```
if( !ciip_flag[ x0 ][ y0 ] && MaxNumTriangleMergeCand > 1 )
{
    IF (CBWIDTH > = 8 && CBHEIGHT >= 8 )
        MERGE_GEO_FLAG[ X0 ][ Y0 ]              ae(v)
    IF ( MERGE_GEO_FLAG [ X0 ][ Y0 ]
        MERGE_GEO_IDX[ X0 ][ Y0 ]               ae(v)
    ELSE
        merge_triangle_split_dir[ x0 ][ y0 ]    ae(v)
    merge_triangle_idx0[ x0 ][ y0 ]             ae(v)
    merge_triangle_idx1[ x0 ][ y0 ]             ae(v)
}
```

The merge_geo_flag[ ][ ] is signaled with 4 Context-adaptive binary arithmetic coding (CABAC) context models, first 3 are derived depending on the mode of above and left neighbouring blocks, the 4th is derived depending the aspect ratio of the current block. merge_geo_flag[ ][ ] is indicate whether current block is using GEO mode or TPM mode, which is similar as a "most probable mode" flag.

The geo_partition_idx[ ][ ] is used as an index to the lookup table that stores the angle $\varphi_i$ and distance $\rho_i$ pairs. The geo_partition_idx coded truncated binary and binarized using bypass.

2.2.10.8 Summary of TPM and GEO Comparisons

The GEO mode shares the same concept as that of TPM while providing more flexible partitioning option for motion compensation. The prediction procedure of GEO is similar to that of TPM. However, the adaptive weights used in the blending process of GEO are calculated using different equations from those used in TPM. Besides, the motion field storage of GEO is different from that of TPM. The differences between these two modes are listed in the table below.

|  | TPM | GEO |
| --- | --- | --- |
| Restrictions on block size | Block size ≥ 64 samples | Block width ≥ 8 and block height ≥ 8 |
| Syntax structure | One flag to separate TPM and GEO mode at CU level | |
| Interaction with SBT (subblock transform) | SBT is not applied to TPM blocks | SBT is applied to GEO blocks |
| Weights for luma samples | Calculated using different equations | |
| Weights for chroma samples | Calculated using equations | Sub sampled from the weights of luma samples |
| Masks for motion field storage | Calculated using equations | Calculated using equations or derived from the weights of luma samples |

2.3 Intra Block Copy

Figure 21:
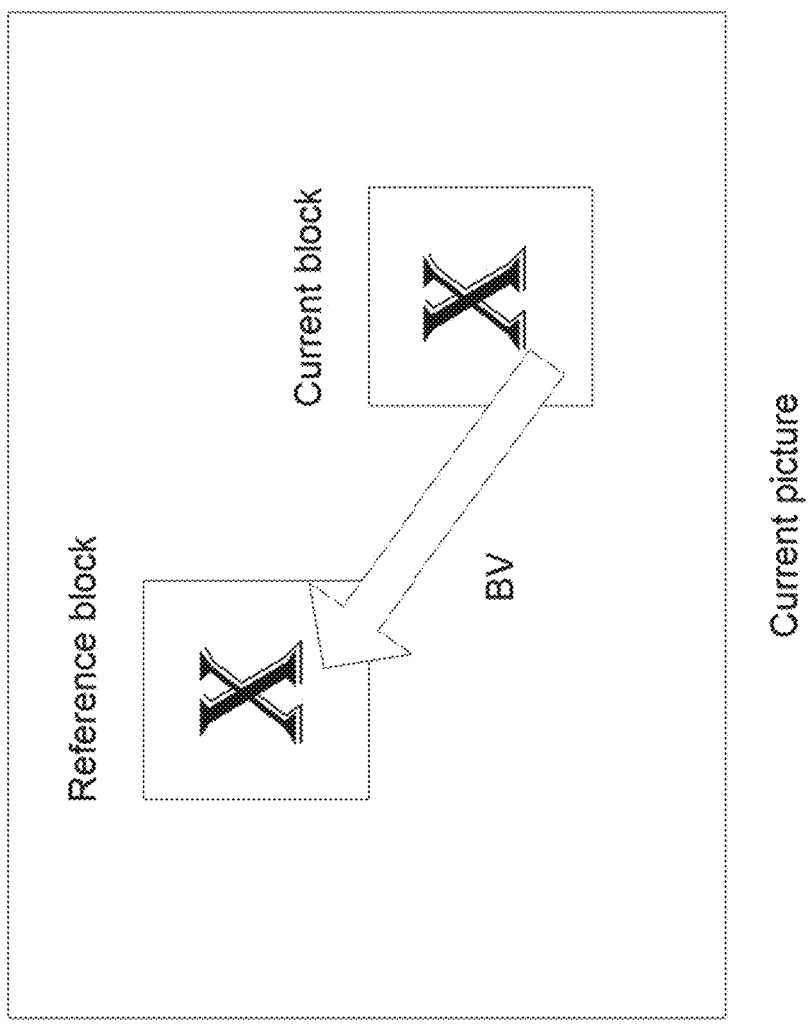
FIG. 21 is an example of intra block copy.

Intra block copy (IBC), a.k.a. current picture referencing, has been adopted in HEVC Screen Content Coding extensions (HEVC-SCC) and the current VVC test model (VTM-4.0). IBC extends the concept of motion compensation from inter-frame coding to intra-frame coding. As demonstrated in FIG. 21. the current block is predicted by a reference block in the same picture when IBC is applied. The samples in the reference block must have been already reconstructed before the current block is coded or decoded. Although IBC is not so efficient for most camera-captured sequences, it shows significant coding gains for screen content. The reason is that there are lots of repeating patterns, such as icons and text characters in a screen content picture. IBC can remove the redundancy between these repeating patterns effectively. In HEVC-SCC, an inter-coded coding unit (CU) can apply IBC if it chooses the current picture as its reference picture. The MV is renamed as block vector (BV) in this case, and a BV always has an integer-pixel precision. To be compatible with main profile HEVC, the current picture is marked as a "long-term" reference picture in the Decoded Picture Buffer (DPB). It should be noted that similarly, in multiple view/3D video coding standards, the inter-view reference picture is also marked as a "long-term" reference picture.

Following a BV to find its reference block, the prediction can be generated by copying the reference block. The residual can be got by subtracting the reference pixels from the original signals. Then transform and quantization can be applied as in other coding modes.

However, when a reference block is outside of the picture, or overlaps with the current block, or outside of the reconstructed area, or outside of the valid area restricted by some constrains, part or all pixel values are not defined. Basically, there are two solutions to handle such a problem. One is to disallow such a situation, e.g. in bitstream conformance. The other is to apply padding for those undefined pixel values. The following sub-sessions describe the solutions in detail.

2.3.1 IBC in VVC Test Model (VTM4.0)

In the current VVC test model, i.e. VTM-4.0 design, the whole reference block should be with the current coding tree unit (CTU) and does not overlap with the current block. Thus, there is no need to pad the reference or prediction block. The IBC flag is coded as a prediction mode of the current CU. Thus, there are totally three prediction modes, MODE_INTRA, MODE_INTER and MODE_IBC for each CU.

2.3.1.1 IBC Merge Mode

In IBC merge mode, an index pointing to an entry in the IBC merge candidates list is parsed from the bitstream. The construction of the IBC merge list can be summarized according to the following sequence of steps:

Step 1: Derivation of spatial candidates
Step 2: Insertion of HMVP candidates
Step 3: Insertion of pairwise average candidates In the derivation of spatial merge candidates, a maximum of four merge candidates are selected among candidates located in the positions depicted in $A_1$, $B_1$, $B_0$, $A_0$ and $B_2$ as depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is not coded with IBC mode. After candidate at position $A_1$ is added, the insertion of the remaining candidates is subject to a redundancy check which ensures that candidates with same motion information are excluded from the list so that coding efficiency is improved.

After insertion of the spatial candidates, if the IBC merge list size is still smaller than the maximum IBC merge list size, IBC candidates from HMVP table may be inserted. Redundancy check are performed when inserting the HMVP candidates.

Finally, pairwise average candidates are inserted into the IBC merge list.

When a reference block identified by a merge candidate is outside of the picture, or overlaps with the current block, or outside of the reconstructed area, or outside of the valid area restricted by some constrains, the merge candidate is called invalid merge candidate.

It is noted that invalid merge candidates may be inserted into the IBC merge list.

2.3.1.2 IBC AMVP Mode

In IBC AMVP mode, an AMVP index point to an entry in the IBC AMVP list is parsed from the bitstream. The construction of the IBC AMVP list can be summarized according to the following sequence of steps:

Step 1: Derivation of spatial candidates
Check $A_0$, $A_1$ until an available candidate is found.
Check $B_0$, $B_1$, $B_2$ until an available candidate is found.
Step 2: Insertion of HMVP candidates
Step 3: Insertion of zero candidates After insertion of the spatial candidates, if the IBC AMVP list size is still smaller than the maximum IBC AMVP list size, IBC candidates from HMVP table may be inserted.

Finally, zero candidates are inserted into the IBC AMVP list.

2.3.1.3 Chroma IBC Mode

In the current VVC, the motion compensation in the chroma IBC mode is performed at sub block level. The chroma block will be partitioned into several sub blocks. Each sub block determines whether the corresponding luma block has a block vector and the validity if it is present. There is encoder constrain in the current VTM, where the chroma IBC mode will be tested if all sub blocks in the current chroma CU have valid luma block vectors. For example, on a YUV 420 video, the chroma block is N×M and then the collocated luma region is 2N×2M. The sub block size of a chroma block is 2×2. There are several steps to perform the chroma my derivation then the block copy process.

1) The chroma block will be first partitioned into (N>>1) *(M>>1) sub blocks.
2) Each sub block with a top left sample coordinated at (x, y) fetches the corresponding luma block covering the same top-left sample which is coordinated at (2x, 2y).
3) The encoder checks the block vector (bv) of the fetched luma block. If one of the following conditions is satisfied, the by is considered as invalid.
   a. A by of the corresponding luma block is not existing.
   b. The prediction block identified by a by is not reconstructed yet.
   c. The prediction block identified by a by is partially or fully overlapped with the current block.
4) The chroma motion vector of a sub block is set to the motion vector of the corresponding luma sub block.

The IBC mode is allowed at the encoder when all sub blocks find a valid by.

2.3.2 Single BV List for IBC (in VTM5.0)

JVET-N0843 is adopted to the VVC. In the JVET-N0843, the BV predictors for merge mode and AMVP mode in IBC will share a common predictor list, which consist of the following elements:

2 spatial neighboring positions (A1, B1 as in FIG. 2)
5 HMVP entries
Zero vectors by default The number of candidates in the list is controlled by a variable derived from the slice header. For merge mode, up to first 6 entries of this list will be used; for AMVP mode, the first 2 entries of this list will be used. And the list conforms with the shared merge list region requirement (shared the same list within the SMR).

In addition to the above-mentioned BV predictor candidate list, JVET-N0843 also proposed to simplify the pruning operations between HMVP candidates and the existing merge candidates (A1, B1). In the simplification there will be up to 2 pruning operations since it only compares the first HMVP candidate with spatial merge candidate(s).

2.4 Merge Mode Coding in VVC Committee Draft (JVET-O2001-vE)

Figure 33:
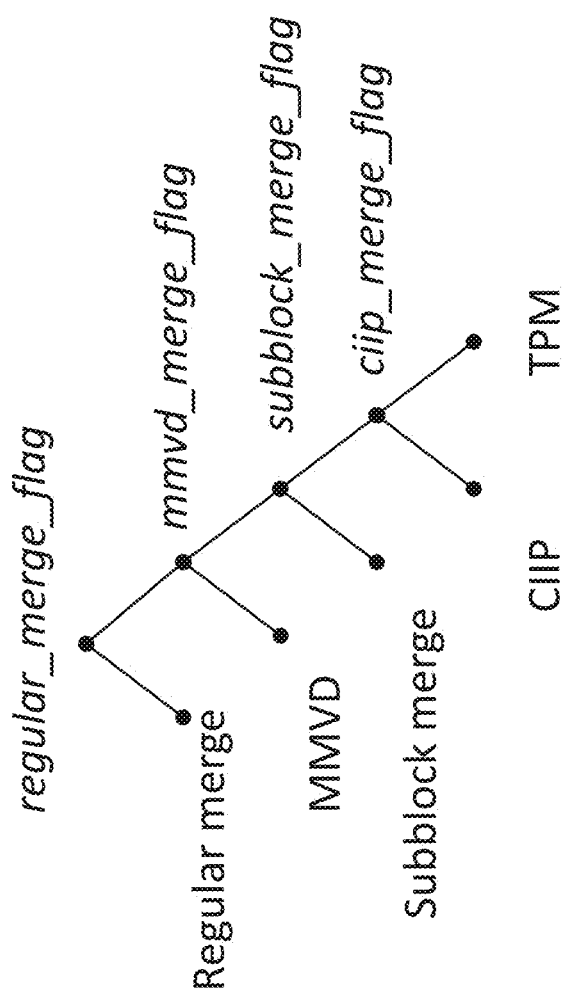
FIG. 33 shows signalling of merge modes in VTM-5.0.

The merge mode coding (including regular merge mode, sub-block merge mode, CIIP (combined intra-inter prediction), TPM, MMVD (merge with motion vector differences)) has been modified from VTM5.0 to VTM6.0. More specifically, in the previous version of VVC, a regular merge mode flag is firstly coded. If not the regular merge mode, followed by the indication of MMVD, Sub-block merge, CIIP and TPM modes, as depicted in FIG. 33.

Figure 34:
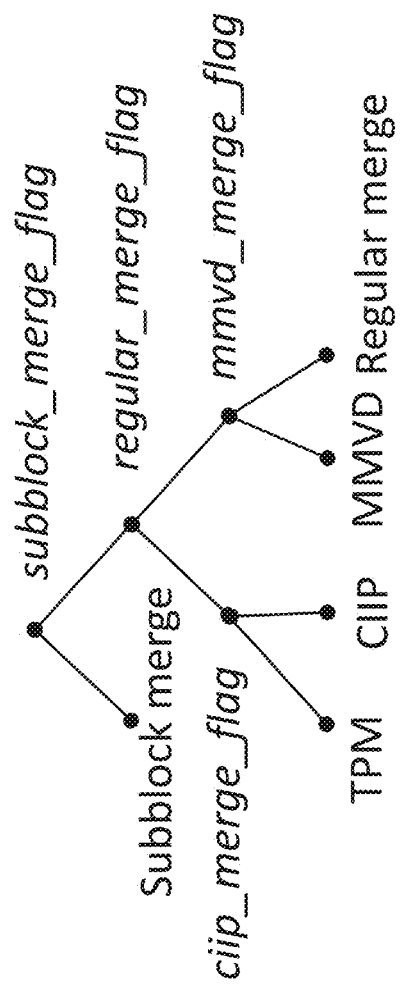
FIG. 34 shows an example of proposed signalling method for merge modes.

In the latest version of VVC, a first flag to indicate whether it is sub-block merge mode may be firstly coded. If not, then a $2^{nd}$ flag to indicate whether it is regular merge mode set (which includes regular merge and MMVD) or non-regular merge mode set (which includes TPM and CIIP). Then a 3rd flag may be further coded to indicate a mode within the mode set. The flow is depicted in FIG. 34.

Merge Data Syntax

|  | Descriptor |
|---|---|
| merge_data( x0, y0, cbWidth, cbHeight, chType ) { |  |
|   if ( CuPredMode[ chType ][ x0 ][ y0 ] == MODE_IBC ) { |  |
|     if( MaxNumIbcMergeCand > 1 ) |  |
|       merge_idx[ x0 ][ y0 ] | ae(v) |
|   } else { |  |
|     if( MaxNumSubblockMergeCand > 0 && cbWidth >= 8 && cbHeight >= 8 ) |  |
|       MERGE_SUBBLOCK_FLAG[ X0 ][ Y0 ] | AE(V) |
|     if( merge subblock flag[ x0 ][ y0 ] == 1 ) { |  |
|       if( MaxNumSubblockMergeCand > 1 ) |  |
|         merge_subblock_idx[ x0 ][ y0] | ae(v) |
|     } else { |  |
|       if( ( cbWidth * cbHeight) >= 64 && ( (sps_ciip_enabled_flag && cu_skip_flag[ x0 ][ y0 ] == 0 && cbWidth < 128 && cbHeight < 128) \|\| |  |
|       ( sps_triangle_enabled_flag && MaxNumTriangleMergeCand > 1 && slice_type == B ) ) ) |  |
|         REGULAR_MERGE_FLAG[ X0 ][ Y0 ] | AE(V) |
|     if ( regular_merge_flag[ x0 ][ y0 ] == 1 ){ |  |
|       if( sps_mmvd_enabled_flag ) |  |
|         mmvd_merge_flag[ x0 ][ y0 ] | ae(v) |
|       if( mmvd_merge_flag[ x0 ][ y0 ] == 1 ) { |  |
|       if( MaxNumMergeCand > 1 ) |  |
|         mmvd_cand_flag[ x0 ][ y0 ] | ae(v) |
|         mmvd_distance_idx[ x0 ][ y0 ] | ae(v) |
|         mmvd_direction_idx[ x0 ][ y0 ] | ae(v) |
|       } else { |  |
|       if( MaxNumMergeCand > 1 ) |  |
|         merge_idx[ x0 ][ y0 ] | ae(v) |
|       } |  |
|     } else { |  |
|       IF( SPS_CIIP_ ENABLED_FLAG && SPS_TRIANGLE_ENABLED_FLAG && MAXNUMTRIANGLEMERGECAND > 1 && SLICE_TYPE == B && CU_SKIP_FLAG[ X0 ][ Y ] == 0 && ( CBWIDTH * CBHEIGHT ) >= 64 && CBWIDTH < 128 && CBHEIGHT < 128 ) { |  |
|         CIIP_FLAG[ X0 ][ Y0 ] | AE(V) |
|     if( ciip_flag[ x0 ][ y0 ] && MaxNumMergeCand > 1 ) |  |
|       merge_idx[ x0 ][ y0 ] | ae(v) |
|     if( !ciip_flag[ x0 ][ y0 ] && MaxNumTriangleMergeCand > 1 ) { |  |
|       merge_triangle_split_dir[ x0 ][ y0 ] | ae(v) |
|       merge_triangle_idx0[ x0 ][ y0 ] | ae(v) |
|       merge_triangle_idx1[ x0 ][ y0 ] | ae(v) |
|     } |  |
|     } |  |
|   } |  |
| } |  |
| } |  |

3. PROBLEMS

The current design of merge modes may have the following problems:

1. The regular merge list construction process depends on the usage of TPM for the current block.
    a. For TPM-coded blocks, full pruning is applied among spatial merge candidates.
    b. For non-TPM-coded blocks, partial pruning is applied among spatial merge candidates.

2. According to current design, all merge related tools (including IBC merge, regular merge, MMVD, sub-block merge, CIIP, TPM) are signalled by one flag, named general_merge_flag. However, it is possible that when this flag is true, all merge related tools are signaled or to be derived to be disabled. How to handle this case is unknown. In addition, it is disallowed to turn off the merge mode, that is the maximum number of merge candidate shall be unequal to 0. However, for high throughput encoder/decoder, it may need to force disabling the merge mode.
3. The decision of initialized MV for ATMVP process is dependent on slice type, all reference pictures' POC values, collocated_from_l0_flag, etc. al, which delays the throughput of MVs.
4. Derivation process of collocated MVs is dependent on the usage of sub-block technology, such as the conventional TMVP process or ATMVP process which requires additional logic.
5. For a sub-CU in ATMVP coded block, even its corresponding collocated block is inter coded, it is possible the sub-CU's motion information couldn't be derived from the corresponding collocated block, but filled with other motion information. Such design is sub-optimal for both coding efficiency and throughput.
6. The HEVC specification defines the availability of one neighbouring block in current or reference picture based on whether the block is constructed or in a different CTU row/slice etc. al. However, in VVC, multiple coding methods have been introduced. Different definitions of a block's availability may need to be defined.
7. JVET-O0545 proposes to signal the indication of maximum transform block size by sending sps_sbt_max_size_64_flag.
   sps_sbt_max_size_64_flag equal to 0 specifies that the maximum CU width and height for allowing sub-block transform is 32 luma samples.
   sps_sbt_max_size_64_flag equal to 1 specifies that the maximum CU width and height for allowing sub-block transform is 64 luma samples.

$$\text{MaxSbtSize} = \text{sps\_sbt\_max\_size\_64\_flag} ? 64 : 32 \qquad (7\ 31)$$

To support maximum transform size (indicated by MaxTransformSize) smaller than 64, the derivation of MaxSbtSize is modified as below, $$\text{MaxSbtSize} = \min(\text{MaxTransformSize}, \text{sps\_sbt\_max\_size\_64\_flag} ? 64 : 32)$$

8. Adaptive Loop Filter (ALF) coefficients are restricted to be within a fixed range. For example: chroma ALF filter coefficients, denoted by $\text{AlfCoeff}_C$, and luma ALF filter coefficients, denoted by $\text{AlfCoeff}_L$, shall be in the range of $-2^7$ to $2^7-1$, inclusive. Such restriction is based on the assumption of 8-bit depth.
9. Indication of predictors of ALF filters is signalled as follows:

```
if( slice_alf_enabled_flag ){
    alf_ctb_flag[ 0 ][xCtb >> Log2Ctb Size ][ yCtb >> Log2CtbSize ]                    ae(v)
    if( alf_ctb_flag[ 0 ][ xCtb >> Log2CtbSize ][ yCtb >> Log2Ctb Size ] ) {
        if( slice_num_alf_aps_ids_luma > 0 )
            alf_ctb_use_first_aps_flag                                                  ae(v)
        if( !alf_ctb_use_first_aps_flag ) {
            if( slice_num_alf_aps_ids_luma > 1 )
                alf_use_aps_flag                                                        ae(v)
            if( alf_use_aps_flag )
                if( slice_num_alf_aps_ids_luma > 2 )
                    alf_luma_prev_filter_idx_minus1                                     ae(v)
            else
                alf_luma_fixed_filter_idx                                               ae(v)
        }
    }
```

It can be seen that such a method needs to parse multiple syntax elements to determine to use filters from which APS sets or from fixed filters.

10. Merge related coding tools are as follows:

|  | Descriptor |
|---|---|
| merge_data( x0, y0, cbWidth, cbHeight ) { | |
|    if ( CuPredMode[ x0 ][ y0 ] == MODE_IBC ) { | |
|       if( MaxNumMergeCand > 1 ) | |
|          merge_idx[ x0 ][ y0 ] | ae(v) |
|    } else { | |
|       if( MaxNumSubblockMergeCand > 0 && cbWidth >= 8 && cbHeight >= 8 ) | |
|          merge_subblock_flag[ x0 ][ y0 ] | ae(v) |
|       if( merge_subblock_flag[ x0 ][ y0 ] == 1 ) { | |
|          if( MaxNumSubblockMergeCand > 1 ) | |
|             merge_subblock_idx[ x0 ][ y0 ] | ae(v) |
|       } else { | |
|          if( ( cbWidth * cbHeight ) >= 64 && ((sps_ciip_enabled_flag && cu_skip_flag[ x0 ][ y0 ] == 0 && cbWidth < 128 && cbHeight < 128) \|\| (sps_triangle_enabled_flag && slice_type == B) ) { | |
|             regular_merge_flag[ x0 ][ y0 ] | ae(v) |
|       } | |
|       if( regular_merge_flag[ x0 ][ y0 ] ) { | |

|  | Descriptor |
|---|---|
| ```
if( sps_mmvd_enabled_flag )
 {
  mmvd_merge_flag[ x0 ][ y0 ]
   if( mmvd_merge_flag[ x0 ][ y0 ] == 1 ) {
    if( MaxNumMergeCand > 1 )
     mmvd_cand_flag[ x0 ][ y0 ]
    mmvd_distance_idx[ x0 ][ y0 ]
    mmvd_direction_idx[ x0 ][ y0 ]
   } else {
    if( MaxNumMergeCand > 1 )
     merge_idx[ x0 ][ y0 ]
   }
  }
 } else {
  if(sps_ciip_enabled_flag && cu_skip_flag[ x0 ][ y0 ] == 0 && cbWidth <
128 && cbHeight < 128 && sps_triangle_enabled_flag && slice_type ==
B) {
   ciip_flag[ x0 ][ y0 ]
   if( ciip_flag[ x0 ][ y0 ] && MaxNumMergeCand > 1 )
    merge_idx[ x0 ][ y0 ]
   }
   if( ! ciip_flag[ x0 ][ y0 ] ) {
    merge_triangle_split_dir[ x0 ][ y0 ]
    merge_triangle_idx0[ x0 ][ y0 ]
    merge_triangle_idx1[ x0 ][] y0 ]
   }
  }
 }
}
}
``` | ae(v)<br><br>ae(v)<br>ae(v)<br>ae(v)<br><br><br>ae(v)<br><br><br><br><br>ae(v)<br><br>ae(v)<br><br>ae(v)<br>ae(v)<br>ae(v) |

It is noted that the sub-block merge related syntax elements are firstly signalled; followed by the indication of regular merge mode (which controls both MMVP and conventional merge like in HEVC). When such indication is false, additional bits may be further signalled to indicate whether it is CIIP or TPM mode.

However, such information doesn't take into consideration of the case that number of allowed TPM candidates is less than 2.

Figure 24:
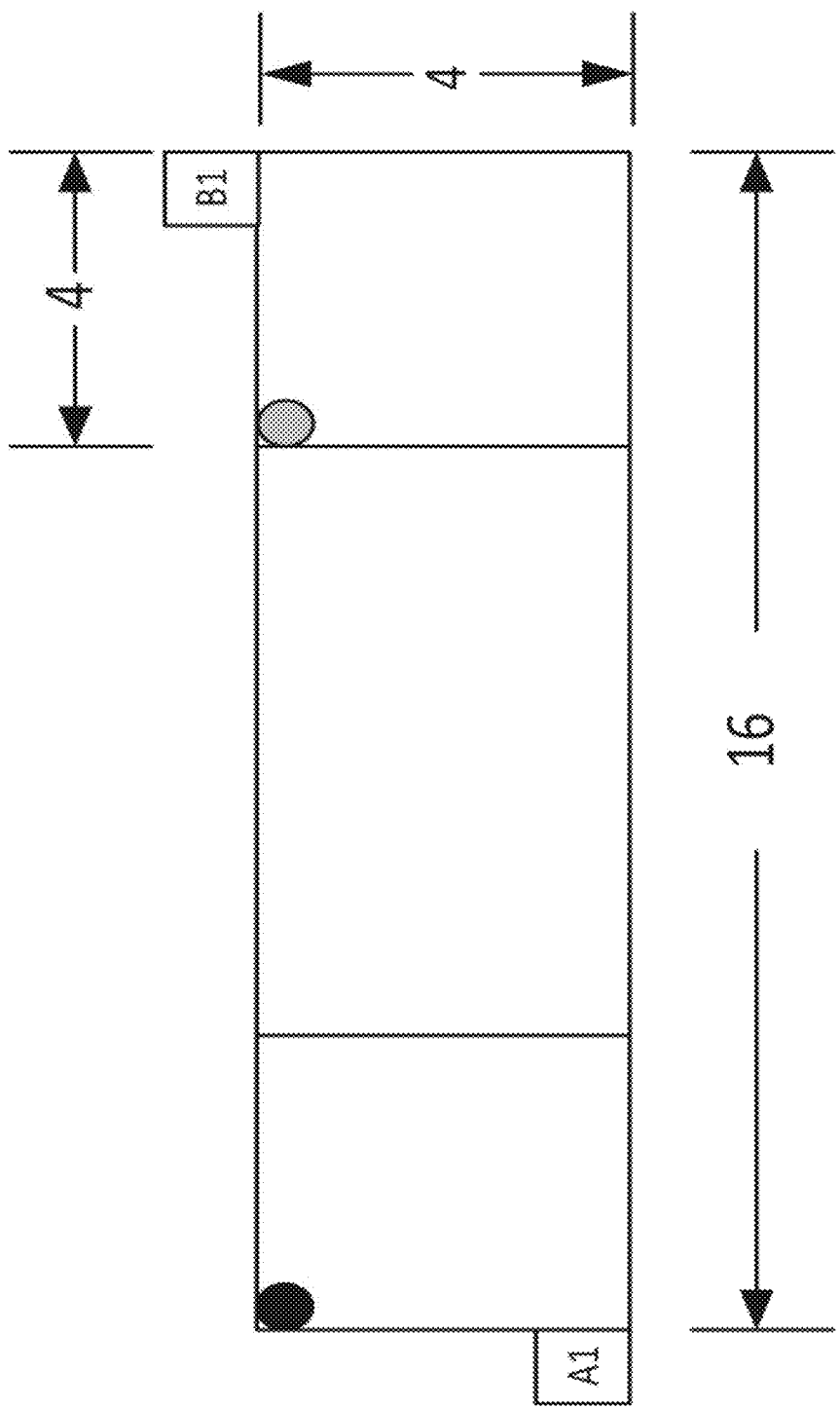
FIG. 24 shows an example of a share merge region (SMR) with 16×4 size and 3 CUs under the SMR.
Figure 25:
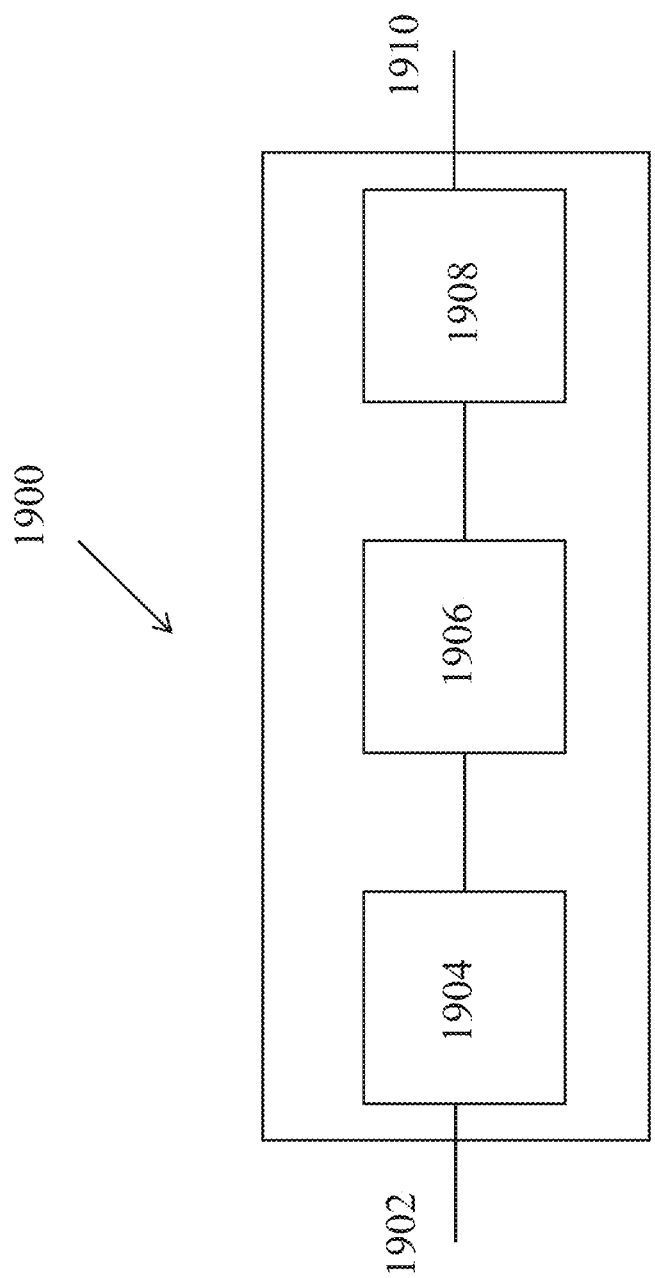
FIG. 25 is a block diagram of an example video processing system in which disclosed techniques may be implemented.

11. In the latest VVC specification, the availability check of a 2nd block relative to a first block is further dependent on the block coded mode in addition to other conditions, such as in same slice. However, it may result in issues when handling shared merge list. Taking 16×4 block as an example, when it is further split using vertical TT, three CUs will be generated as 4×4, 8×4 and 4×4. When deriving the spatial merge candidate for the last 4×4, the two spatial candidates are derived from the A1 and B1 of the shared merge region (SMR) as shown in FIG. 24. Therefore, for IBC coded blocks, whether A1/B1 (neighboring to the shared 16×4 region) are coded with IBC mode shall be checked. That's the intention of share merge list.

However, when sub-clause 8.6.2.2 invokes the process of derivation of spatial merge candidate, the top-left sample's coordinate has been changed from the current one (covering the green circle) to the one covering the black circle (i.e., top-left position of the shared merge region), and block width/height are also modified to be that for the shared merge region.

Then, in sub-clause 8.6.2.3 on Derivation process for IBC spatial block vector candidates, it has to check whether A1/B1 is available by invoking 6.4.4 with checkPredModeY set equal to TRUE. Here, it may cause problem since it needs to check whether the prediction mode of the CU covering the top-left sample of the shared region (i.e., the left 4×4 CU instead of current 4×4 CU) is equal to that of A1/B1.

For example:
if the left 4×4 CU is not IBC, and A1/B1 are IBC, then A1/B1 is marked as unavailable which seems to be not the intention.

If the left 4×4 CU is not IBC, and A1/B1 are not IBC either, then A1/B1 is marked as available. In this case, wrong motion will be used as BV candidate.

Therefore, it will be problematic if purely adding mode checking to the availability check process.

12. In weight derivation process of CIIP, if a neighbouring block's prediction mode is IBC/Intra/Palette, they are always treated as unavailable, and the weight of the inter/intra prediction signal is assigned with the same value for all three cases.

13. PROF and BDOF could share the Optical Flow (OF) operations. Therefore, when BDOF is disabled in a slice, it is better to disable PROF as well to save hardware power consumption. However, there is a problem if just disabling PROF when BDOF is disabled, since BDOF could only be applied to B slices, but PROF could be applied to P and B slices.

14. Both of TPM and GEO split one block to two partitions, and each of them with uni-prediction except the blending area. However, the enabling/disabling conditions (such as block dimension) are not aligned. In addition, applying them to large blocks may cause too much computation complexity due to blending.

4. EXAMPLES OF TECHNIQUES AND EMBODIMENTS

The detailed listing below should be considered as examples to explain general concepts. These embodiments should not be interpreted in a narrow way. Furthermore, these techniques can be combined in any manner.

The neighbouring blocks denoted as A0, A1, B0, $B_1$, $B_2$ etc. are shown in FIG. 2.

1. The regular merge list construction process for conventional merge and TPM coded blocks is decoupled from the coding method of the current block.
   a. In one example, partial pruning is applied to spatial merge candidates when TPM is applied to one block.
      i. In one example, whether two candidates are compared with each other are determined in the same way as that used for a non-TPM merge coded blocks.
      ii. In one example, B1 is compared to A1, B0 is compared to B1, A0 is compared to A1, B2 is compared to B1 and A1.
      iii. Alternatively, full pruning is applied to spatial merge candidates even TPM is not used for one block.
      iv. Alternatively, furthermore, full pruning may be applied to some specific block dimensions.
         1. For example, full pruning may be applied to block dimensions wherein TPM is allowed.
         2. For example, when a block size contains less than M*H samples, e.g., 16 or 32 or 64 luma samples, full pruning is not allowed.
         3. For example, when a block's width>th1 or >=th1 and/or a block's height>th2 or >=th2, full pruning is not allowed.
   b. In one example, whether to check B2 is based on the number of available merge candidates before checking B2 when TPM is applied to one block.
      i. Alternatively, B2 is always checked regardless the number of available merge candidates for non-TPM merge coded blocks.
2. The initialized MV used for identifying a block to determine whether ATMVP is available or not may just rely on the list X information of a spatial neighbouring block (e.g., A1), and X is set to where the collocated picture used for temporal motion vector prediction is derived from (e.g., collocated_from_l0_flag).
   a. Alternatively, X is decided according to whether all reference pictures in all reference lists are with smaller POC values or no greater POC values compared to the current picture.
      i. In on example, if it is true, X is set to 1. Otherwise, X is set to 0.
   b. Alternatively, if the reference picture associated with list X of a spatial neighbouring block (e.g., A1) is available and has the same POC value as the collocated picture, the initialized MV is set to the MV associated with list X of the spatial neighbouring block. Otherwise, a default MV (e.g., (0, 0)) is utilized.
   c. Alternatively, motion information stored in HMVP table may be used as the initialized MV in ATMVP.
      i. For example, the first available motion information stored in HMVP table may be used.
      ii. For example, the first available motion information stored in HMVP table that is associated with certain reference picture (e.g., collocated picture) may be used.
   d. Alternatively, X is a fixed number, such as 0 or 1.
3. The derivation process of collocated MVs used for sub-block based coding tools and non-sub-block based coding tools may be aligned, i.e., the process is independent from the usage of a certain coding tool.
   a. In one example, the whole or partial of the derivation process of collocated MVs for sub-block based coding tools is aligned to that used for TMVP.
      i. In one example, if it is uni-prediction from list Y, the motion vector of list Y is scaled to a target reference picture list X;
      ii. In one example, if it is bi-prediction and the target reference picture list is X, the motion vector of list Y is scaled to the target reference picture list X, and Y may be determined according to the following rules:
         If none of reference pictures has a greater POC values or all reference pictures have smaller POC values compared to current picture, Y is set equal to X.
         Otherwise, Y is set equal to collocated_from_l0_flag.
   b. In one example, the whole or partial of the derivation process of collocated MVs for TMVP is aligned to that used for sub-block-based coding tools.
4. The motion candidate list construction process (e.g., regular merge list, IBC merge/AMVP list) may depend on the block dimensions and/or merge sharing conditions. Denote a block's width and height as W and H, respectively. Condition C may depend on W and H and/or merge sharing conditions.
   a. In one example, derivation of spatial merge candidates is skipped if condition C is satisfied.
   b. In one example, derivation of HMVP candidates is skipped if condition C is satisfied.
   c. In one example, derivation of pairwise merge candidates is skipped if condition C is satisfied.
   d. In one example, number of maximum pruning operations is reduced or set to 0 if condition C is satisfied.
   e. In one example, condition C is satisfied when W*H is smaller or no larger than a threshold (e.g., 64 or 32).
   f In one example, condition C is satisfied when W and/or H is smaller or no larger than a threshold (e.g., 4 or 8).
   g. In one example, condition C is satisfied when the current block is under a shared node.
5. The maximum number of allowed regular merge candidates/maximum number of allowed IBC candidates/maximum number of allowed sub-block merge candidates may be set to 0. Therefore, certain tools may be disabled, and related syntax elements are not needed to be signalled.
   a. In one example, when the maximum number of allowed regular merge candidates is equal to 0, a coding tool which relies on regular merge list may be disabled. The coding tool may be regular merge, MMVD, CIIP, TPM, DMVR etc. al.
   b. In one example, when the maximum number of allowed IBC candidates is equal to 0, IBC AMVP and/or IBC merge may be disabled.
   c. In one example, when the maximum number of allowed sub-block based merge candidates is equal to 0, sub-block based technologies, e.g., ATMVP, affine merge mode may be disabled.
   d. When a tool is disabled according to the maximum number of allowed candidates, signaling of related syntax elements is skipped.
      i. Alternatively, furthermore, the signalling of merge related tools may need to check whether the maximum number of allowed candidates is unequal to 0.

ii. Alternatively, furthermore, invoking of a process for the merge related tools may need to check whether the maximum number of allowed candidates is unequal to 0.
6. The signalling of general_merge_flag and/or cu_skip_flag may depend on the maximum number of allowed regular merge candidates/maximum number of allowed IBC candidates/maximum number of allowed sub-block merge candidates/usage of merge related coding tools.
   a. In one example, merge related coding tools may include IBC merge, regular merge, MMVD, sub-block merge, CIIP, TPM, DMVR and etc.
   b. In one example, when the maximum number of allowed regular merge candidates, the maximum number of allowed IBC merge/AMVP candidates, the maximum number of allowed sub-block merge candidate are equal to 0, the general_merge_flag and/or cu_skip_flag is not signaled.
      i. Alternatively, furthermore, general_merge_flag and/or cu_skip_flag is inferred to be 0.
7. A conformance bitstream shall satisfy that at least one of the merge related tools including IBC merge, regular merge, MMVD, sub-block merge, CIIP, TPM, DMVR and etc. is enabled when the general_merge_flag or cu_skip_flag of the current block is true.
8. A conformance bitstream shall satisfy that at least one of the merge related tools including regular merge, MMVD, sub-block merge, CIIP, TPM, DMVR and etc. is enabled when the (general_merge_flag or cu_skip_flag) of the current block is true and IBC is disabled for one slice/tile/brick/picture/current block.
9. A conformance bitstream shall satisfy that at least one of the merge related tools including IBC merge, regular merge, sub-block merge, CIIP, TPM is enabled when the (general_merge_flag or cu_skip_flag) of the current block is true and MMVD is disabled for one slice/tile/brick/picture/current block.
10. A conformance bitstream shall satisfy that at least one of the merge related tools including IBC merge, regular merge, MMVD, sub-block merge, TPM is enabled when the (general_merge_flag or cu_skip_flag) of the current block is true and CIIP is disabled for one slice/tile/brick/picture/current block.
11. A conformance bitstream shall satisfy that at least one of the merge related tools including IBC merge, regular merge, MMVD, sub-block merge, CIIP is enabled when the (general_merge_flag or cu_skip_flag) of the current block is true and TPM is disabled for one slice/tile/brick/picture/current block.
12. A conformance bitstream shall satisfy that at least one of the enabled merge related tools including IBC merge, regular merge, MMVD, sub-block merge, CIIP, TPM is applied when the general_merge_flag or cu_skip_flag of the current block is true.

Regarding Availability Check
13. When coding a first block, the check of availability of a 2nd block may depend on the coded mode information of the first block, for example, if different modes are used in the $1^{st}$ and $2^{nd}$ block, the 2nd block may be treated as unavailable even regardless of other condition checking results (e.g., has been constructed).
   a. In one example, when $1^{st}$ block is inter coded and 2nd block is IBC code, 2nd block is marked as unavailable.
   b. In one example, when $1^{st}$ block is IBC coded and $2^{nd}$ block is inter code, $2^{nd}$ block is marked as unavailable.
   c. When the 2nd is marked as unavailable, the related coded information (e.g., motion information) is disallowed to be utilized for coding the 1st block.
   d. In one example, the mode information of current block may be added as an input parameter to the availability check process.
14. It is proposed to introduce two positions (e.g., coordinates) in the availability check process of a $2^{nd}$ block regarding the current $1^{st}$ block.
   a. In one example, a first position is corresponding to the top-left position relative to the current coding block (e.g., CU).
      i. In one example, the first position is utilized to identify a coding block and the coding block's prediction mode is compared to that associated with a 2nd block.
   b. In one example, a second position is corresponding to the top-left position relative to the shared merge region.
      i. In one example, the second position is utilized to identify a coding block and the coding block's prediction mode is NOT compared to that associated with a $2^{nd}$ block.
      ii. In one example, the second position may be used to check whether the coding block covering the second position is in the same video unit as the first block (e.g., slice/tile/brick/subpicture).
15. It is proposed to introduce two positions (e.g., coordinates) in the IBC motion list construction process regarding the current $1^{st}$ block.
   a. In one example, a first position is corresponding to the top-left position relative to the shared merge region.
      i. In one example, the first position may be used to derive a $2^{nd}$ block (e.g., spatial neighboring blocks).
   b. In one example, a second position is corresponding to the top-left position relative to the current coding block (e.g., CU).
      i. In one example, the second position is utilized to identify a coding block and the coding block's prediction mode is compared to that associated with the $2^{nd}$ block during the availability check process.
16. The availability check of neighbouring blocks in the weight derivation of CIIP (combined intra-inter prediction) process may be decoupled from the checking of current block's mode being identical to a neighbouring block's mode.
   a. In one example, even a neighbouring block is coded as Intra Mode, or IBC mode or Palette Mode, it may still be marked as available.
   b. Alternatively, furthermore, the weights of the inter/intra prediction signal may be assigned differently when the neighbouring block is available and coded with different modes.
17. The signalling of syntax elements unrelated to TPM side information may be also under the condition check of number of allowed TPM candidates.
   a. In one example, the signalling of CIIP related syntax elements (e.g., ciip_flag) may dependent on number of allowed TPM candidate is greater than a threshold K.

b. In one example, the signalling of regular merge mode flag (e.g., regular_merge_flag) may dependent on number of allowed TPM candidate is greater than a threshold K.
c. In one example, K is set to 1.
d. Alternatively, furthermore, certain syntax elements may be not signalled when the number of allowed TPM candidate is no greater than a threshold K.

18. A conformance bitstream shall satisfy that the maximum transform block sizes shall not exceed the maximum CTU sizes.
    a. Alternatively, when the indication of maximum transform block size may be conditionally signalled under the maximum CTU sizes or vice versa.
       i. In one example, if the maximum CTU size is no greater than or equal to M×N (e.g., M=N=32), there is no need to signal the indication of maximum transform block size.

19. The ALF filter coefficients range may be dependent on the sample depth (e.g., internal bit-depth or input bit-depth) instead of being in a fixed range.

20. One flag may be directly signalled to indicate whether to use ALF filters in ALF adaptation parameter set (APS) to fixed filters.
    a. In addition, such a flag may be signalled under the condition that number of available ALF APS is greater than 0.
    b. Alternatively, furthermore, when ALF filters from APS is signalled, one additional syntax may be further signalled to indicate the index of ALF APS. Such an index may be coded with Fixed-length coding, unary coding, truncated unary coding, truncated binary coding, exp-golomb coding.

21. Enabling/disabling PROF in a B slice may be aligned with that for the DMVR and BDOF tools, but not for P slices.
    a. In one example, when both DMVR and BDOF are disabled, PROF are disabled as well.
    b. In one example, a single syntax element (such as a flag named slice_disable_bdof_dmvr_prof_flag) may be signaled at slice or picture level (such as in the slice header) to control the usage of BDOF.
       i. In one example, the flag is signaled depending on the slice type.
          1. The flag is signalled when the slice is a P-slice or a B-slice.
          2. The flag is signalled when the slice is not a I-slice.
       ii. Alternatively, such a flag may be conditionally signaled. For example, it may be signaled under the condition that current slice is a B slice.
       iii. Alternatively, furthermore, enabling/disabling PROF for a P slice may be independent from the syntax element.
          1. In one example, whether to enable/disable PROF for a P slice may be the same as the enabling/disabling flag of PROF (e.g., sps_affine_prof_enabled_flag) derived at sequence/picture level, e.g., SPS.
          2. In one example, whether to enable/disable PROF for a P slice may be signaled in slice header/picture header/picture parameter set.
             a. Alternatively, furthermore, it may be signalled under certain conditions, such as when PROF is enabled for a sequence.

22. TPM/GEO may be always disabled for certain block dimensions.
    a. In one example, TPM/GEO may be disabled automatically when block width is greater than K0 and/or block height is greater than K1 (e.g., K0=32=K1)
    b. In one example, TPM/GEO may be disabled automatically when block width is no smaller than K0 and/or block height is no smaller than K1 (e.g., K0=32=K1)
    c. In one example, TPM/GEO may be disabled automatically when block width is smaller than K0 and/or block height is greater than K1 (e.g., K0=8=K1)
    d. In one example, TPM/GEO may be disabled automatically when block width is no greater than K0 and/or block height is no smaller than K1 (e.g., K0=8=K1)
    e. In one example, TPM/GEO may be disabled automatically when block width times block height is no smaller or greater than K1 (e.g., K1=1024)
    f. In one example, TPM/GEO may be disabled automatically when block width times block height is no greater (or smaller) than K1 (e.g., K1=1024)
    g. In one example, TPM/GEO may be disabled automatically when block width is equal to K0 and/or block height is equal to K1 (e.g., K0=8, K1=32)
    h. In one example, the signalling of indications of usage of TPM/GEO may be skipped when TPM/GEO are disabled (e.g., based on above bullets).
    i. In one example, the signalling of indications of usage of CIIP may be skipped when the conditions are satisfied (e.g., TPM/GEO may be disabled automatically).
       i. In one example, if block width is greater than K0 or block height is greater than K1, CIIP flag may not be signalled.
       ii. Alternatively, furthermore, CIIP mode may be inferred to be enabled for a block when the conditions are true.
    j. In one example, the signalling of indications of usage of regular merge mode set (e.g., regular_merge_flag) may depend on the conditions that TPM/GEO may be disabled automatically.
       i. In one example, if block width is no greater than K0 and/or block height is no greater than K1, regular_merge_flag may be signaled.
       ii. In one example, if block width is greater than K0 and/or block height is greater than K1, regular_merge_flag may NOT be signaled.

23. It is proposed to signal the indications of usage of TPM/GEO mode before that of usage of CIIP mode.
    a. Alternatively, which one to be signalled firstly may be adaptively changed, from one video unit to another one.
       i. In one example, the video unit is a slice/picture/tile/brick.
       ii. In one example, the video unit is a block/CU.
    b. Alternatively, which one to be signalled firstly may depend on slice/picture types.
    c. Alternatively, which one to be signalled firstly may depend on code information of current block/neighbouring block.

24. TPM and GEO may be selectively enabled, such as according to the block dimension/block shape/coded information of current and/or neighbouring blocks.
    a. In one example, TPM may be applied to larger blocks and GEO may be applied to smaller blocks.
    b. Alternatively, furthermore, one syntax may be utilized to tell whether either TPM or GEO is used.

25. The above bullets may be applicable when replacing TPM with GEO or replacing TPM with other coding methods that may split one block into two or more sub-partitions.

5. EMBODIMENT

The suggested changes on top of the latest VVC working draft (NET-N1001 v7) are given as follows. The newly added parts are highlighted in bolded, capitalized font.

5.1 Embodiment #1

This embodiment is to align the pruning process for non-TPM coded block to that for TPM coded blocks i.e., full pruning operations for non-TPM coded blocks.

8.5.2.3 Derivation Process for Spatial Merging Candidates
Inputs to this process are:
- a luma location (xCb, yCb) of the top-left sample of the current luma coding block relative to the top-left luma sample of the current picture,
- a variable cbWidth specifying the width of the current coding block in luma samples,
- a variable cbHeight specifying the height of the current coding block in luma samples.

Outputs of this process are as follows, with X being 0 or 1:
- the availability flags availableFlag$A_0$, availableFlag$A_1$, availableFlag$B_0$, availableFlag$B_1$ and availableFlag$B_2$ of the neighbouring coding units,
- the reference indices refIdxLX$A_0$, refIdxLX$A_1$, refIdxLX$B_0$, refIdxLX$B_1$ and refIdxLX$B_2$ of the neighbouring coding units,
- the prediction list utilization flags predFlagLX$A_0$, predFlagLX$A_1$, predFlagLX$B_0$, predFlagLX$B_1$ and predFlagLX$B_2$ of the neighbouring coding units,
- the motion vectors in 1/16 fractional-sample accuracy mvLX$A_0$, mvLX$A_1$, mvLX$B_0$, mvLX$B_1$ and mvLX$B_2$ of the neighbouring coding units,
- the bi-prediction weight indices gbiIdx$A_0$, gbiIdx$A_1$, gbiIdx$B_0$, gbiIdx$B_1$, and gbiIdx$B_2$.

For the derivation of availableFlag$A_1$, refIdxLX$A_1$, predFlagLX$A_1$ and mvLX$A_1$ the following applies:
  The luma location (xNb$A_1$, yNb$A_1$) inside the neighbouring luma coding block is set equal to (xCb−1, yCb+cbHeight−1).
  The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location (xNb$A_1$, yNb$A_1$) as inputs, and the output is assigned to the block availability flag
  The variables availableFlag$A_1$, refIdxLX$A_1$, predFlagLX$A_1$ and mvLX$A_1$ are derived as follows:
    If availableA$_1$ is equal to FALSE, availableFlag$A_1$ is set equal to 0, both components of mvLX$A_1$ are set equal to 0, refIdxLX$A_1$ is set equal to −1 and predFlagLX$A_1$ is set equal to 0, with X being 0 or 1, and gbiIdx$A_1$ is set equal to 0.
    Otherwise, availableFlag$A_1$ is set equal to 1 and the following assignments are made:

$$\text{mvLX}A_1 = \text{MvLX}[\text{xNb}A_1][\text{yNb}A_1] \quad (8\text{-}294)$$

$$\text{refIdxLX}A_1 = \text{RefIdxLX}[\text{xNb}A_1][\text{yNb}A_1] \quad (8\text{-}295)$$

$$\text{predFlagLX}A_1 = \text{PredFlagLX}[\text{xNb}A_1][\text{yNb}A_1] \quad (8\text{-}296)$$

$$\text{gbiIdx}A_1 = \text{GbiIdx}[\text{xNb}A_1][\text{yNb}A_1] \quad (8\text{-}297)$$

For the derivation of availableFlag$B_1$, refIdxLX$B_1$, predFlagLX$B_1$ and mvLX$B_1$ the following applies:
  The luma location (xNb$B_1$, yNb$B_1$) inside the neighbouring luma coding block is set equal to (xCb+cbWidth−1, yCb−1).
  The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location (xNb$B_1$, yNb$B_1$) as inputs, and the output is assigned to the block availability flag availableB$_1$.
  The variables availableFlag$B_1$, refIdxLX$B_1$, predFlagLX$B_1$ and mvLX$B_1$ are derived as follows:
    If one or more of the following conditions are true, availableFlag$B_1$ is set equal to 0, both components of mvLX$B_1$ are set equal to 0, refIdxLX$B_1$ is set equal to −1 and predFlagLX$B_1$ is set equal to 0, with X being 0 or 1, and gbiIdx$B_1$ is set equal to 0:
      availableB$_1$ is equal to FALSE.
      availableA$_1$ is equal to TRUE and the luma locations (xNb$A_1$, yNb$A_1$) and (xNb$B_1$, yNb$B_1$) have the same motion vectors and the same reference indices.
    Otherwise, availableFlag$B_1$ is set equal to 1 and the following assignments are made:

$$\text{mvLX}B_1 = \text{MvLX}[\text{xNb}B_1][\text{yNb}B_1] \quad (8\text{-}298)$$

$$\text{refIdxLX}B_1 = \text{RefIdxLX}[\text{xNb}B_1][\text{yNb}B_1] \quad (8\text{-}299)$$

$$\text{predFlagLX}B_1 = \text{PredFlagLX}[\text{xNb}B_1][\text{yNb}B_1] \quad (8\text{-}300)$$

$$\text{gbiIdx}B_1 = \text{GbiIdx}[\text{xNb}B_1][\text{yNbB}] \quad (8\text{-}301)$$

For the derivation of availableFlag$B_0$, refIdxLX$B_0$, predFlagLX$B_0$ and mvLX$B_0$ the following applies:
  The luma location (xNb$B_0$, yNb$B_0$) inside the neighbouring luma coding block is set equal to (xCb+cbWidth, yCb−1).
  The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location (xNb$B_0$, yNb$B_0$) as inputs, and the output is assigned to the block availability flag availableB$_0$.
  The variables availableFlag$B_0$, refIdxLX$B_0$, predFlagLX$B_0$ and mvLX$B_0$ are derived as follows:
    If one or more of the following conditions are true, availableFlag$B_0$ is set equal to 0, both components of mvLX$B_0$ are set equal to 0, refIdxLX$B_0$ is set equal to −1 and predFlagLX$B_0$ is set equal to 0, with X being 0 or 1, and gbiIdx$B_0$ is set equal to 0:
      availableB$_0$ is equal to FALSE.
      availableB$_1$ is equal to TRUE and the luma locations (xNb$B_1$, yNb$B_1$) and (xNb$B_0$, yNb$B_0$) have the same motion vectors and the same reference indices.
      availableA$_1$ is equal to TRUE, the luma locations (xNb$A_1$, yNb$A_1$) and (xNb$B_0$, yNb$B_0$) have the same motion vectors and the same reference indices.
    Otherwise, availableFlag$B_0$ is set equal to 1 and the following assignments are made:

$$mvLXB_0 = MvLX[xNbB_0][yNbB_0] \quad (8\text{-}302)$$

$$refIdxLXB_0 = RefIdxLX[xNbB_0][yNbB_0] \quad (8\text{-}303)$$

$$predFlagLXB_0 = PredFlagLX[xNbB_0][yNbB_0] \quad (8\text{-}304)$$

$$gbiIdxB_0 = GbiIdx[xNbB_0][yNbB_0] \quad (8\text{-}305)$$

For the derivation of availableFlag$A_0$, refIdxLX$A_0$, predFlagLX$A_0$ and mvLX$A_0$ the following applies:

The luma location (xNb$A_0$, yNb$A_0$) inside the neighbouring luma coding block is set equal to (xCb−1, yCb+cbWidth).

The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location (xNb$A_0$, yNb$A_0$) as inputs, and the output is assigned to the block availability flag available$A_0$.

The variables availableFlag$A_0$, refIdxLX$A_0$, predFlagLX$A_0$ and mvLX$A_0$ are derived as follows:

If one or more of the following conditions are true, availableFlag$A_0$ is set equal to 0, both components of mvLX$A_0$ are set equal to 0, refIdxLX$A_0$ is set equal to −1 and predFlagLX$A_0$ is set equal to 0, with X being 0 or 1, and gbiIdx$A_0$ is set equal to 0:

available$A_0$ is equal to FALSE.

available$A_1$ is equal to TRUE and the luma locations (xNb$A_1$, yNb$A_1$) and (xNb$A_0$, yNb$A_0$) have the same motion vectors and the same reference indices.

available$B_1$ is equal to TRUE, the luma locations (xNb$B_1$, yNb$B_1$) and (xNb$A_0$, yNb$A_0$) have the same motion vectors and the same reference indices.

available$B_0$ is equal to TRUE, the luma locations (xNb$B_0$, yNb$B_0$) and (xNb$A_0$, yNb$A_0$) have the same motion vectors and the same reference indices.

Otherwise, availableFlag$A_0$ is set equal to 1 and the following assignments are made:

$$mvLXA_0 = MvLX[xNbA_0][yNbA_0] \quad (8\text{-}306)$$

$$refIdxLXA_0 = RefIdxLX[xNbA_0][yNbA_0] \quad (8\text{-}307)$$

$$predFlagLXA_0 = PredFlagLX[xNbA_0][yNbA_0] \quad (8\text{-}308)$$

$$gbiIdxA_0 = GbiIdx[xNbA_0][yNbA_0] \quad (8\text{-}309)$$

For the derivation of availableFlag$B_2$, refIdxLX$B_2$, predFlagLX$B_2$ and mvLX$B_2$ the following applies:

The luma location (xNb$B_2$, yNb$B_2$) inside the neighbouring luma coding block is set equal to (xCb−1, yCb−1).

The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location (xNb$B_2$, yNb$B_2$) as inputs, and the output is assigned to the block availability flag available$B_2$.

The variables availableFlag$B_2$, refIdxLX$B_2$, predFlagLX$B_2$ and mvLX$B_2$ are derived as follows:

If one or more of the following conditions are true, availableFlag$B_2$ is set equal to 0, both components of mvLX$B_2$ are set equal to 0, refIdxLX$B_2$ is set equal to −1 and predFlagLX$B_2$ is set equal to 0, with X being 0 or 1, and gbiIdx$B_2$ is set equal to 0:

available$B_2$ is equal to FALSE.

available$A_1$ is equal to TRUE and the luma locations (xNb$A_1$, yNb$A_1$) and (xNb$B_2$, yNb$B_2$) have the same motion vectors and the same reference indices.

available$B_1$ is equal to TRUE and the luma locations (xNb$B_1$, yNb$B_1$) and (xNb$B_2$, yNb$B_2$) have the same motion vectors and the same reference indices.

available$B_0$ is equal to TRUE, the luma locations (xNb$B_0$, yNb$B_0$) and (xNb$B_2$, yNb$B_2$) have the same motion vectors and the same reference indices.

available$A_0$ is equal to TRUE, the luma locations (xNb$A_0$, yNb$A_0$) and (xNb$B_2$, yNb$B_2$) have the same motion vectors and the same reference indices.

availableFlag$A_0$+availableFlag$A_1$+availableFlag$B_0$+availableFlag$B_1$ is equal to 4 and merge_triangle_flag[xCb][yCb] is equal to 0.

Otherwise, availableFlag$B_2$ is set equal to 1 and the following assignments are made:

$$mvLXB_2 = MvLX[xNbB_2][yNbB_2] \quad (8\text{-}310)$$

$$refIdxLXB_2 = RefIdxLX[xNbB_2][yNbB_2] \quad (8\text{-}311)$$

$$predFlagLXB_2 = PredFlagLX[xNbB_2][yNbB_2] \quad (8\text{-}312)$$

$$gbiIdxB_2 = GbiIdx[xNbB_2][yNbB_2] \quad (8\text{-}313)$$

5.2 Embodiment #2

This embodiment is to align the pruning process for TPM coded block to that for non-TPM coded blocks, i.e., limited pruning operations for TPM coded blocks.

8.5.2.3 Derivation Process for Spatial Merging Candidates

Inputs to this process are:

a luma location (xCb, yCb) of the top-left sample of the current luma coding block relative to the top-left luma sample of the current picture, a variable cbWidth specifying the width of the current coding block in luma samples, a variable cbHeight specifying the height of the current coding block in luma samples.

Outputs of this process are as follows, with X being 0 or 1:

the availability flags availableFlag$A_0$, availableFlag$A_1$, availableFlag$B_0$, availableFlag$B_1$ and availableFlag$B_2$ of the neighbouring coding units, the reference indices refIdxLX$A_0$, refIdxLX$A_1$, refIdxLX$B_0$, refIdxLX$B_1$ and refIdxLX$B_2$ of the neighbouring coding units, the prediction list utilization flags predFlagLX$A_0$, predFlagLX$A_1$, predFlagLX$B_0$, predFlagLX$B_1$ and predFlagLX$B_2$ of the neighbouring coding units, the motion vectors in 1/16 fractional-sample accuracy mvLX$A_0$, mvLX$A_1$, mvLX$B_0$, mvLX$B_1$ and mvLX$B_2$ of the neighbouring coding units, the bi-prediction weight indices gbiIdx$A_0$, gbiIdx$A_i$, gbiIdx$B_0$, gbiIdx$B_i$, and gbiIdx$B_2$.

For the derivation of availableFlag$A_i$, refIdxLX$A_1$, predFlagLX$A_i$ and mvLX$A_1$ the following applies:

The luma location (xNb$A_1$, yNb$A_1$) inside the neighbouring luma coding block is set equal to (xCb−1, yCb+cbHeight−1).

The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location (xNbA$_1$, yNbA$_1$) as inputs, and the output is assigned to the block availability flag available A$_1$.

The variables availableFlagA$_1$, refIdxLXA$_1$, predFlagLXA$_1$ and mvLXA$_1$ are derived as follows:

If availableA$_1$ is equal to FALSE, availableFlagA$_1$ is set equal to 0, both components of mvLXA$_1$ are set equal to 0, refIdxLXA$_1$ is set equal to −1 and predFlagLXA$_i$ is set equal to 0, with X being 0 or 1, and gbiIdxA$_1$ is set equal to 0.

Otherwise, availableFlagA$_1$ is set equal to 1 and the following assignments are made:

$$mvLXA_1 = MvLX[xNbA_i][yNbA_i] \quad (8\text{-}294)$$

$$refIdxLXA_1 = RefIdxLX[xNbA_1][yNbA_1] \quad (8\text{-}295)$$

$$predFlagLXA_1 = PredFlagLX[xNbA_1][yNbA_1] \quad (8\text{-}296)$$

$$gbiIdxA_1 = GbiIdx[xNbA_1][yNbA_1] \quad (8\text{-}297)$$

For the derivation of availableFlagB$_1$, refIdxLXB$_1$, predFlagLXB$_1$ and mvLXB$_1$ the following applies:

The luma location (xNbB$_1$, yNbB$_1$) inside the neighbouring luma coding block is set equal to (xCb+cbWidth−1, yCb−1).

The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location (xNbB$_1$, yNbB$_1$) as inputs, and the output is assigned to the block availability flag availableB$_1$.

The variables availableFlagB$_1$, refIdxLXB$_1$, predFlagLXB$_1$ and mvLXB$_1$ are derived as follows:

If one or more of the following conditions are true, availableFlagB$_1$ is set equal to 0, both components of mvLXB$_1$ are set equal to 0, refIdxLXB$_1$ is set equal to −1 and predFlagLXB$_1$ is set equal to 0, with X being 0 or 1, and gbiIdxB$_1$ is set equal to 0:
availableB$_1$ is equal to FALSE.
availableA$_1$ is equal to TRUE and the luma locations (xNbA$_1$, yNbA$_1$) and (xNbB$_1$, yNbB$_1$) have the same motion vectors and the same reference indices.

Otherwise, availableFlagB$_1$ is set equal to 1 and the following assignments are made:

$$mvLXB_1 = MvLX[xNbB_1][yNbB_1] \quad (8\text{-}298)$$

$$refIdxLXB_i = RefIdxLX[xNbB_i][yNbB_i] \quad (8\text{-}299)$$

$$predFlagLXB_1 = PredFlagLX[xNbB_1][yNbB_1] \quad (8\text{-}300)$$

$$gbiIdxB_1 = GbiIdx[xNbB_1][yNbB_1] \quad (8\text{-}301)$$

For the derivation of availableFlagB$_0$, refIdxLXB$_0$, predFlagLXB$_0$ and mvLXB$_0$ the following applies:

The luma location (xNbB$_0$, yNbB$_0$) inside the neighbouring luma coding block is set equal to (xCb+cbWidth, yCb−1).

The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location (xNbB$_0$, yNbB$_0$) as inputs, and the output is assigned to the block availability flag availableB$_0$.

The variables availableFlagB$_0$, refIdxLXB$_0$, predFlagLXB$_0$ and mvLXB$_0$ are derived as follows:

If one or more of the following conditions are true, availableFlagB$_0$ is set equal to 0, both components of mvLXB$_0$ are set equal to 0, refIdxLXB$_0$ is set equal to −1 and predFlagLXB$_0$ is set equal to 0, with X being 0 or 1, and gbiIdxB$_0$ is set equal to 0:
availableB$_0$ is equal to FALSE.
availableB$_1$ is equal to TRUE and the luma locations (xNbB$_1$, yNbB$_1$) and (xNbB$_0$, yNbB$_0$) have the same motion vectors and the same reference indices.

Otherwise, availableFlagB$_0$ is set equal to 1 and the following assignments are made:

$$mvLXB_0 = MvLX[xNbB_0][yNbB_0] \quad (8\text{-}302)$$

$$refIdxLXB_0 = RefIdxLX[xNbB_0][yNbB_0] \quad (8\text{-}303)$$

$$predFlagLXB_0 = PredFlagLX[xNbB_0][yNbB_0] \quad (8\text{-}304)$$

$$gbiIdxB_0 = GbiIdx[xNbB_0][yNbB_0] \quad (8\text{-}305)$$

For the derivation of availableFlagA$_0$, refIdxLXA$_0$, predFlagLXA$_0$ and mvLXA$_0$ the following applies:

The luma location (xNbA$_0$, yNbA$_0$) inside the neighbouring luma coding block is set equal to (xCb−1, yCb+cbWidth).

The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location (xNbA$_0$, yNbA$_0$) as inputs, and the output is assigned to the block availability flag availableA$_0$.

The variables availableFlagA$_0$, refIdxLXA$_0$, predFlagLXA$_0$ and mvLXA$_0$ are derived as follows:

If one or more of the following conditions are true, availableFlagA$_0$ is set equal to 0, both components of mvLXA$_0$ are set equal to 0, refIdxLXA$_0$ is set equal to −1 and predFlagLXA$_0$ is set equal to 0, with X being 0 or 1, and gbiIdxA$_0$ is set equal to 0:
availableA$_0$ is equal to FALSE.
availableA$_1$ is equal to TRUE and the luma locations (xNbA$_1$, yNbA$_1$) and (xNbA$_0$, yNbA$_0$) have the same motion vectors and the same reference indices.

Otherwise, availableFlagA$_0$ is set equal to 1 and the following assignments are made:

$$mvLXA_0 = MvLX[xNbA_0][yNbA_0] \quad (8\text{-}306)$$

$$refIdxLXA_0 = RefIdxLX[xNbA_0][yNbA_0] \quad (8\text{-}307)$$

$$predFlagLXA_0 = PredFlagLX[xNbA_0][yNbA_0] \quad (8\text{-}308)$$

$$gbiIdxA_0 = GbiIdx[xNbA_0][yNbA_0] \quad (8\text{-}309)$$

For the derivation of availableFlagB$_2$, refIdxLXB$_2$, predFlagLXB$_2$ and mvLXB$_2$ the following applies:

The luma location (xNbB$_2$, yNbB$_2$) inside the neighbouring luma coding block is set equal to (xCb−1, yCb−1).

The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location (xNbB$_2$, yNbB$_2$) as inputs, and the output is assigned to the block availability flag availableB$_2$.

The variables availableFlagB$_2$, refIdxLXB$_2$, predFlagLXB$_2$ and mvLXB$_2$ are derived as follows:
If one or more of the following conditions are true, availableFlagB$_2$ is set equal to 0, both components of mvLXB$_2$ are set equal to 0, refIdxLXB$_2$ is set equal to −1 and predFlagLXB$_2$ is set equal to 0, with X being 0 or 1, and gbiIdxB$_2$ is set equal to 0:
availableB$_2$ is equal to FALSE.
availableA$_1$ is equal to TRUE and the luma locations (xNbA$_1$, yNbA$_1$) and (xNbB$_2$, yNbB$_2$) have the same motion vectors and the same reference indices.
availableB$_1$ is equal to TRUE and the luma locations (xNbB$_1$, yNbB$_1$) and (xNbB$_2$, yNbB$_2$) have the same motion vectors and the same reference indices.
availableFlagA$_0$+availableFlagA$_1$+availableFlagB$_0$+availableFlagB$_1$ is equal to 4 and merge_triangle_flag[xCb][yCb] is equal to 0.
Otherwise, availableFlagB$_2$ is set equal to 1 and the following assignments are made:

mvLXB$_2$=MvLX[xNbB$_2$][yNbB$_2$]  (8-310)

refIdxLXB$_2$=RefIdxLX[xNbB$_2$][yNbB$_2$]  (8-311)

predFlagLXB$_2$=PredFlagLX[xNbB$_2$][yNbB$_2$]  (8-312)

gbiIdxB$_2$=GbiIdx[xNbB$_2$][yNbB$_2$]  (8-313)

5.3 Embodiment #3

This embodiment is to align the conditions for invoking the checking of B2.
8.5.2.3 Derivation Process for Spatial Merging Candidates
Inputs to this process are:
a luma location (xCb, yCb) of the top-left sample of the current luma coding block relative to the top-left luma sample of the current picture,
a variable cbWidth specifying the width of the current coding block in luma samples,
a variable cbHeight specifying the height of the current coding block in luma samples.
Outputs of this process are as follows, with X being 0 or 1:
the availability flags availableFlagA$_0$, availableFlagA$_1$, availableFlagB$_0$, availableFlagB$_1$ and availableFlagB$_2$ of the neighbouring coding units,
the reference indices refIdxLXA$_0$, refIdxLXA$_1$, refIdxLXB$_0$, refIdxLXB$_1$ and refIdxLXB$_2$ of the neighbouring coding units,
the prediction list utilization flags predFlagLXA$_0$, predFlagLXA$_1$, predFlagLXB$_0$, predFlagLXB$_1$ and predFlagLXB$_2$ of the neighbouring coding units,
the motion vectors in 1/16 fractional-sample accuracy mvLXA$_0$, mvLXA$_1$, mvLXB$_0$, mvLXB$_1$ and mvLXB$_2$ of the neighbouring coding units,
the bi-prediction weight indices gbiIdxA$_0$, gbiIdxA$_1$, gbiIdxB$_0$, gbiIdxB$_1$, and gbiIdxB$_2$.
For the derivation of availableFlagA$_1$, refIdxLXA$_1$, predFlagLXA$_1$ and mvLXA$_1$ the following applies:
The luma location (xNbA$_1$, yNbA$_1$) inside the neighbouring luma coding block is set equal to (xCb−1, yCb+cbHeight−1).
The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location (xNbA$_1$, yNbA$_1$) as inputs, and the output is assigned to the block availability flag
The variables availableFlagA$_1$, refIdxLXA$_1$, predFlagLXA$_1$ and mvLXA$_1$ are derived as follows:
. . .
For the derivation of availableFlagB$_1$, refIdxLXB$_1$, predFlagLXB$_1$ and mvLXB$_1$ the following applies:
The luma location (xNbB$_i$, yNbB$_i$) inside the neighbouring luma coding block is set equal to (xCb+cbWidth−1, yCb−1).
. . .
For the derivation of availableFlagB$_0$, refIdxLXB$_0$, predFlagLXB$_0$ and mvLXB$_0$ the following applies:
The luma location (xNbB$_0$, yNbB$_0$) inside the neighbouring luma coding block is set equal to (xCb+cbWidth, yCb−1).
. . .
For the derivation of availableFlagA$_0$, refIdxLXA$_0$, predFlagLXA$_0$ and mvLXA$_0$ the following applies:
The luma location (xNbA$_0$, yNbA$_0$) inside the neighbouring luma coding block is set equal to (xCb−1, yCb+cbWidth).
. . .
For the derivation of availableFlagB$_2$, refIdxLXB$_2$, predFlagLXB$_2$ and mvLXB$_2$ the following applies:
The luma location (xNbB$_2$, yNbB$_2$) inside the neighbouring luma coding block is set equal to (xCb−1, yCb−1).
The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location (xNbB$_2$, yNbB$_2$) as inputs, and the output is assigned to the block availability flag availableB$_2$.
The variables availableFlagB$_2$, refIdxLXB$_2$, predFlagLXB$_2$ and mvLXB$_2$ are derived as follows:
If one or more of the following conditions are true, availableFlagB$_2$ is set equal to 0, both components of mvLXB$_2$ are set equal to 0, refIdxLXB$_2$ is set equal to −1 and predFlagLXB$_2$ is set equal to 0, with X being 0 or 1, and gbiIdxB$_2$ is set equal to 0:
availableB$_2$ is equal to FALSE.
availableA$_1$ is equal to TRUE and the luma locations (xNbA$_1$, yNbA$_1$) and (xNbB$_2$, yNbB$_2$) have the same motion vectors and the same reference indices.
availableB$_1$ is equal to TRUE and the luma locations (xNbB$_1$, yNbB$_1$) and (xNbB$_2$, yNbB$_2$) have the same motion vectors and the same reference indices.
availableB$_0$ is equal to TRUE, the luma locations (xNbB$_0$, yNbB$_0$) and (xNbB$_2$, yNbB$_2$) have the same motion vectors and the same reference indices and merge_triangle_flag[xCb][yCb] is equal to 1.
availableA$_0$ is equal to TRUE, the luma locations (xNbA$_0$, yNbA$_0$) and (xNbB$_2$, yNbB$_2$) have the same motion vectors and the same reference indices and merge_triangle_flag[xCb][yCb] is equal to 1.
availableFlagA$_0$+availableFlagA$_1$+availableFlagB$_0$+availableFlagB$_1$ is equal to 4.
Otherwise, availableFlagB$_2$ is set equal to 1 and the following assignments are made:

$$mvLXB_2 = MvLX[xNbB_2][yNbB_2] \quad (8\text{-}310)$$

$$refIdxLXB_2 = RefIdxLX[xNbB_2][yNbB_2] \quad (8\text{-}311)$$

$$predFlagLXB_2 = PredFlagLX[xNbB_2][yNbB_2] \quad (8\text{-}312)$$

$$gbiIdxB_2 = GbiIdx[xNbB_2][yNbB_2] \quad (8\text{-}313)$$

5.4 Embodiment #4

This embodiment is to align the conditions for invoking the checking of B2.

8.5.2.3 Derivation Process for Spatial Merging Candidates
Inputs to this process are:
  a luma location (xCb, yCb) of the top-left sample of the current luma coding block relative to the top-left luma sample of the current picture,
  a variable cbWidth specifying the width of the current coding block in luma samples,
  a variable cbHeight specifying the height of the current coding block in luma samples.
Outputs of this process are as follows, with X being 0 or 1:
  the availability flags availableFlag$A_0$, availableFlag$A_i$, availableFlag$B_0$, availableFlag$B_1$ and availableFlag$B_2$ of the neighbouring coding units,
  the reference indices refIdxLX$A_0$, refIdxLX$A_1$, refIdxLX$B_0$, refIdxLX$B_1$ and refIdxLX$B_2$ of the neighbouring coding units,
  the prediction list utilization flags predFlagLX$A_0$, predFlagLX$A_1$, predFlagLX$B_0$, predFlagLX$B_1$ and predFlagLX$B_2$ of the neighbouring coding units,
  the motion vectors in 1/16 fractional-sample accuracy mvLX$A_0$, mvLX$A_1$, mvLX$B_0$, mvLX$B_1$ and mvLX$B_2$ of the neighbouring coding units,
  the bi-prediction weight indices gbiIdx$A_0$, gbiIdx$A_1$, gbiIdx$B_0$, gbiIdx$B_1$, and gbiIdx$B_2$.
For the derivation of availableFlag$A_1$, refIdxLX$A_1$, predFlagLX$A_1$ and mvLX$A_1$ the following applies:
  The luma location (xNb$A_1$, yNb$A_1$) inside the neighbouring luma coding block is set equal to (xCb−1, yCb+cbHeight−1).
  The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location (xNb$A_1$, yNb$A_1$) as inputs, and the output is assigned to the block availability flag available$A_1$.
  The variables availableFlag$A_1$, refIdxLX$A_1$, predFlagLX$A_1$ and mvLX$A_1$ are derived as follows:
  . . .
For the derivation of availableFlag$B_1$, refIdxLX$B_1$, predFlagLX$B_1$ and mvLX$B_1$ the following applies:
  The luma location (xNb$B_1$, yNb$B_1$) inside the neighbouring luma coding block is set equal to (xCb+cbWidth−1, yCb−1).
  . . .
For the derivation of availableFlag$B_0$, refIdxLX$B_0$, predFlagLX$B_0$ and mvLX$B_0$ the following applies:
  The luma location (xNb$B_0$, yNb$B_0$) inside the neighbouring luma coding block is set equal to (xCb+cbWidth, yCb−1).
  . . .
For the derivation of availableFlag$A_0$, refIdxLX$A_0$, predFlagLX$A_0$ and mvLX$A_0$ the following applies:

The luma location (xNb$A_0$, yNb$A_0$) inside the neighbouring luma coding block is set equal to (xCb−1, yCb+cbWidth).
  . . .
For the derivation of availableFlag$B_2$, refIdxLX$B_2$, predFlagLX$B_2$ and mvLX$B_2$ the following applies:
  The luma location (xNb$B_2$, yNb$B_2$) inside the neighbouring luma coding block is set equal to (xCb−1, yCb−1).
  The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location (xNb$B_2$, yNb$B_2$) as inputs, and the output is assigned to the block availability flag available$B_2$.
  The variables availableFlag$B_2$, refIdxLX$B_2$, predFlagLX$B_2$ and mvLX$B_2$ are derived as follows:
    If one or more of the following conditions are true, availableFlag$B_2$ is set equal to 0, both components of mvLX$B_2$ are set equal to 0, refIdxLX$B_2$ is set equal to −1 and predFlagLX$B_2$ is set equal to 0, with X being 0 or 1, and gbiIdx$B_2$ is set equal to 0:
      available$B_2$ is equal to FALSE.
      available$A_1$ is equal to TRUE and the luma locations (xNb$A_1$, yNb$A_1$) and (xNb$B_2$, yNb$B_2$) have the same motion vectors and the same reference indices.
      available$B_1$ is equal to TRUE and the luma locations (xNb$B_1$, yNb$B_1$) and (xNb$B_2$, yNb$B_2$) have the same motion vectors and the same reference indices.
      available$B_0$ is equal to TRUE, the luma locations (xNb$B_0$, yNb$B_0$) and (xNb$B_2$, yNb$B_2$) have the same motion vectors and the same reference indices and merge_triangle_flag[xCb][yCb] is equal to 1.
      available$A_0$ is equal to TRUE, the luma locations (xNb$A_0$, yNb$A_0$) and (xNb$B_2$, yNb$B_2$) have the same motion vectors and the same reference indices and merge_triangle_flag[xCb][yCb] is equal to 1.
    Otherwise, availableFlag$B_2$ is set equal to 1 and the following assignments are made:

$$mvLXB_2 = MvLX[xNbB_2][yNbB_2] \quad (8\text{-}310)$$

$$refIdxLXB_2 = RefIdxLX[xNbB_2][yNbB_2] \quad (8\text{-}311)$$

$$predFlagLXB_2 = PredFlagLX[xNbB_2][yNbB_2] \quad (8\text{-}312)$$

$$gbiIdxB_2 = GbiIdx[xNbB_2][yNbB_2] \quad (8\text{-}313)$$

5.5 Embodiment #5

This embodiment is to simplify the decision of initialized MV in advanced temporal motion vector prediction (ATMVP) process.

8.5.5.4 Derivation Process for Subblock-Based Temporal Merging Base Motion Data
Inputs to this process are:
  the location (xCtb, yCtb) of the top-left sample of the luma coding tree block that contains the current coding block,
  the location (xColCtrCb, yColCtrCb) of the top-left sample of the collocated luma coding block that covers the below-right center sample.

the availability flag availableFlagA₁ of the neighbouring coding unit,
the reference index refIdxLXA₁ of the neighbouring coding unit,
the prediction list utilization flag predFlagLXA₁ of the neighbouring coding unit,
the motion vector in 1/16 fractional-sample accuracy mvLXA₁ of the neighbouring coding unit.
Outputs of this process are:
the motion vectors ctrMvL0 and ctrMvL1,
the prediction list utilization flags ctrPredFlagL0 and ctrPredFlagL1,
the temporal motion vector tempMv.
The variable tempMv is set as follows:

tempMv[0]=0 (8-529)

tempMv[1]=0 (8-530)

The variable currPic specifies the current picture.
When availableFlagA_i is equal to TRUE, the following applies:
SET A VARIABLE X TO COLLOCATED_FROM_L0_FLAG.
IF PREDFLAGLXA1 IS EQUAL TO 1 AND DIFFPICORDERCNT(COLPIC, REFPICLIST[X][REFIDXLXA1]) IS EQUAL TO 0 ARE TRUE, TEMPMV IS SET EQUAL TO MVLXA1.
The location (xColCb, yColCb) of the collocated block inside ColPic is derived as follows.

xColCb=Clip3(xCtb,Min(CurPicWidthInSamplesY−1,xCtb+(1<<CtbLog2SizeY)+3), (8-531)

xColCtrCb+(tempMv[0]>>4))

yColCb=Clip3(yCtb,Min(CurPicHeightInSamplesY−1,yCtb+(1<<CtbLog2SizeY)−1), yColCtrCb+(tempMv[1]>>4)) (8-532)

The array colPredMode is set equal to the prediction mode array CuPredMode of the collocated picture specified by ColPic.
The motion vectors ctrMvL0 and ctrMvL1, and the prediction list utilization flags ctrPredFlagL0 and ctrPredFlagL1 are derived as follows:
. . .

5.6 Embodiment #6

Examples for alignment of derivation process of collocated MVs for sub-block and non-sub-block based methods.
8.5.2.12 Derivation Process for Collocated Motion Vectors
Inputs to this process are:
a variable currCb specifying the current coding block,
a variable colCb specifying the collocated coding block inside the collocated picture specified by ColPic,
a luma location (xColCb, yColCb) specifying the top-left sample of the collocated luma coding block specified by colCb relative to the top-left luma sample of the collocated picture specified by ColPic,
a reference index refIdxLX, with X being 0 or 1, a flag indicating a subblock temporal merging candidate sbFlag.
Outputs of this process are:
the motion vector prediction mvLXCol in 1/16 fractional-sample accuracy,
the availability flag availableFlagLXCol.
The variable currPic specifies the current picture.

The arrays predFlagL0Col[x][y], mvL0Col[x][y] and refIdxL0Col[x][y] are set equal to PredFlagL0[x][y], MvDmvrL0[x][y] and RefIdxL0[x][y], respectively, of the collocated picture specified by ColPic, and the arrays predFlagL1Col[x][y], mvL1Col[x][y] and refIdxL1Col[x][y] are set equal to PredFlagL1[x][y], MvDmvrL1[x][y] and RefIdxL1[x][y], respectively, of the collocated picture specified by ColPic.
The variables mvLXCol and availableFlagLXCol are derived as follows:
If colCb is coded in an intra or IBC prediction mode, both components of mvLXCol are set equal to 0 and availableFlagLXCol is set equal to 0.
Otherwise, the motion vector mvCol, the reference index refIdxCol and the reference list identifier listCol are derived as follows:
If availableFlagLXCol is set to 1 and the following applies:
If predFlagL0Col[xColCb][yColCb] is equal to 0, mvCol, refIdxCol and listCol are set equal to mvL1Col[xColCb][yColCb], refIdxL1Col[xColCb][yColCb] and L1, respectively.
Otherwise, if predFlagL0Col[xColCb][yColCb] is equal to 1 and predFlagL1Col[xColCb][yColCb] is equal to 0, mvCol, refIdxCol and listCol are set equal to mvL0Col[xColCb][yColCb], refIdxL0Col[xColCb][yColCb] and L0, respectively.
Otherwise (predFlagL0Col[xColCb][yColCb] is equal to 1 and predFlagL1Col[xColCb][yColCb] is equal to 1), the following assignments are made:
IfNoBackwardPredFlag is equal to 1, mvCol, refIdxCol and listCol are set equal to mvLXCol[xColCb][yColCb], refIdxLXCol[xColCb][yColCb] and LX, respectively.
Otherwise, mvCol, refIdxCol and listCol are set equal to mvLNCol[xColCb][yColCb], refIdxLNCol[xColCb][yColCb] and LN, respectively, with N being the value of collocated_from_l0_flag.
When availableFlagLXCol is equal to TRUE, mvLXCol and availableFlagLXCol are derived as follows:
If LongTermRefPic(currPic, currCb, refIdxLX, LX) is not equal to LongTermRefPic(ColPic, colCb, refIdxCol, listCol), both components of mvLXCol are set equal to 0 and availableFlagLXCol is set equal to 0.
Otherwise, the variable availableFlagLXCol is set equal to 1, refPicList[listCol][refIdxCol] is set to be the picture with reference index refIdxCol in the reference picture list listCol of the slice containing coding block colCb in the collocated picture specified by ColPic, and the following applies:
. . .

5.7 Embodiment #7 on IBC Motion List Construction

Two coordinates are used to derive the candidates, one is to identify neighboring blocks, and the other one is used for availability check of the identified neighboring blocks.
8.6.2.2 Derivation Process for IBC Luma Block Vector Prediction
This process is only invoked when CuPredMode[0][xCb][yCb] is equal to MODE_IBC, where (xCb, yCb) specify the top-left sample of the current luma coding block relative to the top-left luma sample of the current picture.

Inputs to this process are:
a luma location (xCb, yCb) of the top-left sample of the current luma coding block relative to the top-left luma sample of the current picture,
a variable cbWidth specifying the width of the current coding block in luma samples,
a variable cbHeight specifying the height of the current coding block in luma samples.

Outputs of this process are:
the luma block vector in 1/16 fractional-sample accuracy bvL.

The variables xSmr, ySmr, smrWidth, and smrHeight are derived as follows:

xSmr=IsInSmr[xCb][yCb]?SmrX[xCb][yCb]:xCb (8-906)

ySmr=IsInSmr[xCb][yCb]?SmrY[xCb][yCb]:yCb (8-907)

smrWidth=IsInSmr[xCb][yCb]?SmrW[xCb][yCb]:
cbWidth (8-908)

smrHeight=IsInSmr[xCb][yCb]?SmrH[xCb][yCb]:
cbHeight (8-909)

The luma block vector bvL is derived by the following ordered steps:
1. The derivation process for spatial block vector candidates from neighbouring coding units as specified in clause 8.6.2.3 is invoked with the luma coding block OF SHARED MERGE REGION LOCATION location (xCb, yCb) set equal to (xSmr, ySmr), THE LUMA CODING BLOCK OF CURRENT CODING BLOCK LOCATION (XCURRCB, YCURRCB) SET EQUAL TO (XCB, YCB), the luma coding block width cbWidth, and the luma coding block height cbHeight set equal to smrWidth and smrHeight as inputs, and the outputs being the availability flags availableFlagA$_1$, availableFlagB$_1$ and the block vectors bvA$_1$ and bvB$_1$.
2. The block vector candidate list, bvCandList, is constructed as follows:

i=0 if(availableFlagA$_1$)

bvCandList[i++]=bvA$_1$ (8-910)

if(availableFlagB$_1$)

bvCandList[i++]=bvB$_1$

3. The variable numCurrCand is set equal to the number of merging candidates in the bvCandList.
4. When numCurrCand is less than MaxNumIbcMergeCand and NumHmvpIbcCand is greater than 0, the derivation process of IBC history-based block vector candidates as specified in 8.6.2.4 is invoked with bvCandList, and numCurrCand as inputs, and modified bvCandList and numCurrCand as outputs.
5. When numCurrCand is less than MaxNumIbcMergeCand, the following applies until numCurrCand is equal to MaxNumIbcMergeCand:
   1. bvCandList[numCurrCand][0] is set equal to 0.
   2. bvCandList[numCurrCand][1] is set equal to 0.
   3. numCurrCand is increased by 1.
6. The variable bvIdx is derived as follows:

bvIdx=general_merge_flag[xCb][yCb]?merge_idx
[xCb][yCb]:mvp_l0_flag[xCb][yCb] (8-911)

7. The following assignments are made:

bvL[0]=bvCandList[mvIdx][0] (8-912)

bvL[1]=bvCandList[mvIdx][1] (8-913)

4.7.1.1 Derivation Process for IBC Spatial Block Vector Candidates

Inputs to this process are:
a luma location (xCb, yCb) of the top-left sample of the luma coding block relative to the top-left luma sample of the current picture,
A LUMA LOCATION (XCURRCB, YCURRCB) THE TOP-LEFT SAMPLE OF THE CURRENT LUMA CODING BLOCK RELATIVE TO THE TOP-LEFT LUMA SAMPLE OF THE CURRENT PICTURE,
a variable cbWidth specifying the width of the current coding block in luma samples,
a variable cbHeight specifying the height of the current coding block in luma samples.

Outputs of this process are as follows:
the availability flags availableFlagA$_1$ and availableFlagB$_1$ of the neighbouring coding units,
the block vectors in 1/16 fractional-sample accuracy bvA$_1$, and bvB$_1$ of the neighbouring coding units, For the derivation of availableFlagA$_1$ and mvA$_1$ the following applies:
The luma location (xNbA$_1$, yNbA$_1$) inside the neighbouring luma coding block is set equal to (xCb−1, yCb+cbHeight−1).
The derivation process for neighbouring block availability as specified in clause 6.4.4 is invoked with the current luma location (xCurr, yCurr) set equal to (XCURRCB, YCURRCB), the neighbouring luma location (xNbA$_1$, yNbA$_1$), checkPredModeY set equal to TRUE, and cIdx set equal to 0 as inputs, and the output is assigned to the block availability flag availableA$_1$.
The variables availableFlagA$_1$ and bvA$_1$ are derived as follows:
If availableA$_1$ is equal to FALSE, availableFlagA$_1$ is set equal to 0 and both components of bvA$_1$ are set equal to 0.
Otherwise, availableFlagA$_1$ is set equal to 1 and the following assignments are made:

bvA$_1$=MvL0[xNbA$_1$][yNbA$_1$] (8-914)

For the derivation of availableFlagB$_1$ and bvB$_1$ the following applies:
The luma location (xNbB$_i$, yNbB$_i$) inside the neighbouring luma coding block is set equal to (xCb+cbWidth−1, yCb−1).
The derivation process for neighbouring block availability as specified in clause 6.4.4 is invoked with the current luma location (xCurr, yCurr) set equal to (XCURRCB, YCURRCB), the neighbouring luma location (xNbB$_1$, yNbB$_1$), checkPredModeY set equal to TRUE, and cIdx set equal to 0 as inputs, and the output is assigned to the block availability flag availableB$_1$.
The variables availableFlagB$_1$ and bvB$_1$ are derived as follows:
If one or more of the following conditions are true, availableFlagB$_1$ is set equal to 0 and both components of bvB$_1$ are set equal to 0:
availableB$_1$ is equal to FALSE.
availableA$_1$ is equal to TRUE and the luma locations (xNbA$_1$, yNbA$_1$) and (xNbB$_1$, yNbB$_1$) have the same block vectors.

Otherwise, availableFlagB$_1$ is set equal to 1 and the following assignments are made:

bvB$_1$=MvL0[xNbB$_1$][yNbB$_1$]  (8-915)

5.8 Embodiment #7 on CIIP 8.5.6.7 Weighted Sample Prediction Process for Combined Merge and Intra Prediction Inputs to this process are:
a luma location (xCb, yCb) specifying the top-left sample of the current luma coding block relative to the top left luma sample of the current picture,
the width of the current coding block cbWidth,
the height of the current coding block cbHeight,
two (cbWidth)×(cbHeight) arrays predSamplesInter and predSamplesIntra,
a variable cIdx specifying the colour component index.

Output of this process is the (cbWidth)×(cbHeight) array predSamplesComb of prediction sample values.

The variable bitDepth is derived as follows:
If cIdx is equal to 0, bitDepth is set equal to BitDepth$_Y$.
Otherwise, bitDepth is set equal to BitDepth$_C$.

The variable scallFact is derived as follows:

scallFact=(cIdx==0)?0:1.  (8-838)

The neighbouring luma locations (xNbA, yNbA) and (xNbB, yNbB) are set equal to (xCb−1, yCb−1+(cbHeight<<scallFact)) and (xCb−1+(cbWidth<<scallFact), yCb−1), respectively.

For X being replaced by either A or B, the variables availableX and isIntraCodedNeighbourX are derived as follows:
The derivation process for neighbouring block availability as specified in clause 6.4.4 is invoked with the location (xCurr, yCurr) set equal to (xCb, yCb), the neighbouring location (xNbY, yNbY) set equal to (xNbX, yNbX), checkPredModeY set equal to FALSE, and cIdx set equal to 0 as inputs, and the output is assigned to availableX.

The variable isIntraCodedNeighbourX is derived as follows:
If availableX is equal to TRUE and CuPredMode[0][xNbX][yNbX] is equal to MODE_INTRA, isIntraCodedNeighbourX is set equal to TRUE.
Otherwise, isIntraCodedNeighbourX is set equal to FALSE.

The weight w is derived as follows:
If isIntraCodedNeighbourA and isIntraCodedNeighbourB are both equal to TRUE, w is set equal to 3.
Otherwise, if isIntraCodedNeighbourA and isIntraCodedNeighbourB are both equal to FALSE, w is set equal to 1.
Otherwise, w is set equal to 2.

When cIdx is equal to 0 and slice_lmcs_enabled_flag is equal to 1, predSamplesInter[x][y] with x=0 . . . cbWidth−1 and y=0 . . . cbHeight−1 are modified as follows:

idxY=predSamplesInter[x][y]>>Log2(OrgCW)

predSamplesInter[x][y]=Clip1$_Y$(LmcsPivot[idxY]+(ScaleCoeff[idxY]*(predSamplesInter[x][y]−InputPivot[idxY])+(1<<10))>>11)  (8-839)

6.4.4 Derivation Process for Neighbouring Block Availability

Inputs to this process are:
the luma location (xCurr, yCurr) of the top-left sample of the current block relative to the top-left luma sample of the current picture,
the luma location (xNbY, yNbY) covered by a neighbouring block relative to the top-left luma sample of the current picture,
the variable checkPredModeY specifying whether availability depends on the prediction mode.
the variable cIdx specifying the colour component of the current block.

Output of this process is the availability of the neighbouring block covering the location (xNbY, yNbY), denoted as availableN.

The neighbouring block availability availableN is derived as follows:
If one or more of the following conditions are true, availableN is set equal to FALSE:
xNbY is less than 0.
yNbY is less than 0.
xNbY is greater than or equal to pic_width_in_luma_samples.
yNbY is greater than or equal to pic_height_in_luma_samples.
IsAvailable[cIdx][yNbY][xNbY] is equal to FALSE.
The neighbouring block is contained in a different brick than the current block, availableN is set equal to FALSE.
Otherwise, availableN is set equal to TRUE.

When all of the following conditions are true, availableN is set equal to FALSE.
checkPredModeY is equal to TRUE.
availableN is set equal to TRUE.
CuPredMode[0][xNbY][yNbY] is not equal to CuPredMode[0][xCurr][yCurr].

5.9 Embodiment #9 on TPM/GEO/CIIP

This embodiment gives an example of disallowing TPM/GEO for blocks greater than K0*K1 (e.g., K0=32, K1=32).

7.3.8.7 Merge Data Syntax

| | Descriptor |
|---|---|
| merge_data( x0, y0, cbWidth, cbHeight, chType ) { | |
|   if ( CuPredMode[ chType ][ x0 ][ y0 ] == MODE_IBC ) { | |
|     if( MaxNumIbcMergeCand > 1 ) | |
|       merge_idx[ x0 ][ y0 ] | ae(v) |
|   } else { | |
|     if( MaxNumSubblockMergeCand > 0 && cbWidth >= 8 && cbHeight >= 8 ) | |
|       merge_subblock_flag[ x0 ][ y0 ] | ae(v) |
|     if( merge_subblock_flag[ x0 ][ y0 ] == 1 ) { | |
|       if( MaxNumSubblockMergeCand > 1 ) | |
|         merge_subblock_idx[ x0 ][ y0 ] | ae(v) |
|     } else { | |
|       if( ( cbWidth * cbHeight ) >= 64 && ( ( sps_ciip_enabled_flag && | |

| | Descriptor |
|---|---|
|     cu_skip_flag[ x0 ][ y0 ] == 0 && cbWidth < 128 && cbHeight < 128) \|\| | |
|     ( sps_triangle_enabled _flag && MaxNumTriangleMergeCand > 1 && | |
|     slice_type == B && CBWIDTH <=K0 && CBHEIGHT <= K1 ) ) ) | |
|     regular_merge_flag[ x0 ][ y0 ] | ae(v) |
|   if ( regular_merge_flag[ x0 ][ y0 ] == 1 ){ | |
|     if( sps_mmvd_enabled_flag ) | |
|       mmvd_merge_flag[ x0 ][ y0 ] | ae(v) |
|     if( mmvd_merge_flag[ x0 ][ y0 ] ==1 ) { | |
|       if( MaxNumMergeCand > 1 ) | |
|         mmvd_cand_flag[ x0 ][ y0 ] | ae(v) |
|       mmvd_distance_idx[ x0 ][ y0 ] | ae(v) |
|       mmvd_direction_idx[ x0 ][ y0 ] | ae(v) |
|     } else { | |
|     if( MaxNumMergeCand > 1 ) | |
|       merge_idx[ x0 ][ y0 ] | ae(v) |
|     } | |
|   } else { | |
|     if( sps_ciip_enabled_flag && sps_triangle_enabled_flag && | |
|     MaxNumTriangleMergeCand > 1 && slice_type == B && | |
|     cu_skip_flag[ x0 ][ y0 ] == 0 && | |
|     ( cbWidth * cbHeight ) >= 64 && cbWidth < 128 && cbHeight < 128 && | |
|     CBWIDTH <=K0 && CBHEIGHT <= K1) | |
|     ciip_flag[ x0 ][ y0 ] | ae(v) |
|     if( ciip_flag[ x0 ][ y0 ] && MaxNumMergeCand > 1 ) | |
|       merge_idx[ x0 ][ y0 ] | ae(v) |
|     if( !ciip_flag[ x0 ][ y0 ] && MaxNumTriangleMergeCand > 1 ) { | |
|       if (cbWidth > = 8 && cbHeight >= 8 ) | |
|         merge_geo_flag[ x0 ][ y0 ] | ae(v) |
|       if ( merge_geo_flag[ x0 ][ y0 ] ) | |
|         merge_geo_idx[ x0 ][ y0 ] | ae(v) |
|       else | |
|         merge_triangle_split_dir[ x0 ][ y0 ] | ae(v) |
|       merge_triangle_idx0[ x0 ][ y0 ] | ae(v) |
|       merge_triangle_idx1[ x0 ][ y0 ] | ae(v) |
|     } | |
|   } | |
| } | |
| } | |

When ciip_flag[x0][y0] is not present, it is inferred as follows:
If all the following conditions are true, ciip_flag[x0][y0] is inferred to be equal to 1:
sps_ciip_enabled_flag is equal to 1.
general_merge_flag[x0][y0] is equal to 1.
merge_subblock_flag[x0][y0] is equal to 0.
regular_merge_flag[x0][y0] is equal to 0.
cbWidth is less than 128.
cbHeight is less than 128.
cbWidth*cbHeight is greater than or equal to 64.
CBWIDTH IS GREATER THAN K0 OR CBHEIGHT IS GREATER THAN K1.
Otherwise, ciip_flag[x0][y0] is inferred to be equal to 0.

5.10 Embodiment #10 on PROF/DMVR/BDOF Controlling

This embodiment gives an example of enabling/disabling PROF in slice level. The proposed changes on top of VVC draft 6 [1] are described as below. Newly added changes are highlighted in capitalized font.

7.3.2.3 Sequence Parameter Set RBSP Syntax

| | Descriptor |
|---|---|
| seq_parameter_set_rbsp( ) { | |
|   sps_decoding_parameter_set_id | u(4) |
|   IF( SPS_BDOF_ENABLED_FLAG \|\| SPS_DMVR_ENABLED_FLAG) | |
|     SPS_DBOF_DMVR_SLICE_PRESENT_FLAG | U(1) |
| ... | |
|   sps_affine_enabled_flag | u(1) |
|   if( sps_affine_enabled_flag ) { | |
|     sps_affine_type_flag | u(1) |
|     sps_affine_amvr_enabled_flag | u(1) |
|     sps_affine_prof_enabled_flag | u(1) |
|   } | |

-continued

| | Descriptor |
|---|---|
| IF( SPS_BDOF_ENABLED_FLAG | | SPS_DMVR_ENABLED_FLAG | | SPS_AFFINE_PROF_ENABLED_FLAG) | |
|     SPS_BDOF_DMVR_PROF_SLICE_PRESENT_FLAG | U(1) |
| ... | |

7.3.6 Slice Header Syntax
7.3.6.1 General Slice Header Syntax

| | Descriptor |
|---|---|
| slice_header( ) { | |
|   slice_pic_parameter_set_id | ue(v) |
| ... | |
|   if ( slice_type != I ) { | |
| ... | |
|   IF( SLICE_TYPE == B ) { | |
|     if( sps_bdof_dmvr_PROF_slice_present_flag ) | |
|       slice_disable_bdof_dmvr_PROF_flag | u(1) |
|     if( sps_triangle_enabled_flag && MaxNumMergeC and >= 2 && !pps_max_num_merge_cand_minus_max_num_triangle_cand_minus1 ) | |
|       max_num_merge_cand_minus_max_num_triangle_cand | ue(v) |
|   } ELSE IF (SPS_AFFINE_PROF_ENABLED_FLAG) | |
|   SLICE_DISABLE_PROF_FLAG | u(1) |
| ... | |
| } | |

7.4.3.3 Sequence Parameter Set RBSP Semantics
sps_bdof_dmvr_PROF_slice_present_flag equal to 1 specifies that slice_disable_bdof_dmvr_PROF_flag is present in slice headers referring to the SPS. sps_bdof_dmvr_PROF_slice_present_flag equal to 0 specifies that slice_disable_bdof_dmvr_PROF_flag is not present in slice headers referring to the SPS. When sps_bdof_dmvr_PROF_slice_present_flag is not present, the value of sps_bdof_dmvr_PROF_slice_present_flag is inferred to be equal to 0.
7.4.7.1 General Slice Header Semantics
slice_disable_bdof_dmvr_PROF_flag equal to 1 specifies that neither of bi-directional optical flow inter prediction, PREDICTION REFINEMENT WITH OPTICAL FLOW FOR B SLICES and decoder motion vector refinement based inter bi-prediction is enabled in the current slice. slice_disable_bdof_dmvr_PROF_flag equal to 0 specifies that bi-directional optical flow inter prediction or decoder motion vector refinement based inter bi-prediction OR PREDICTION REFINEMENT WITH OPTICAL FLOW FOR B SLICES may or may not be enabled in the current slice. When slice_disable_bdof_dmvr_PROF_flag is not present, the value of slice_disable_bdof_dmvr_PROF_flag is inferred to be 0.
SLICE_DISABLE_PROF_FLAG EQUAL TO 1 SPECIFIES THAT PREDICTION REFINEMENT WITH OPTICAL FLOW FOR P SLICES IS DISABLED IN THE CURRENT SLICE. SLICE_DISABLE_PROF_FLAG EQUAL TO 0 SPECIFIES THAT PREDICTION REFINEMENT WITH OPTICAL FLOW FOR P SLICES IS ENABLED IN THE CURRENT SLICE. WHEN SLICE_DISABLE_PROF_FLAG IS NOT PRESENT, THE VALUE OF SLICE_DISABLE_PROF_FLAG IS INFERRED TO BE 1.
8.5.5.9 Derivation Process for Motion Vector Arrays from Affine Control Point Motion Vectors
...
The variable cbProfFlagLX is derived as follows:
If one or more of the following conditions are true, cbProfFlagLX is set equal to FALSE.
sps_affine_prof_enabled_flag is equal to 0.
CURRENT SLICE IS B SLICE AND SLICE_DISABLE_BDOF_DMVR_PROF_FLAG IS EQUAL TO 1.
CURRENT SLICE IS P SLICE AND SLICE_DISABLE_PROF_FLAG IS EQUAL TO 1.
fallbackModeTriggered is equal to 1.
numCpMv is equal to 2 and cpMvLX[1][0] is equal to cpMvLX[0][0] and cpMvLX[1][1] is equal to cpMvLX[0][1].
numCpMv is equal to 3 and cpMvLX[1][0] is equal to cpMvLX[0][0] and cpMvLX[1][1] is equal to cpMvLX[0][1] and cpMvLX[2][0] is equal to cpMvLX[0][0] and cpMvLX[2][1] is equal to cpMvLX[0][1].
Otherwise, cbProfFlagLX set equal to TRUE.
8.5.6.3.1 General
The prediction block border extension size brdExtSize is derived as follows:

$$\text{brdExtSize} = (\text{bdofFlag} || (\text{inter\_affine\_flag}[xSb][ySb] \\ \&\& \text{sps\_affine\_prof\_enabled\_flag} \&\& \\ (\text{BSLICE} \&\& !\text{SLICE\_DISABLE\_BDOF\_DMVR\_PROF\_FLAG} || (P \\ \text{SLICE} \&\& !\text{SLICE\_DISABLE\_PROF\_FLAG}))) \\ ?2:0 \quad (8\text{-}752)$$

The variable fRefWidth is set equal to the PicOutputWidthL of the reference picture in luma samples.
...
If bdofFlag is equal to TRUE or (sps_affine_prof_enabled_flag is equal to TRUE AND ((B SLICE AND SLICE_DISABLE_BDOF_DMVR_PROF_FLAG IS EQUAL TO FALSE) OR (P SLICE AND SLICE_DISABLE_PROF_FLAG IS EQUAL TO FALSE)) and inter_affine_flag[xSb][ySb] is equal to TRUE), and one or more of the following conditions are true, the prediction luma sample value predSamplesLX[$x_L$][$y_L$] is derived by invoking the luma integer sample fetching process as specified in clause 8.5.6.3.3 with ($xInt_L$+($xFrac_L$>>3)−1), $yInt_L$+($yFrac_L$>>3)−1) and refPicLX as inputs.

1. $x_L$ is equal to 0.
2. $x_L$ is equal to sbWidth+1.
3. $y_L$ is equal to 0.
4. $y_L$ is equal to sbHeight+1.
. . .

Figure 22:
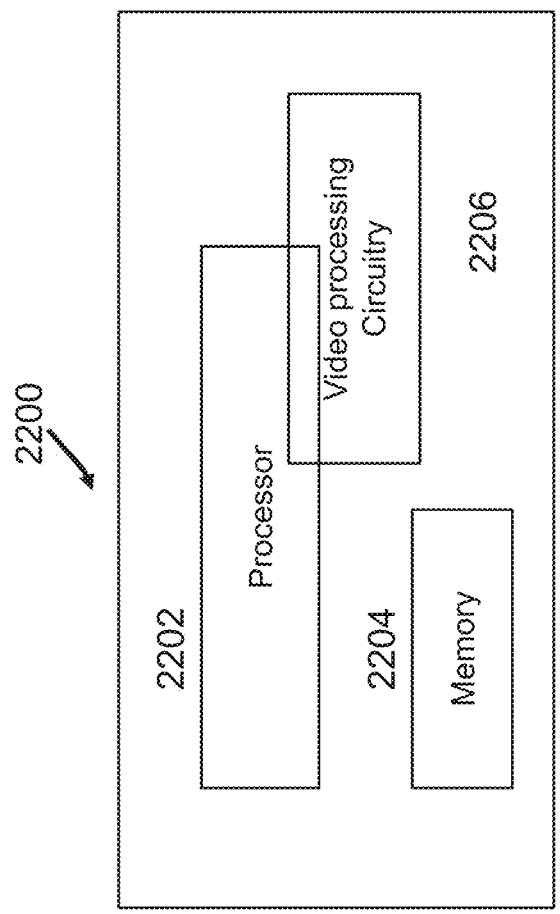
FIG. 22 is a block diagram of an example of a video processing apparatus.

FIG. 22 is a block diagram of a video processing apparatus 2200. The apparatus 2200 may be used to implement one or more of the methods described herein. The apparatus 2200 may be embodied in a smartphone, tablet, computer, Internet of Things (IoT) receiver, and so on. The apparatus 2200 may include one or more processors 2202, one or more memories 2204 and video processing hardware 2206. The processor(s) 2202 may be configured to implement one or more methods described in the present document. The memory (memories) 2204 may be used for storing data and code used for implementing the methods and techniques described herein. The video processing hardware 2206 may be used to implement, in hardware circuitry, some techniques described in the present document. The video processing hardware 2206 may be partially or completely includes within the processor(s) 2202 in the form of dedicated hardware, or graphical processor unit (GPU) or specialized signal processing blocks.

Some embodiments may be described using the following clause-based description.

Figure 23:
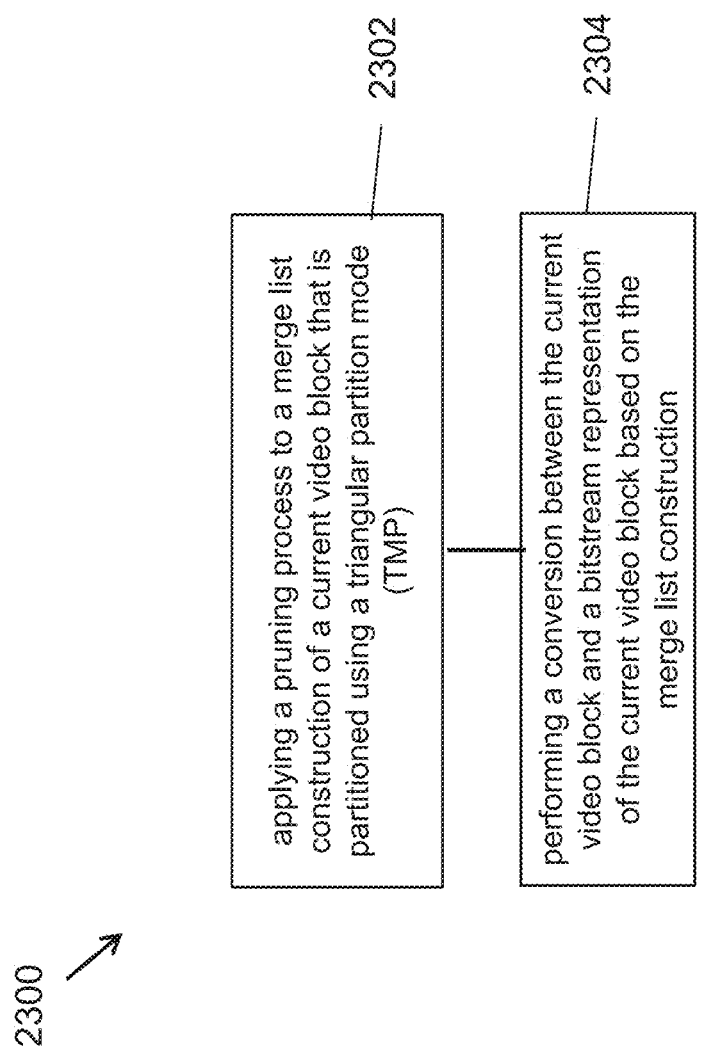
FIG. 23 is a flowchart for an example of a video processing method.

Some example embodiments of techniques described in item 1 of section 4 include:

1. A method of video processing (e.g., method 2300 depicted in FIG. 23), comprising: applying (2302) a pruning process to a merge list construction of a current video block that is partitioned using a triangular partition mode (TMP) in which the current video block is partitioned into at least two non-rectangular sub-blocks, wherein the pruning process is same as another pruning process for another video block that is partitioned using a non-TMP partition; and performing (2304) a conversion between the current video block and a bitstream representation of the current video block based on the merge list construction.
2. The method of clause 1, wherein the pruning process comprises using a partial pruning to spatial merge candidates of the current video block.
3. The method of clause 1, wherein the pruning process comprises applying full or partial pruning to the current video block based on a block dimension rule that specifies to use full or partial pruning based on dimensions of the current video block.
4. The method of clause 1, wherein the pruning process comprises using a different order of neighboring blocks during the merge list construction process.

Some example embodiments of techniques described in item 2 of section 4 include:

1. A method of video processing, comprising: determining, during a conversion between a current video block and a bitstream representation of the current video block, about availability of an alternative temporal motion vector predictor coding (ATMVP) mode for the conversion based on list X of a neighboring block of the current video block, wherein X is an integer and a value of X depends on an encoding condition of the current video block, and performing the conversion based on the availability of the ATMVP mode.
2. The method of clause 1, wherein X indicates a location of a collocated video picture from which a temporal motion vector prediction used for the conversion between the current video block and the bitstream representation is performed.
3. The method of clause 1, wherein X is determined by comparing picture order counts (POCs) of all reference pictures in all reference lists for the current video block with a POC of a current video picture of the current video block.
4. The method of clause 3, wherein in case that the comparing shows that the POCs are <=the POC of the current picture, then setting X=1, otherwise, setting X=0.
5. The method of clause 1, wherein motion information stored in a history-based motion vector predictor table is used for initializing motion vector in the ATMVP mode.

Some example embodiments of techniques described in item 3 of section 4 include:

1. A method of video processing, comprising: determining, during a conversion between a current video block and a bitstream representation of the current video block, that a sub-block based coding technique in which the current video block is partitioned into at least two sub-blocks, wherein each sub-block capable of deriving its own motion information, is used for the conversion; and performing the conversion using a merge list construction process for the current video block that is aligned with a block based derivation process for collocated motion vectors.
2. The method of clause 1, wherein the merge list construction process and the derivation process comprise performing uni-prediction from list Y, and wherein motion vectors of list Y are scaled to a target reference picture list X.
3. The method of clause 1, wherein the merge list construction process and the derivation process comprise performing bi-prediction with target reference picture list X, then motion vectors of list Y are scaled to that of list X, where Y is determined according to a rule.

Some example embodiments of techniques described in item 4 of section 4 include:

1. A method of video processing, comprising: determining, based on dimensions of a current video block of a video picture and/or an enablement of a merge sharing status in which merge candidates from different coding tools are shared, between a condition being met and the condition being not met; and performing a conversion between the current video block and a bitstream representation of the current video block based on the condition.
2. The method of clause 1, wherein the performing the conversion comprises skipping deriving spatial merge candidates in case that the condition is met.
3. The method of clause 1, wherein the performing the conversion comprises skipping deriving history-based motion vector candidates in case that the condition is met.
4. The method of any of clauses 1-3, wherein it is determined that the condition is met based on the current video block being under a shared node in the video picture.

Some example embodiments of techniques described in item 5 of section 4 include:

1. A method of video processing, comprising: making a determination, during a conversion between a current video block and a bitstream representation of the current video block, that a coding tool is disabled for the conversion, wherein the bitstream representation is configured to provide an indication that a maximum number of merge candidates for the coding tool is zero;

and performing the conversion using the determination that the coding tool is disabled.
2. The method of clause 1, wherein the coding tool corresponds to intra block copy in which pixels of the current video block are coded from other pixels in a video region of the current video block.
3. The method of clause 1, wherein the coding tool is a sub-block coding tool.
4. The method of clause 3, wherein the sub-block coding tool is an affine coding tool or an alternate motion vector predictor tool.
5. The method of any of clause 1-4, wherein the performing the conversion includes processing the bitstream by skipping syntax elements related to the coding tool.

Some example embodiments of techniques described in item 6 of section 4 include:
1. A method of video processing, comprising: making a determination, during a conversion between a current video block and a bitstream representation of the current video block using a rule that specifies that a first syntax element in the bitstream representation is conditionally present based on a second syntax element indicative of a maximum number of merge candidates used by a coding tool used during the conversion; and performing the conversion between the current video block and a bitstream representation of the current video block based on the determination.
2. The method of clause 1, wherein the first syntax element corresponds to a merge flag.
3. The method of clause 1, wherein the first syntax element corresponds to a skip flag.
4. The method of any of clauses 1-3, wherein the coding tool is a sub-band coding tool and the second syntax element corresponds to a maximum allowed merge candidates for the sub-band coding tool.

With reference to items 14 to 17 in the previous section, the following clauses describe some technical solutions.

A method of video processing, comprising: determining, for a conversion between a coded representation of a first video block of a video and a second video block, an availability of a second video block during the conversion using an availability check process, wherein the availability check process checks at least at a first position and a second position with respect to the first video block; and performing the conversion based on a result of determining.

The method as above, wherein the first position corresponds to a top-left position.

The method as above, wherein the second position corresponds to a top-left position.

A method of video processing, comprising: determining, for a conversion between a coded representation of a video block of a video and a second video block, a list of intra block copy motion candidates at a first position and a second position with respect to the video block; and performing the conversion based on a result of determining.

The method as above, wherein the first position corresponds to a top left position relative to a shared merge region of the video block.

The method of any of the above clauses, wherein the conversion includes generating the bitstream representation from the current video block.

The method of any of the above clauses, wherein the conversion includes generating samples of the current video block from the bitstream representation.

A video processing apparatus comprising a processor configured to implement a method recited in any one or more of the above clauses.

A computer readable medium having code stored thereon, the code, upon execution, causing a processor to implement a method recited in any one or more of the above clauses.

Figure 35:
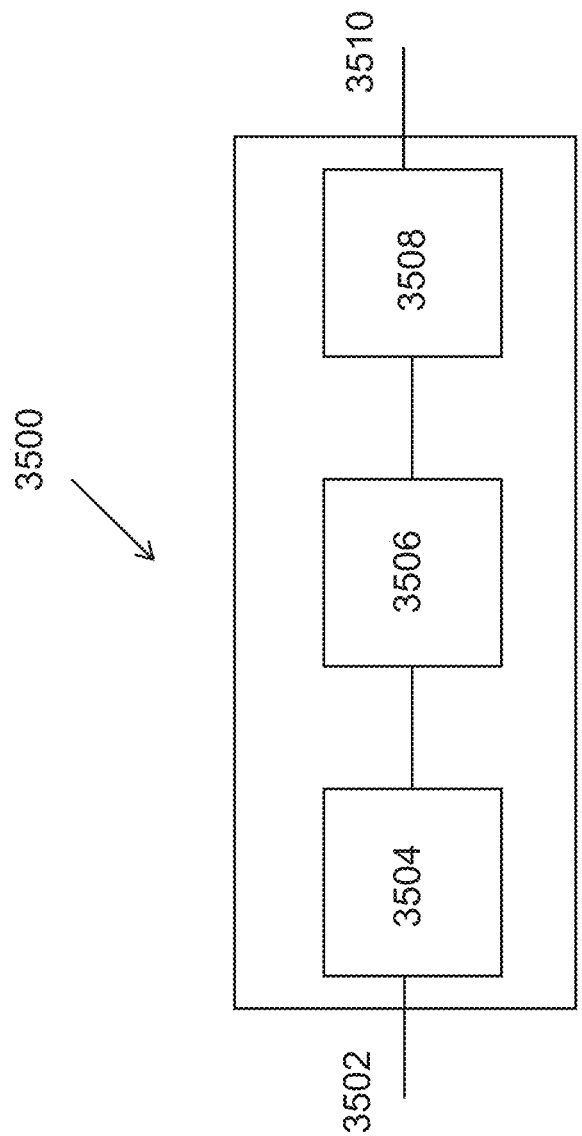
FIG. 35 is a block diagram of an example video processing system in which disclosed techniques may be implemented.

FIG. 35 is a block diagram showing an example video processing system 3500 in which various techniques disclosed herein may be implemented. Various implementations may include some or all of the components of the system 3500. The system 3500 may include input 3502 for receiving video content. The video content may be received in a raw or uncompressed format, e.g., 8 or 10 bit multi-component pixel values, or may be in a compressed or encoded format. The input 3502 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 3500 may include a coding component 3504 that may implement the various coding or encoding methods described in the present document. The coding component 3504 may reduce the average bitrate of video from the input 3502 to the output of the coding component 3504 to produce a coded representation of the video. The coding techniques are therefore sometimes called video compression or video transcoding techniques. The output of the coding component 3504 may be either stored, or transmitted via a communication connected, as represented by the component 3506. The stored or communicated bitstream (or coded) representation of the video received at the input 3502 may be used by the component 3508 for generating pixel values or displayable video that is sent to a display interface 3510. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

Figure 36:
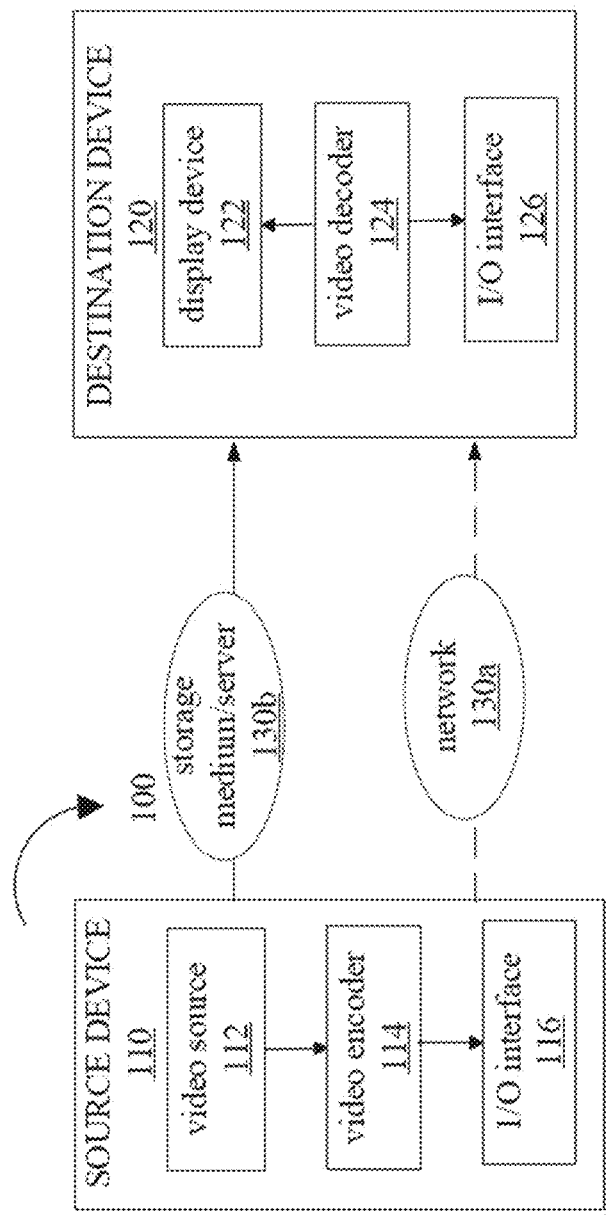
FIG. 36 is a block diagram that illustrates an example video coding system.

FIG. 36 is a block diagram that illustrates an example video coding system 100 that may utilize the techniques of this disclosure.

As shown in FIG. 36, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 37:
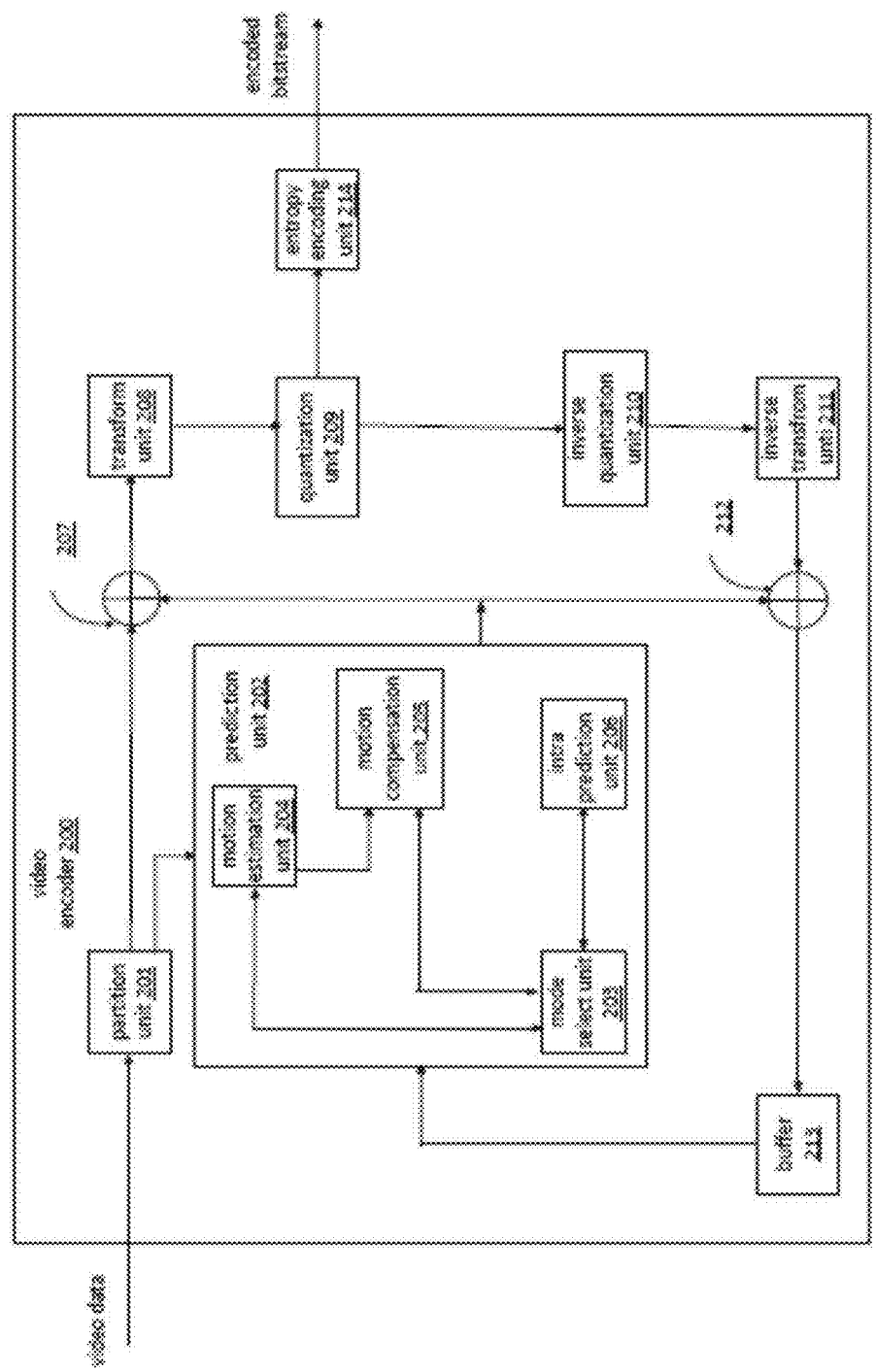
FIG. 37 is a block diagram that illustrates an encoder in accordance with some embodiments of the present disclosure.

FIG. 37 is a block diagram illustrating an example of video encoder 200, which may be video encoder 114 in the system 100 illustrated in FIG. 36.

Video encoder 200 may be configured to perform any or all of the techniques of this disclosure. In the example of FIG. 37, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Figure 5:
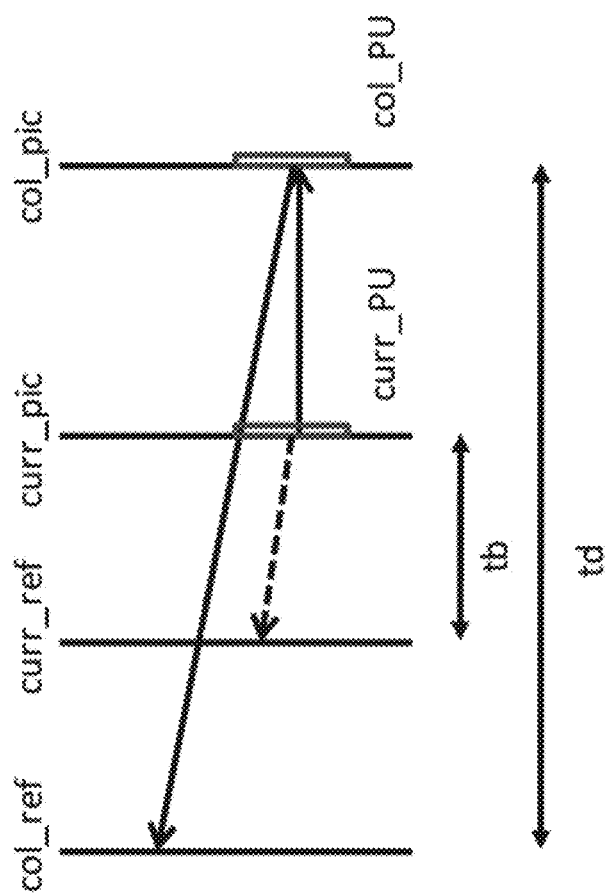
FIG. 5 shows examples of illustration of motion vector scaling for temporal merge candidate.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 38:
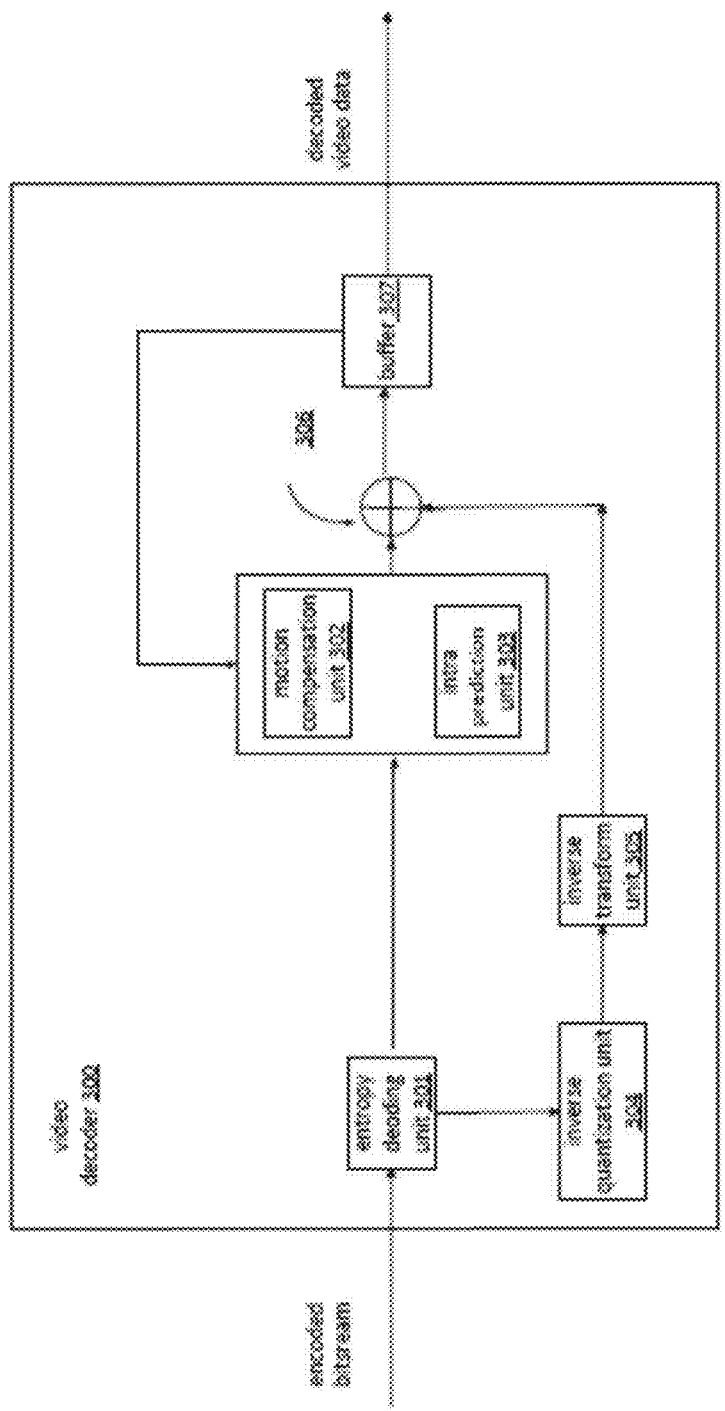
FIG. 38 is a block diagram that illustrates a decoder in accordance with some embodiments of the present disclosure.

FIG. 38 is a block diagram illustrating an example of video decoder 300 which may be video decoder 124 in the system 100 illustrated in FIG. 36.

The video decoder 300 may be configured to perform any or all of the techniques of this disclosure. In the example of FIG. 38, the video decoder 300 includes a plurality of functional components. The techniques described in this disclosure may be shared among the various components of the video decoder 300. In some examples, a processor may be configured to perform any or all of the techniques described in this disclosure.

In the example of FIG. 38, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (e.g., FIG. 37).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transform unit 305 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation.

Figure 39:
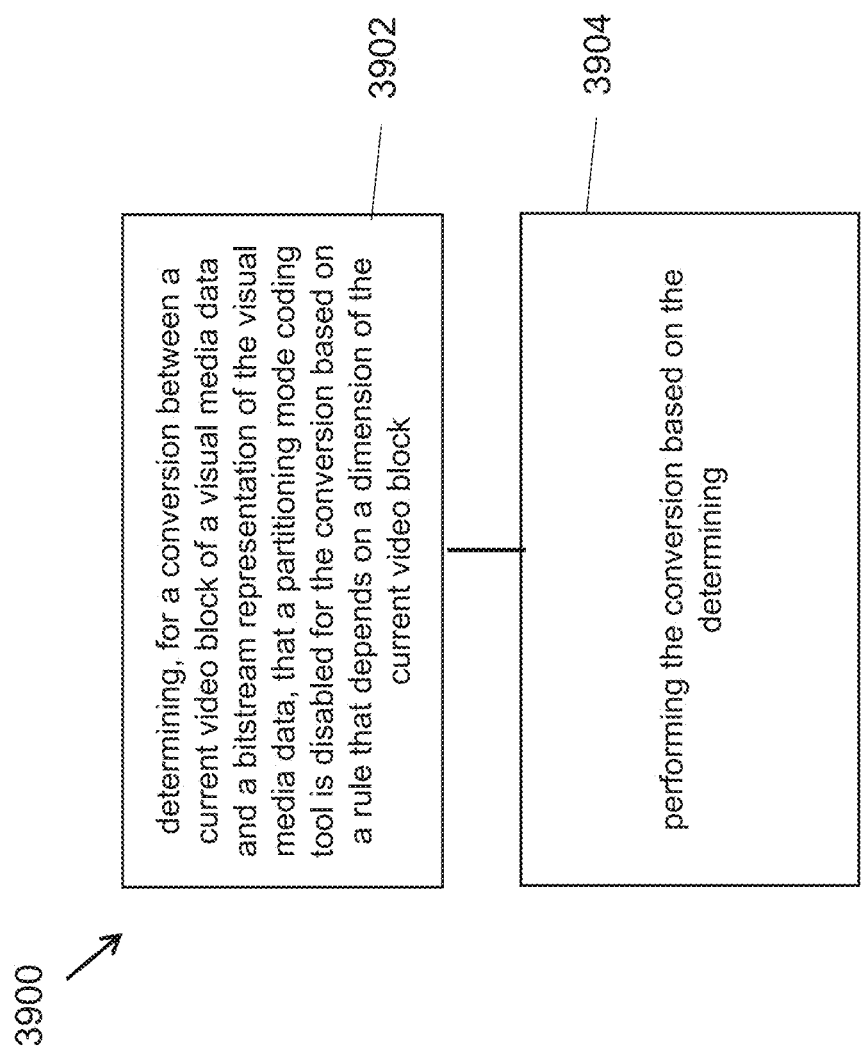
FIG. 39 is a flowchart for an example of a visual media processing method.

Some example embodiments of techniques described in item 22 of section 4 include:

1. A method of visual media processing (e.g., method 3900 depicted in FIG. 39), comprising: determining (3902), for a conversion between a current video block of a visual media data and a bitstream representation of the visual media data, that a partitioning mode coding tool is disabled for the conversion based on a rule that depends on a dimension of the current video block; and performing (3904) the conversion based on the determining.
2. The method of clause 1, wherein the partitioning mode coding tool is disabled if a block width is greater than or equal to a threshold K0 and/or a block height is greater than or equal to a threshold K1.
3. The method of clause 1, wherein the partitioning mode coding tool is disabled if a block width is greater than a threshold K0 and/or a block height is greater than a threshold K1.
4. The method of any one or more of clauses 2-3, wherein the threshold K0 and the threshold K1 equal 32.
5. The method of clause 1, wherein the partitioning mode coding tool is disabled if a block width is smaller than or equal to a threshold K0 and/or a block height is greater than or equal to a threshold K1.
6. The method of clause 1, wherein the partitioning mode coding tool is disabled if a block width is smaller than a threshold K0 and/or a block height is greater than a threshold K1.
7. The method of any one or more of clauses 5-6, wherein the threshold K0 and the threshold K1 equal 8.
8. The method of clause 1, wherein the partitioning mode coding tool is disabled if a product of a block height and a block width is greater than or equal to a threshold K1.
9. The method of clause 1, wherein the partitioning mode coding tool is disabled if a product of a block height and a block width is greater than a threshold K1.
10. The method of clause 1, wherein the partitioning mode coding tool is disabled if a product of a block height and a block width is smaller than or equal to a threshold K1.
11. The method of clause 1, wherein the partitioning mode coding tool is disabled if a product of a block height and a block width is smaller than a threshold K1.
12. The method of any one or more of clauses 8-11, wherein the threshold K1 equals 1024.
13. The method of clause 1, wherein the partitioning mode coding tool is disabled if a block width is equal to a threshold K0 and/or a block height is equal to a threshold K1.
14. The method of clause 13, wherein K0=8, K1=32.
15. The method of any one or more of clauses 1-14, wherein the rule further specifies that a syntax element is selectively excluded in the bitstream representation indicative of whether the application of the partitioning mode coding tool is disabled.
16. The method of any one or more of clauses 1-14, wherein the rule further specifies that in case a specific condition for disabling application of the partitioning mode coding tool occurs, then a syntax element indicative of application of a combined inter-intra prediction (CIIP) mode is excluded in the bitstream representation.
17. The method of clause 16, wherein the syntax element indicative of the application of the CIIP mode is excluded in the bitstream representation if a block width is greater than a threshold K0 and/or a block height is greater than a threshold K1.
18. The method of clause 17, wherein, in a case that the syntax element indicative of the application of the CIIP mode is selectively excluded in the bitstream representation, the CIIP mode is inferred to be enabled.
19. The method of any one or more of clauses 1-14, wherein the rule further specifies that in case a specific condition for disabling application of the partitioning mode coding tool occurs, then a syntax element indicative of application of a regular merge mode is excluded in the bitstream representation.
20. The method of clause 19, wherein the syntax element indicative of the application of the regular merge mode is excluded in the bitstream representation if a block width is greater than a threshold K0 and/or a block height is greater than a threshold K1.
21. The method of any one or more of clauses 1-20, wherein the partitioning mode coding tool uses a final prediction block for the current video block that is a weighted average of partitions of the current video block, wherein at least one partition comprises an angular edge.
22. The method of clause 21, wherein the partitioning mode coding tool corresponds to a geometric partitioning mode coding tool.
23. The method of clause 22, wherein the geometric partitioning mode coding tool includes multiple splitting patterns, wherein at least one splitting pattern divides the current video block into two partitions, at least one of which is non-square and non-rectangular.
24. The method of clause 21, wherein the partitioning mode coding tool corresponds to a triangular partitioning mode (TPM) coding tool.

Figure 40:
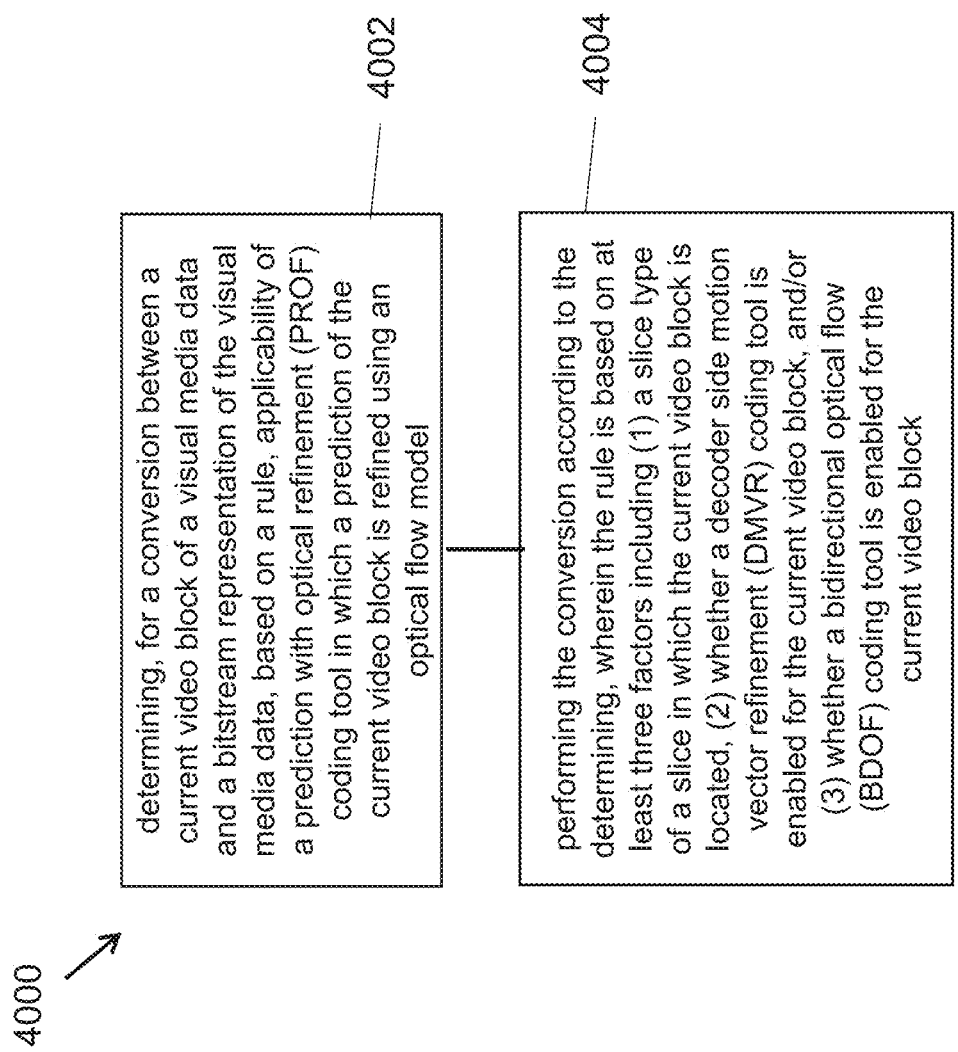
FIG. 40 is a flowchart for an example of a visual media processing method.

Some example embodiments of techniques described in item 21 of section 4 include:

25. A method of visual media processing (e.g., method 4000 depicted in FIG. 40), comprising: determining (4002), for a conversion between a current video block of a visual media data and a bitstream representation of the visual media data, based on a rule, applicability of a prediction with optical refinement (PROF) coding tool in which a prediction of the current video block is refined using an optical flow model; and performing (4004) the conversion according to the determining, wherein the rule is based on at least three factors including (1) a slice type of a slice in which the current video block is located, (2) whether a decoder side motion vector refinement (DMVR) coding tool is enabled for the current video block, and/or (3) whether a bidirectional optical flow (BDOF) coding tool is enabled for the current video block.

26. The method of clause 25, wherein the rule specifies that the slice type is exclusively a B-slice.

27. The method of any one or more of clauses 25-26, wherein the rule specifies in a case that the DMVR tool and the BDOF coding tool are disabled, the PROF coding tool is disabled.

28. The method of any one or more of clauses 25-27, wherein the rule specifies that a single syntax element included in the bitstream representation is indicative of application of the DMVR coding tool and the BDOF coding tool.

29. The method of clause 28, wherein the syntax element is included in the bitstream representation at a slice level or a picture level.

30. The method of clause 27, wherein the rule specifies that a syntax element is included in the bitstream representation in a case that the slice type is a P-slice or a B-slice.

31. The method of clause 27, wherein the rule specifies that a syntax element is included in the bitstream representation in case the slice type is not an I-slice.

32. The method of clause 30, wherein the rule specifies that the syntax element is selectively included or excluded in the bitstream representation in a case that the slice type is a B-slice.

33. The method of clause 27, wherein the rule specifies that enabling/disabling of the PROF coding tool in a case that the slice type is a P-slice is irrespective of a value of the syntax element.

34. The method of clause 25, wherein the rule specifies that a syntax element included/excluded in the bitstream representation is indicative of enabling/disabling the PROF coding tool in a case that the slice type is a P slice.

Some example embodiments of techniques described in item 23 of section 4 include:

35. A method of visual media processing (e.g., method 4100 depicted in FIG. 41), comprising: performing (4102) a conversion between a first video unit of a visual media data and a bitstream representation of the visual media data, wherein the bitstream representation is configured in accordance with a format rule specifying that a first syntax element indicative of usage of a partitioning mode coding tool is signaled in the bitstream representation prior to a second syntax element indicative of usage of a combined inter-intra prediction (CIIP) coding tool for the first video unit, and wherein, in the combined inter intra prediction (CIIP) mode, a final prediction of a video unit is based on a weighted sum of an inter prediction of the video unit and an intra prediction of the video unit.

36. The method of clause 35, wherein the partitioning mode coding tool uses a final prediction block for the first video unit that is a weighted average of partitions of the first video unit, wherein at least one partition comprises an angular edge, 37. The method of clause 36, wherein the partitioning mode coding tool corresponds to a triangular partitioning mode (TPM) coding tool.

38. The method of clause 36, wherein the partitioning mode coding tool corresponds to a geometric partitioning mode coding tool.

39. The method of clause 38, wherein the geometric partitioning mode coding tool includes multiple splitting patterns, wherein at least one splitting pattern divides the current video block into two partitions, at least one of which is non-square and non-rectangular.

40. The method of any one or more of clauses 35-39, wherein, for a second video unit of the visual media data, the first syntax element is signaled in the bitstream representation subsequent to the second syntax element indicative of usage of the combined inter-intra prediction (CIIP) coding tool.

41. The method of any one or more of clauses 35-40, further comprising:
determining, based on coded information associated with the first video unit and/or the second unit and/or neighboring video units of the first video unit and/or neighboring video units of the second video unit, whether to signal the first syntax element prior or subsequent to signaling the second syntax element.

42. The method of any one or more of clauses 35-41, wherein a video unit corresponds to one of: a slice, a picture, a tile, a brick, a block, or a coding unit.

43. The method of any one or more of clauses 1-42, wherein the partitioning mode coding tool is enabled upon meeting one or more conditions related to the current video block and/or neighboring video blocks.

44. The method of clause 43, wherein the one or more conditions are based on block dimensions, block shape, and coded information associated with a block.

45. The method of clause 44, wherein the geometric partitioning mode coding tool is applied on a first set of video blocks and the TPM coding tool is applied on a second set of video blocks.

46. The method of clause 45, wherein the first set of video blocks have larger size than the second set of video blocks.

47. The method of any one or more of clauses 38-46, wherein a single syntax element included in the bitstream representation indicates whether the geometric partitioning mode coding tool or the TPM coding tool is applied.

48. The method of any one or more of clauses 1 to 47, wherein the conversion includes generating the bitstream representation from the current video block.

49. The method of any one or more of clauses 1 to 47, wherein the conversion includes generating samples of the current video block from the bitstream representation.

50. A video processing apparatus comprising a processor configured to implement a method recited in any one or more of clauses 1 to 49.

51. A video encoding apparatus comprising a processor configured to implement a method recited in any one or more of clauses 1 to 49.

52. A video decoding apparatus comprising a processor configured to implement a method recited in any one or more of clauses 1 to 49.

53. A computer readable medium having code stored thereon, the code, upon execution, causing a processor to implement a method recited in any one or more of clauses 1 to 49.

54. A computer readable storage medium that stores a bitstream representation generated according to a method described in any one or more of clauses 1 to 49.

In the present document, the term "video processing" or "visual media processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc read-only memory (CD ROM) and Digital Versatile Disc-Read Only Memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
   determining, for a conversion between a current video block of a video and a bitstream of the video, whether to enable a geometric partitioning mode coding tool based on a first syntax element indicative of application of a combined inter-picture merge and intra-picture prediction mode and a second syntax element indicative of application of a regular merge mode; and
   performing the conversion based on the determining,
   wherein in the geometric partitioning mode coding tool, a first motion information for a first geometric partition of the current video block and a second motion information for a second geometric partition of the current video block is determined and a weighting process for generating a final prediction for samples within a weighted area of the current video block is applied based on a weighted sum of prediction samples derived based on the first motion information and the second motion information, and
   wherein the geometric partitioning mode coding tool is disabled when the first syntax element indicates that the combined inter-picture merge and intra-picture prediction mode is enabled or the second syntax element indicates that the regular merge mode is enabled.

2. The method of claim 1, wherein the first syntax element is not present in the bitstream when the current video block has a block width greater than or equal to a first threshold K0 or a block height greater than or equal to a second threshold K1, where K0 and K1 are integers.

3. The method of claim 2, wherein the first threshold K0 and the second threshold K1 are both equal to 128.

4. The method of claim 1, wherein the second syntax element is excluded from the bitstream when the current video block has a block width greater than or equal to a third threshold K2 or a block height greater than or equal to a fourth threshold K3, where K2 and K3 are integers.

5. The method of claim 4, wherein the third threshold K2 and the fourth threshold K3 are both equal to 128.

6. The method of claim 2, wherein when the first syntax element is not present in the bitstream, a value of the first syntax element is inferred to equal to 1 or 0, and wherein when the value of the first syntax element is inferred to equal to 1, all following conditions must be satisfied:
   i) the block width and the block height of the current video block are both less than 128;
   ii) the combined inter-picture merge and intra-picture prediction mode is enabled at a sequence parameter set level;
   iii) inter prediction parameters for the current video block are inferred from a neighbouring inter-predicted partition, and a subblock-based inter prediction mode and the regular merge mode are disabled for the current video block; and
   iv) a product of the block width and the block height is greater than or equal to 64.

7. The method of claim 1, wherein the geometric partitioning mode coding tool comprises:
   constructing a candidate list for the current video block, wherein the constructing includes checking an availability of a spatial candidate at a specific neighboring block B2 based on a number of available candidates in the candidate list, wherein the specific neighboring block B2 is at a top-left corner of the current video block;
   determining, based on the candidate list, the first motion information for the first geometric partition of the current video block and the second motion information for the second geometric partition of the current video block;
   applying the weighting process for generating the final prediction for samples of the current video block based on the weighted sum of prediction samples derived based on the first motion information and the second motion information.

8. The method of claim 1, wherein the conversion includes encoding the current video block into the bitstream.

9. The method of claim 1, wherein the conversion includes decoding the current video block from the bitstream.

10. An apparatus for processing video data comprising a processor and a non-transitory memory with instructions thereon, wherein the instructions upon execution by the processor, cause the processor to:
    determine, for a conversion between a current video block of a video and a bitstream of the video, whether to enable a geometric partitioning mode coding tool based on a first syntax element indicative of application of a combined inter-picture merge and intra-picture prediction mode and a second syntax element indicative of application of a regular merge mode; and
    perform the conversion based on the determination,
    wherein in the geometric partitioning mode coding tool, a first motion information for a first geometric partition of the current video block and a second motion information for a second geometric partition of the current video block is determined and a weighting process for generating a final prediction for samples within a weighted area of the current video block is applied based on a weighted sum of prediction samples derived based on the first motion information and the second motion information, and
    wherein the geometric partitioning mode coding tool is disabled when the first syntax element indicates that the combined inter-picture merge and intra-picture prediction mode is enabled or the second syntax element indicates that the regular merge mode is enabled.

11. The apparatus of claim 10, wherein the first syntax element is not present in the bitstream when the current video block has a block width greater than or equal to a first threshold K0 or a block height greater than or equal to a second threshold K1, where K0 and K1 are integers, wherein the first threshold K0 and the second threshold K1 are both equal to 128,
    wherein the second syntax element is excluded from the bitstream when the current video block has a block width greater than or equal to a third threshold K2 or a block height greater than or equal to a fourth threshold K3, where K2 and K3 are integers, wherein the third threshold K2 and the fourth threshold K3 are both equal to 128; and
    wherein when the first syntax element is not present in the bitstream, a value of the first syntax element is inferred to equal to 1 or 0, and wherein when the value of the first syntax element is inferred to equal to 1, all following conditions must be satisfied:
    i) the block width and the block height of the current video block are both less than 128;
    ii) the combined inter-picture merge and intra-picture prediction mode is enabled at a sequence parameter set level;
    iii) inter prediction parameters for the current video block are inferred from a neighbouring inter-predicted partition, and a subblock-based inter prediction mode and the regular merge mode are disabled for the current video block; and iv) a product of the block width and the block height is greater than or equal to 64.

12. The apparatus of claim 10, wherein the geometric partitioning mode coding tool comprises:

constructing a candidate list for the current video block, wherein the constructing includes checking an availability of a spatial candidate at a specific neighboring block B2 based on a number of available candidates in the candidate list, wherein the specific neighboring block B2 is at a top-left corner of the current video block;

determining, based on the candidate list, the first motion information for the first geometric partition of the current video block and the second motion information for the second geometric partition of the current video block;

applying the weighting process for generating the final prediction for samples of the current video block based on the weighted sum of prediction samples derived based on the first motion information and the second motion information.

13. A non-transitory computer-readable storage medium storing instructions that cause a processor to:

determine, for a conversion between a current video block of a video and a bitstream of the video, whether to enable a geometric partitioning mode coding tool based on a first syntax element indicative of application of a combined inter-picture merge and intra-picture prediction mode and a second syntax element indicative of application of a regular merge mode; and perform the conversion based on the determination, wherein in the geometric partitioning mode coding tool, a first motion information for a first geometric partition of the current video block and a second motion information for a second geometric partition of the current video block is determined and a weighting process for generating a final prediction for samples within a weighted area of the current video block is applied based on a weighted sum of prediction samples derived based on the first motion information and the second motion information, and wherein the geometric partitioning mode coding tool is disabled when the first syntax element indicates that the combined inter-picture merge and intra-picture prediction mode is enabled or the second syntax element indicates that the regular merge mode is enabled.

14. The non-transitory computer-readable storage medium of claim 13, wherein the geometric partitioning mode coding tool comprises:

constructing a candidate list for the current video block, wherein the constructing includes checking an availability of a spatial candidate at a specific neighboring block B2 based on a number of available candidates in the candidate list, wherein the specific neighboring block B2 is at a top-left corner of the current video block;

determining, based on the candidate list, the first motion information for the first geometric partition of the current video block and the second motion information for the second geometric partition of the current video block;

applying the weighting process for generating the final prediction for samples of the current video block based on the weighted sum of prediction samples derived based on the first motion information and the second motion information.

15. The non-transitory computer-readable storage medium of claim 13, wherein the first syntax element is not present in the bitstream when the current video block has a block width greater than or equal to a first threshold K0 or a block height greater than or equal to a second threshold K1, where K0 and K1 are integers, wherein the first threshold K0 and the second threshold K1 are both equal to 128, wherein the second syntax element is excluded from the bitstream when the current video block has a block width greater than or equal to a third threshold K2 or a block height greater than or equal to a fourth threshold K3, where K2 and K3 are integers, wherein the third threshold K2 and the fourth threshold K3 are both equal to 128; and wherein when the first syntax element is not present in the bitstream, a value of the first syntax element is inferred to equal to 1 or 0, and wherein when the value of the first syntax element is inferred to equal to 1, all following conditions must be satisfied:

i) the block width and the block height of the current video block are both less than 128;

ii) the combined inter-picture merge and intra-picture prediction mode is enabled at a sequence parameter set level;

iii) inter prediction parameters for the current video block are inferred from a neighbouring inter-predicted partition, and a subblock-based inter prediction mode and the regular merge mode are disabled for the current video block; and iv) a product of the block width and the block height is greater than or equal to 64.

16. A non-transitory computer-readable recording medium storing a bitstream of a video which is generated by a method performed by a video processing apparatus, wherein the method comprises:

determining, for a current video block of a video, whether to enable a geometric partitioning mode coding tool based on a first syntax element indicative of application of a combined inter-picture merge and intra-picture prediction mode and a second syntax element indicative of application of a regular merge mode; and generating the bitstream based on the determining, wherein in the geometric partitioning mode coding tool, a first motion information for a first geometric partition of the current video block and a second motion information for a second geometric partition of the current video block is determined and a weighting process for generating a final prediction for samples within a weighted area of the current video block is applied based on a weighted sum of prediction samples derived based on the first motion information and the second motion information, and wherein the geometric partitioning mode coding tool is disabled when the first syntax element indicates that the combined inter-picture merge and intra-picture prediction mode is enabled or the second syntax element indicates that the regular merge mode is enabled.

17. The non-transitory computer-readable recording medium of claim 16, wherein the geometric partitioning mode coding tool comprises:

constructing a candidate list for the current video block, wherein the constructing includes checking an availability of a spatial candidate at a specific neighboring block B2 based on a number of available candidates in the candidate list, wherein the specific neighboring block B2 is at a top-left corner of the current video block;

determining, based on the candidate list, the first motion information for the first geometric partition of the current video block and the second motion information for the second geometric partition of the current video block;

applying the weighting process for generating the final prediction for samples of the current video block based on the weighted sum of prediction samples derived based on the first motion information and the second motion information.

18. The non-transitory computer-readable recording medium of claim 16, wherein the first syntax element is not present in the bitstream when the current video block has a block width greater than or equal to a first threshold K0 or a block height greater than or equal to a second threshold K1, where K0 and K1 are integers, wherein the first threshold K0 and the second threshold K1 are both equal to 128;

wherein the second syntax element is excluded from the bitstream when the current video block has a block width greater than or equal to a third threshold K2 or a block height greater than or equal to a fourth threshold K3, where K2 and K3 are integers, wherein the third threshold K2 and the fourth threshold K3 are both equal to 128; and wherein when the first syntax element is not present in the bitstream, a value of the first syntax element is inferred to equal to 1 or 0, and wherein when the value of the first syntax element is inferred to equal to 1, all following conditions must be satisfied:

i) the block width and the block height of the current video block are both less than 128;

ii) the combined inter-picture merge and intra-picture prediction mode is enabled at a sequence parameter set level;

iii) inter prediction parameters for the current video block are inferred from a neighbouring inter-predicted partition, and a subblock-based inter prediction mode and the regular merge mode are disabled for the current video block; and iv) a product of the block width and the block height is greater than or equal to 64.

* * * * *

UNITED STATES PATENT AND TRADEMARK OFFICE
CERTIFICATE OF CORRECTION

PATENT NO.        : 12,069,262 B2
APPLICATION NO.   : 18/171818
DATED             : August 20, 2024
INVENTOR(S)       : Li Zhang et al.

Page 1 of 1

It is certified that error appears in the above-identified patent and that said Letters Patent is hereby corrected as shown below:

On the Title Page

The Related U.S. Application Data should read:
(63) Continuation of application No. 17/705,509 filed on Mar. 28, 2022, now Pat. No. 11,722,667, which is a continuation of application No. PCT/CN2020/118293, filed on Sep. 28, 2020.

Signed and Sealed this
Twenty-sixth Day of August, 2025

Coke Morgan Stewart
*Acting Director of the United States Patent and Trademark Office*